United States Patent
Watanabe et al.

(10) Patent No.: US 9,223,070 B2
(45) Date of Patent: Dec. 29, 2015

(54) OPTICAL FILM, POLARIZING PLATE EQUIPPED WITH THE OPTICAL FILM, PROCESS FOR MANUFACTURE OF THE POLARIZING PLATE, AND LIQUID CRYSTAL DISPLAY DEVICE

(75) Inventors: Yasuhiro Watanabe, Hachioji (JP); Ayako Inagaki, Tachikawa (JP)

(73) Assignee: KONICA MINOLTA, INC., Tokyo (JP)

( * ) Notice: Subject to any disclaimer, the term of this patent is extended or adjusted under 35 U.S.C. 154(b) by 151 days.

(21) Appl. No.: 13/978,795

(22) PCT Filed: Dec. 26, 2011

(86) PCT No.: PCT/JP2011/079984
§ 371 (c)(1),
(2), (4) Date: Jul. 9, 2013

(87) PCT Pub. No.: WO2012/096118
PCT Pub. Date: Jul. 19, 2012

(65) Prior Publication Data
US 2013/0293812 A1 Nov. 7, 2013

(30) Foreign Application Priority Data
Jan. 11, 2011 (JP) .................. 2011-002793

(51) Int. Cl.
G02F 1/13363 (2006.01)
G02B 5/30 (2006.01)
G02B 1/04 (2006.01)

(52) U.S. Cl.
CPC ............... *G02B 5/3083* (2013.01); *G02B 1/04* (2013.01); *G02B 5/305* (2013.01); *G02F 1/13363* (2013.01); *B32B 2457/202* (2013.01); *Y10T 428/105* (2015.01)

(58) Field of Classification Search
CPC ........ G02B 1/04; G02B 5/305; G02B 5/3083; G02F 1/13363; C08L 1/10; Y10T 428/1036–428/105; B32B 2457/202
USPC .......... 428/1.3–1.33; 349/96, 118; 156/324.4; 524/54–58
See application file for complete search history.

(56) References Cited

U.S. PATENT DOCUMENTS

2007/0247576 A1* 10/2007 Tamagawa et al. ........... 349/117
2010/0221457 A1* 9/2010 Sera ............................. 428/1.31
2012/0013828 A1* 1/2012 Takagi ........................... 349/96

FOREIGN PATENT DOCUMENTS

EP 0911656 4/1999
JP 4337345 9/2003
(Continued)

OTHER PUBLICATIONS
IPRP and Written Opinion in Japanese with English translation (10 pages).

Primary Examiner — Sophie Hon
(74) Attorney, Agent, or Firm — Lucas & Mercanti, LLP

(57) ABSTRACT

Provided is an optical film which does not undergo the deterioration in front contrast or contrast fluctuations even when used in a VA-type liquid crystal display device having high front contrast or as a polarizing plate protection film. The optical film comprises a cellulose ester resin having high stretching adequacy and having an average acetyl group substitution degree of 2.0-2.6, has a phase difference (Ro) of 30-100 nm, a phase difference (Rth) of 70-400 nm and a film thickness of 15-50 μm, and is characterized by fulfilling a requirement represented by formula (I). Formula (I): 0.01<S(bs)/S(T)<0.30, in the formula, S(bs) represents the quantity of backscattered light at 590 nm and 25°-85° when the angle of incident light that enters the film is set at 0°, the intensity of scattered light at 590 nm and 25°-85°; and S(T) represents the total quantity of incident light that enters the film.

8 Claims, 6 Drawing Sheets

(56) References Cited

FOREIGN PATENT DOCUMENTS

| | | | | |
|---|---|---|---|---|
| JP | 2003344655 | 12/2003 | | |
| JP | 2004109657 | 4/2004 | | |
| JP | 2005134884 | 5/2005 | | |
| JP | 2007003767 | 1/2007 | | |
| JP | 2009251018 | 10/2009 | | |
| JP | 2009265477 | 11/2009 | | |
| JP | 2009269970 | 11/2009 | | |
| JP | 2011-002793 U1 * | 1/2011 | ............... | C08B 3/00 |
| WO | 2008136266 | 11/2008 | | |
| WO | 2010050355 | 5/2010 | | |
| WO | WO 2010125997 A1 * | 11/2010 | | |
| WO | WO 2011007587 A1 * | 1/2011 | | |

* cited by examiner

OPTICAL FILM, POLARIZING PLATE EQUIPPED WITH THE OPTICAL FILM, PROCESS FOR MANUFACTURE OF THE POLARIZING PLATE, AND LIQUID CRYSTAL DISPLAY DEVICE

CROSS REFERENCE TO RELATED APPLICATION

This is a U.S. National Phase Application under 35 U.S.C. 371 of International Application PCT/JP2011/079984, filed Dec. 26, 2011, which claims the priority of Japanese Application No. 2011-002793, filed Jan. 11, 2011, the entire content of both Applications are hereby incorporated by reference.

TECHNICAL FIELD

The present invention relates to an optical film, a polarizing plate equipped with the optical film, a method (process) for manufacture of the polarizing plate, and a liquid crystal display device. In more detail, the present invention relates to an optical film appropriately controlled in the optical characteristics, a polarizing plate using the optical film, a method for manufacture of the polarizing plate, and a liquid crystal display device.

BACKGROUND ART

Liquid crystal display device has widely been applied to monitors of personal computer and portable device, by virtue of its advantages including low voltage operation, low power consumption, and potential of downsizing or thinning. In particular, the liquid crystal display device for use in television set with a large screen size, which is assumed to be viewed from a variety of angles, is under strict demands for viewing angle dependence. In recent years, demands for higher levels of performance have also been directed to a liquid crystal display device for monitor use. To cope with the demands, there have been investigated and proposed a variety of operational modes reduced in the viewing angle dependence, based on optimized alignment of liquid crystals in a liquid crystal cell, including IPS (In-Plane Switching) mode, OCB (Optically Compensatory Bend) mode, and VA (Vertically Aligned) mode.

However, the viewing angle characteristics have not fully been satisfied yet even with these liquid crystal display devices. Efforts for further improvement have yielded the liquid crystal display devices at present, basically configured by a liquid crystal cell, a phase difference film (also referred to as "phase difference plate") for improving the viewing angle characteristics, and a polarizing plate.

The phase difference film is used for canceling coloring of image or for expanding the viewing angle. Known techniques regarding the phase difference film include use of a resin film stretched to induce therein birefringence and attached to a polarizing plate, or provision of a liquid crystal layer having liquid crystal molecules aligned therein to an isotropic protective film for a polarizing plate, so as to give birefringence which allows the film to serve as a phase difference layer.

These techniques are, however, in need of providing the phase difference film or phase difference layer in addition to the protective film for a polarizing plate which raises problems in complicating a method of manufacturing the polarizing plate and pushing up the cost.

In contrast, there has been another proposal of a phase difference film which enables manufacture of a polarizing plate capable of improving the viewing angle characteristics with a simple configuration by giving a function of the phase difference film to a cellulose ester film having widely been used as a protective film for polarizing plate (see Patent Literatures 1 and 2, fore example).

Patent Literature 1 discloses a technique of expanding the viewing angle of a VA-mode liquid crystal cell by applying thereto a phase difference film obtained by width-wisely stretching a film composed of a mixed fatty acid ester of cellulose which is excellent in the stretchability. Patent Literature 2 describes a phase difference film given a desired level of phase difference value by adding a retardation enhancer to cellulose triacetate.

However, in the phase difference film described in Patent Literature 1, obtained by stretching the film composed of the mixed fatty acid ester of cellulose, the potency of expression of birefringence will largely be affected by the degree of acyl substitution of the cellulose ester resin. It is therefore necessary to strictly control the degree of acyl substitution. In order to strictly control the degree of substitution of the mixed fatty acid ester of cellulose (cellulose acetate propionate, for example), the degree of substitution of the acetyl group and the propionyl group have to be controlled in a strict manner. This has, however, pushed up the manufacturing cost, and has limited cost reduction of the phase difference film.

On the other hand, the optical film described in Patent Literature 2, obtained by adding an additive such as retardation enhancer aiming at imparting the optical film with a function of the phase difference film, will unfortunately increase forward scattering (haze), and will consequently degrade the axial contrast of a liquid crystal display device such as VA-mode liquid crystal display device characterized by its very large front contrast since the additive will behave as a foreign substance.

Techniques for reducing such problems in forward scattering (haze) ascribable to the addition of retardation enhancer, and bleeding out of the additive have been proposed typically in Patent Literature 3, proposing use of the additive such as retardation enhancer and a cellulose ester resin having solubility parameters (SP values) close to each other. More specifically, it proposes to adjust the difference of the SP values of the additive and the cellulose ester resin to 1.5 or smaller. The cellulose ester resin used herein has an average degree of substitution of acetyl group of 2.0 to 2.6 by which an excellent stretchability is ensured.

The present inventors, however, found out from further investigations that a recent VA-mode liquid crystal display device, which has a very large front contrast ratio such as 5000:1, caused problems of lowered front contrast and non-uniform contrast when the polarizing plate was manufactured by using an optical film obtained by the technique disclosed in Patent Literature 3 on one surface of a polarizer and the polarizing plate was used for the liquid crystal cell of the device.

PRIOR ART LITERATURE

Patent Literature

Patent Literature 1: Japanese Patent No. 4337345
Patent Literature 2: European Patent No. 0911656A2
Patent Literature 3: JP-A-2009-269970

SUMMARY OF THE INVENTION

Technical Problem to be Solved by the Invention

It is therefore an object of the present invention to provide an optical film, formed by using a cellulose ester resin having an average degree of substitution of acetyl group of 2.0 to 2.6, which is excellent in stretchability and is advantageous in terms of the potency of expression of birefringence and manufacturing cost, not causative of degradation of front contrast and nonuniformity in contrast of a VA-mode liquid crystal display device characterized by high front contrast, even when used therein as an optical film, or as a polarizing plate protective film; a polarizing plate using the optical film; a method of manufacturing the polarizing plate; and a liquid crystal display device.

Means to Solve the Problem

The above-described object of the present invention may be achieved by the configurations below.

1. An optical film which includes a cellulose ester resin which has an average degree of substitution of acetyl group of 2.0 to 2.6, the optical film having an in-plane phase difference value (Ro) of 30 to 100 nm and a thickness-wise phase difference value (Rth) of 70 to 400 nm, each measured at 23° C., 55% RH and at a wavelength of 590 nm, and a thickness of 15 to 50 μm, the optical film satisfying the formula (I) below.

$$0.01 < S(bs)/S(T) < 0.30 \qquad \text{Formula (I)}$$

in the formula, assuming now an angle of incidence of light on a surface of the film as 0°, S(bs) represents an integral of amount of light obtained by measuring an amount of back-scattered light over a range of angle of emergence from 25° to 85° at 1° intervals, at a measurement wavelength of 590 nm, and at a point 300 mm away from the surface of the film; and S(T) represents a total amount of incident light onto the surface of the film from a light source placed 600 mm away therefrom.

Where, an angle of emergence of the back-scattered light, which is in parallel with a normal line to the surface of the optical film and in a direction exactly opposite to the incident light, is assumed as 0° and an angle of emergence of forward-scattered light, which is in parallel with the normal line and in a direction same as the direction of propagation of the incident light, is assumed as 180°.

2. The optical film of item 1, in which a ratio ($I_t/I_s$) of intensity of scattered lights measured at a position in a direction of 50° from a light source is 0.7 or larger and 1.3 or smaller, where $I_t$ is an intensity of scattered light from the optical film placed on a sample stage so as to align a slow axis thereof in agreement with a direction of scanning of a light receiving unit of a goniophotometer, and $I_s$ is an intensity of scattered light from the optical film placed on the sample stage so as to align a fast axis thereof in agreement with the direction of scanning of the light receiving unit of the goniophotometer.

3. The optical film of item 1 or 2, which contains at least one compound selected from a sugar ester-based compound and a polyester-based compound as a plasticizer, and contains at least one compound selected from a triazine-based compound and a rod-shaped compound having at least two aromatic rings as a phase difference generating agent.

4. The optical film of item 3, in which the sugar ester-based compound is a compound represented by a general formula (FA) below with a total average degree of substitution of 3.0 to 6.0:

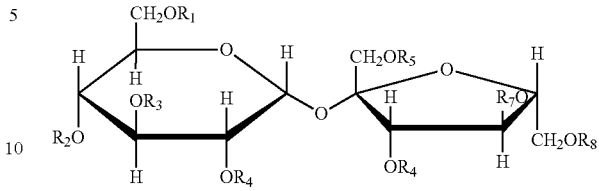

General formula (FA)

[Chemical Formula 1]

(In the formula, each of $R_1$ to $R_8$ independently represents a hydrogen atom, substituted or non-substituted alkylcarbonyl group, or substituted or non-substituted aryl carbonyl group, and $R_1$ to $R_8$ may be same with or different from each other.)

5. The optical film of item 3, in which the polyester-based compound is represented by a general formula (FB) below:

$$\text{B-(G-A)}n\text{-G-B} \qquad \text{General formula (FB)}$$

(in the formula, B represents a hydroxy group or carboxylic acid residue, G represents a $C_{2-12}$ alkylene glycol residue or $C_{6-12}$ aryl glycol residue or $C_{4-12}$ oxyalkylene glycol residue, A represents a $C_{4-12}$ alkylenedicarboxylic acid residue or $C_{6-12}$ aryl dicarboxylic acid residue, and n represents an integer of 1 or larger.)

6. A method of manufacturing a polarizing plate which includes bonding the optical film described in any one of items 1 to 5 and a polarizing plate protective film so as to hold a polarizer in between, the optical film being saponified so as to adjust a saponification index (M) below between 0.5 or larger and 50 or smaller:

Saponification index (M): concentration (mol/l) of alkali solution for saponification×saponification temperature (×10° C.)×saponification time (×10 seconds)

7. A polarizing plate manufactured by the method of manufacturing a polarizing plate described in item 6.

8. A liquid crystal display device using, as a constituent, the optical film described in any one of items 1 to 5, or the polarizing plate described in item 7.

Advantageous Effects of the Invention

The present invention successfully provides an optical film, formed by using a cellulose ester resin having an average degree of substitution of acetyl group of 2.0 to 2.6, which is excellent in stretchability and is advantageous in terms of the potency of expression of birefringence and manufacturing cost, not causative of degradation of front contrast and non-uniformity in contrast of a VA-mode liquid crystal display device characterized by high front contrast, even when used therein as an optical film or as a polarizing plate protective film; a polarizing plate using the optical film; a method of manufacturing the polarizing plate; and a liquid crystal display device.

DESCRIPTION OF EMBODIMENTS

Embodiments of the present invention will be explained below without the intention of limiting the present invention to the embodiments.

The present inventors found out from diligent investigations for solving the problems described above that, in recent liquid crystal display devices characterized by the front contrast ratio of very large as 5000:1, degradation of contrast or nonuniformity in contrast are no longer fully avoidable simply by canceling forward scattering (so-called haze) on the optical film to be used.

More specifically, the present inventors extensively investigated into problems regarding degradation of contrast and nonuniformity in contrast and found out that the optical film described in Patent Literature 3, using a highly stretchable cellulose ester resin with an average degree of substitution of acetyl group of 2.0 to 2.6, and adjusted to have solubility parameters (SP values) of the additives and the cellulose ester resin close to each other, was successful to some extent in suppressing degradation of contrast ascribable to forward scattering (haze) of light which passes through the optical film; however, it is not sufficient for the VA-mode liquid crystal display device characterized by its high front contrast and further suppression of back scattering described later is needed.

Figure 1:
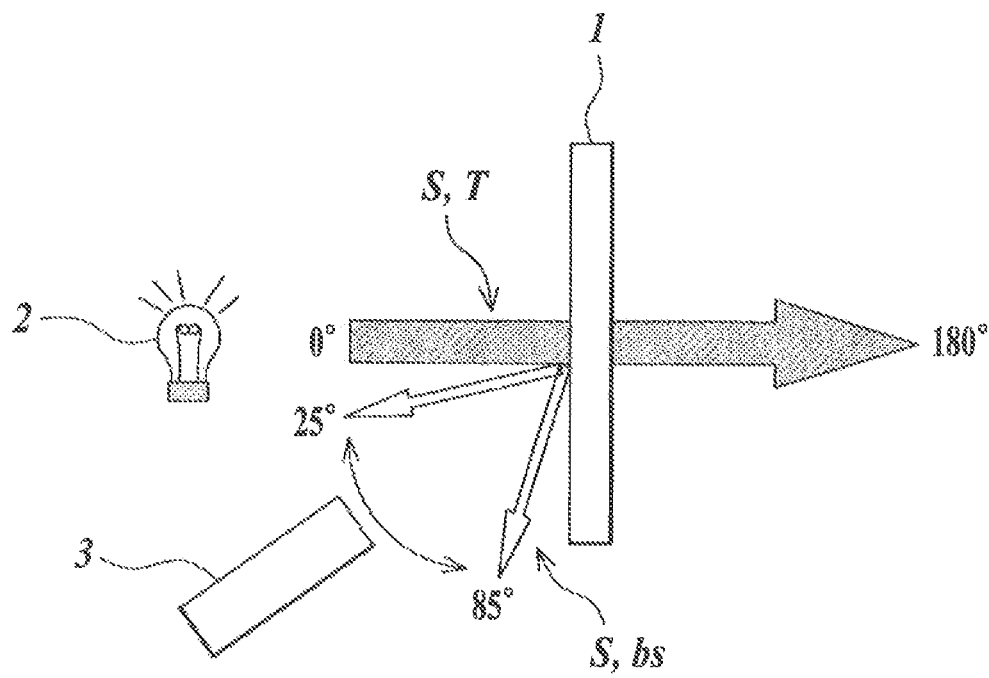
FIG. 1 is a drawing explaining "back scattering" in the context of the present invention.

FIG. 1 is a drawing illustrating the "back scattering" in the context of the present invention.

Assuming now the angle of emergence of back-scattered light, which is in parallel with the normal line of the surface of an optical film 1 and in the direction exactly opposite to the incident light from a light source 2 as 0°. Scattered light at 590 nm is measured using a photodetector 3 over a range of angle of emergence from 25° to 85°, integral of light S(bs) is calculated and then divided by the total amount of incident light S(T) to obtain a quotient usable as an index of back scattering. The smaller the value, the smaller the back scattering, which indicates that there is less factor in the optical film which possibly degrades the contrast.

The optical film of the present invention therefore successfully provides an optical film which is characterized in that the "back scattering" satisfies the formula (I) below, and is not causative of degradation or variation in contrast.

$$0.01 < S(bs)/S(T) < 0.30 \quad \text{Formula (I)}$$

In the formula, assuming now the angle of incidence of light on the surface of the film as 0°, S(bs) represents an integral of light obtained by measuring the amount of back-scattered light over a range of angle of emergence from 25° to 85° at 1° intervals using a photodetector 3, at a measurement wavelength of 590 nm, and at a point 300 mm away from the surface of the film; and S(T) represents the total amount of incident light onto the surface of the film from a light source placed 600 mm away therefrom, measured using the photodetector 3.

The light source 2 is not specifically limited, for which a xenon light source MAX-302 from Asahi Spectra Co. Ltd., for example, may be used in a white-light mode.

As the photodetector 3, a photomultiplier (R636-10, from Hamamatsu Photonics K.K.) may be used.

The measurement is conducted such that a beam spot size of the incident light on the optical film 1 is adjusting to 10 mm.

It is now assumed that the angle of emergence of back-scattered light which is in parallel with the normal line of the surface of the optical film and in the direction exactly opposite to the incident light is assumed as 0°, and the angle of emergence of forward-scattered light which is in parallel with the normal line and in the direction same as the direction of propagation of the incident light is assumed as 180°.

If S(bs)/S(T) is 0.30 or larger, the front contrast will degrade or the nonuniformity in contrast will occur, since the back scattering is excessively large. On the other hand, for the adjustment of the optical film aiming at controlling S(bs)/S(T) to 0.01 or smaller, it is necessary to combine excessive means for settling any causal factors leading to degraded contrast as described later. It is therefore feasible to adjust the value to 0.01 or larger, from the viewpoint of cost performance. S(bs)/S(T) is more preferably in the range form 0.03 to 0.20.

The causal factors of degraded contrast observed in the measurement of back scattering, particularly for the case where the cellulose acetate with an average degree of substitution of acetyl group of 2.0 to 2.6 was used, include a factor inherent to the resin per se such as foreign matter, a factor ascribable to distortion of cellulose molecule caused by stress possibly applied during separation of the film from a film-forming base in the process of film making, a factor ascribable to micro-crack (craze) or alignment of foreign matters in the film in the process of stretching aimed at controlling phase difference, a factor ascribable to poor compatibility between the resin and additives such as plasticizer, and a factor ascribable to alkali treatment such as deformation or crack of the polarizing plate in the process of bonding due to its poor saponification resistance (alkali resistance). It is therefore necessary to control not only the forward scattering (haze), but also these factors responsible for degradation of contrast.

For example, in relation to the factor inherent to the resin per se such as foreign matter, the cellulose acetate resin with an average degree of substitution of acetyl group of 2.0 to 2.6 is generally manufactured by once acetylating almost all of the hydroxy groups and then eliminating the acetyl groups (re-substituted with hydroxy groups) in the process of ageing so as to adjust the degree of substitution, so that the resin will produce a larger amount of low-molecular-weight foreign matter (gel-like foreign matter) in the process of ageing, as compared with a resin with a low degree of substitution such as cellulose triacetate, and this may degrade the contrast.

Accordingly, by reducing the back scattering by controlling the causal factors for degraded contrast, it is now possible to provide a polarizing plate and a liquid crystal display device using the optical film of the present invention, which are very excellent in the front contrast and not causative of degradation of front contrast and nonuniformity in contrast.

In addition, in view of further enhancing the effects of the present invention, the optical film of the present invention preferably has a ratio ($I_r/I_s$) of intensity of scattered light, measured at a position in the direction 50° from the light source, of 0.7 or larger and 1.3 or smaller, where $I_r$ is the intensity of scattered light from the optical film placed on a sample stage so as to align the slow axis thereof in agreement with the direction of scanning of a light receiving unit of a goniophotometer, and $I_s$ is the intensity of scattered light from the optical film placed on the sample stage so as to align the fast axis thereof in agreement with the direction of scanning of the light receiving unit of the goniophotometer.

<Scattered Light Measured by Goniophotometer>

While it has been believed that the optical film needs to be reduced in the haze for the purpose of improving the front contrast, it was found as described above that the front contrast is not adjustable to a desired value only by reducing the haze (forward scattering) which corresponds to straight ahead light. In the present invention, the effects of the present invention may further be enhanced by adjusting the ratio ($I_f/I_s$) of intensities of scattered light, measured by a goniophotometer, to 0.7 or larger and 1.3 or smaller, as well as by eliminating the back scattering. In the present invention, scattered light measured using the goniophotometer will be referred to anisotropic scattering.

<Apparatus for Measuring Inisotropic Scattering>

Figure 2A:
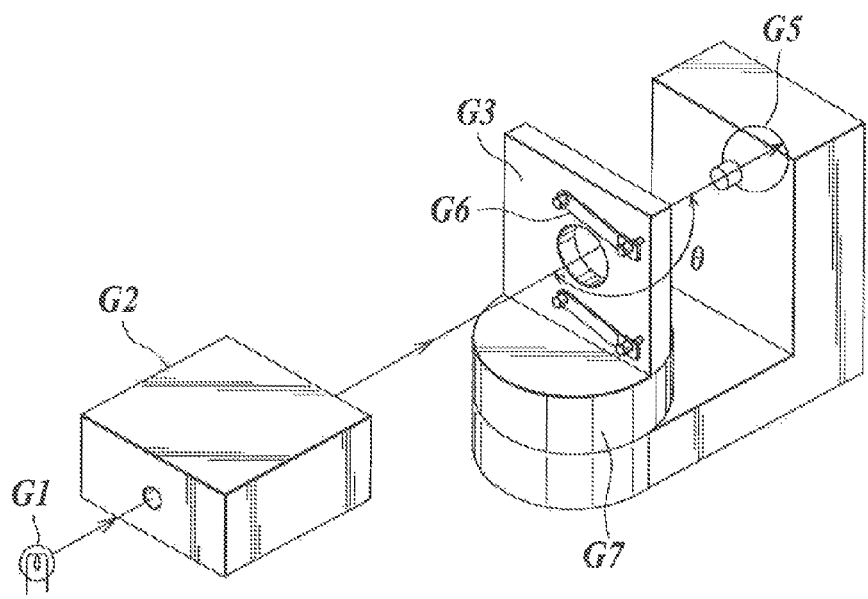
FIG. 2A outlines a goniophotometer (Model: GP-1-3D, from Optec Co. Ltd.).
Figure 2B:
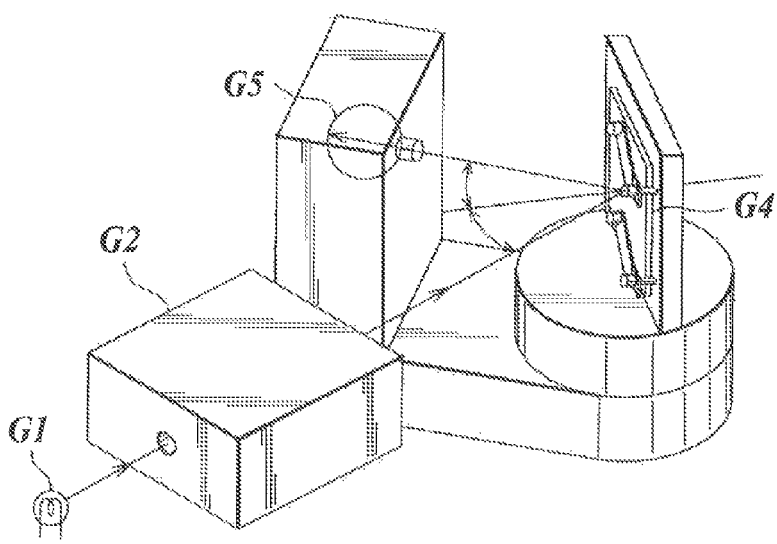
FIG. 2B outlines a goniophotometer (Model: GP-1-3D, from Optec Co. Ltd.)

FIG. 2A and FIG. 2B outline the goniophotometer (Model: GP-1-3D, from Optec Co. Ltd.), where G1: light source lamp, G2: spectrometer, G3: sample stage, G4: sample, G5: light receiving unit, and G6: stopper.

The light source used herein is a 12 V/50 W halogen bulb, and the light receiving unit is a photomultiplier (R636-10, from Hamamatsu Photonics K.K.).

FIG. 2A illustrates an arrangement of the light source lamp, the spectrometer, the sample stage, and an integrating sphere for measuring intensity of light used for reference measurement for measuring reference light or for measurement of transmittance.

FIG. 2B illustrates an arrangement of the light source lamp, the spectrometer, the sample stage, and the integrating sphere used for measurement of reflectance while placing a sample to be measured on the sample stage.

The intensity of scattered light observed when the optical film is placed on the sample stage so as to align the slow axis thereof in agreement with the scanning direction of the light receiving unit of the goniophotometer, at a position in the direction 50° from the normal line of the light source, is assumed as $I_f$, the intensity of scattered light $I_s$ is then measured by placing the optical film on the sample stage so as to align the fast axis thereof in agreement with the scanning direction of the light receiving unit of the goniophotometer, and the ratio ($I_f/I_s$) is determined. The optical film preferably has the ratio within the range from 0.7 or larger and 1.3 or smaller.

In order to manufacture the optical film of the present invention, successfully reduced in the anisotropic scattering as well as the back scattering, it is necessary as described above to respectively control the factor inherent to the resin per se such as foreign matter, the factor ascribable to distortion of cellulose molecule caused by stress possibly applied during separation of the film from a film-forming base in the process of film making, the contrast-degrading factor ascribable to micro-crack (craze) or alignment of foreign matters in the film which possibly occurs in the process of stretching aimed at controlling phase difference, the contrast-degrading factor ascribable to poor compatibility between the resin and additives such as plasticizer, and a factor ascribable to alkali treatment such as deformation or crack of the polarizing plate in the process of bonding due to its poor saponification resistance (alkali resistance).

Effective methods of controlling such various contrast-degrading factors in the process of forming the optical film of the present invention will be described in sequence without the intention of limiting the present invention to the methods.

<Optimization of Conditions for Preparing Dope Containing Cellulose Ester Resin>

In the process of manufacturing the optical film of the present invention, it is preferable to improve separability between the cellulose ester resin-containing composition (dope) and the base, in order to eliminate the contrast-degrading factor ascribable to distortion of cellulose molecules caused by stress possibly applied during separation of the film from the film-forming base in the film making.

The cellulose acetate with an average degree of substitution of acetyl group of 2.0 to 2.6 generates large stress since it needs large separation force in the early stage of manufacture of the optical film (separation at the start-up). It is therefore possible to suppress the stress-induced distortion of cellulose molecules by reducing impurities contained in the cellulose ester resin to thereby improve the separability.

In order to improve the separability, it is preferable to reduce alkali earth metal salts (Ca salt, Mg salt) and residual sulfate salts, contained in source material of the cellulosic resin, or used in the process of manufacture of cellulose ester. They may be reduced by controlling quality of water used for manufacture of the cellulose ester resin, or by thoroughly washing the cellulose ester resin. In this way, the distortion of cellulose molecules possibly occurs in the process of separation may be reduced, and thereby the film suppressed in dimensional change, excellent in mechanical strength, transparency and anti-moisture permeability, and excellent in optical characteristics such as Rth value and Ro value, may be obtained.

It is also preferable to reduce impurities (hemicellulose, lignin) derived from the source material of the cellulosic resin. Linter pulp (cotton flower) is preferred over wood pulp (softwood pulp, hardwood pulp) as the source material of resin.

(Separation Promoting Agent)

It is also preferable for the optical film of the present invention to contain a separation promoting agent, in view of enhancing the separability, and reducing the contrast-degrading factor ascribable to distortion of cellulose molecules possibly induced by stress in the process of separation.

Amount of addition of the separation promoting agent in the dope is typically 0.001 to 1% by mass, wherein an amount addition of 0.5% by mass or below is preferable in view of suppressing segregation of the separation promoting agent from the film, whereas an amount of addition of 0.005% by mass or more is preferable in view of successfully obtaining a desired level of effect of reducing separation. Accordingly, the amount of addition is preferably 0.005 to 0.5% by mass, and more preferably 0.01 to 0.3% by mass. The separation promoting agent is arbitrarily selectable from those publicly known, including organic or inorganic acidic compound, surfactant, and chelating agent. Among them, multivalent carboxylic acid and ester thereof (ethyl esters of citric acid, for example) and anionic surfactant are effectively used, and anionic surfactant is particularly preferable.

The anionic surfactant is exemplified by, but not limited to, fatty acid salts, abietate salts, hydroxyalkanesulfonate salts, alkanesulfonate salts, dialkylsulfosuccinate ester salts, α-olefinsulfonate salts, straight-chain alkylbenzenesulfonate salts, branched-chain alkylbenzenesulfonate salts, alkylnaphthalenesulfonate salts, alkylphenoxypolyoxyethylene propylsulfonate salts, polyoxyethylene alkylsulfophenyl ether salts, N-methyl-N-oleyltaurin sodium salt, N-alkylsulfosuccinic monoamide disodium salt, petroleum sulfonate salts, sulfated beef tallow, sulfate ester salts of fatty acid alkyl ester, alkylsulfate ester salts, polyoxyethylene alkylethersulfate ester salts, fatty acid monoglyceride sulfate ester salts, polyoxyethylene alkylphenyl ether sulfate ester salts, polyoxyethylene styrylphenyl ether sulfate ester salts, alkylphosphate ester salts, polyoxyethylene alkyl ether phosphate ester salts, polyoxyethylene alkylphenyl ether phosphate ester salts, partially saponified products of styrene/maleic anhydride copolymer, partially saponified products of olefin/maleic anhydride copolymer, and naphthalene sulfonate salt-formalin condensate.

Among them, the compound represented by the formula (HI) or (HIII) is preferable.

$$[R_1O(AO)n]_p-P(=O)(OM)_q \qquad \text{General formula (HI)}$$

$$R_2-L-Q \qquad \text{General formula (HIII)}$$

Each of $R_1$ and $R_2$ represents a $C_{8-22}$ straight-chain or branched alkyl group, and particularly a $C_{10-18}$ alkyl group.

The alkyl group may have a substituent, wherein the substituent is exemplified by halogen atom, aryl group, heterocyclic group, alkoxyl group, aryloxy group, alkylthio group, arylthio group, acyl group, hydroxy group, acyloxy group, amino group, alkoxycarbonyl group, acylamino group, oxycarbonyl group, carbamoyl group, sulfonyl group, sulfamoyl group, sulfonamide group, sulfuryl group, and carboxy group. "A" represents a $C_{2-4}$ alkylene group, and n represents an integer of 0 or 1 to 20. p and q satisfy p+q=3, where p represents an integer of 1 or 2. M represents a hydrogen atom, alkali metal atom or ammonium group. L represents a divalent linking group, and Q represents a carboxylic acid or salt thereof, sulfonic acid or salt thereof, and sulfate ester or salt thereof.

Specific examples of the anionic surfactant will be listed below, with no intention of limiting the present invention. RZ-1; $C_8H_{17}O-P(=O)-(OH)_2$, RZ-2; $C_{12}H_{25}O-P(=O)-(OK)_2$, RZ-3; $C_{12}H_{25}OCH_2CH_2O-P(=O)-(OK)_2$, RZ-4; $C_{15}H_{31}(OCH_2CH_2)_5O-P(=O)-(OK)_2$, RZ-5; $\{C_{12}H_{25}O(CH_2CH_2O)_5\}_2-P(=O)-OH$, RZ-6; $\{C_{18}H_{35}(OCH_2CH_2)_8O\}_2-P(=O)-ONH_4$, RZ-7; $(t-C_4H_9)_3-C_6H_2-OCH_2CH_2O-P(=O)-(OK)_2$, RZ-8; $(iso-C_9H_{19}-C_6H_4-O-(CH_2CH_2O)_5-P(=O)-(OK)(OH)$, RZ-9; $C_{12}H_{25}SO_3Na$, RZ-10; $C_{12}H_{25}OSO_3Na$, RZ-11; $C_{17}H_{33}COOH$, RZ-12; $C_{17}H_{33}COOH.N(CH_2CH_2OH)_3$, RZ-13; $iso-C_8H_{17}-C_6H_4-O-(CH_2CH_2O)_3-(CH_2)_2SO_3Na$, RZ-14; $(iso-C_9H_{19})_2-C_6H_3-O-(CH_2CH_2O)_3-(CH_2)_4SO_3Na$, RZ-15; sodium triisopropylnaphthalene sulfonate, RZ-16; sodium tri-t-butyl naphthalene sulfonate, RZ-17; $C_{17}H_{33}CON(CH_3)CH_2CH_2SO_3Na$, RZ-18; $C_{42}H_{25}-C_6H_4SO_3.NH_4$ Highly polar solvent such as alcohols, ketones and water are preferably used as solvent for the cellulose ester resin.

It is also preferable to control the amount of residual solvent in the process of separation. The amount of residual solvent relative to the cellulose ester resin-containing dope, in the process of separation, is preferably 50 to 120%.

The solvent content may alternatively be controlled by spraying or coating the solvent immediately before the separation, or by exposing the film to vapor of the solvent in the process of separation.

The surface of the film-forming base is preferably subjected to hydrophobic treatment (fluororesin coating, for example).

Methods of improving the separability at the start-up include a method of feeding the dope while continuously changing the separability from high to low, by consecutively adding a low-separability dope (for example, a method of continuously producing cellulose with a high degree of substitution towards cellulose with a low degree of substitution); a method of adding a high-separability dope or a material capable of improving the separability to a low-separability dope in an in-line manner; and a method of stacking a thin film of a high-separability dope or a material capable of improving the separability, on the side of the film-forming base as viewed from the low-separability dope.

The cellulose ester resin used in the present invention preferably has a number-average molecular weight of 60,000 or larger from the viewpoints of viscosity, resistance to alkali treatment, mechanical strength, and durability. The cellulose ester resin with an excessively large molecular weight will, however, increase the viscosity of the dope, which causes a problem in adaptability to film production.

For the purpose of reducing the viscosity of the cellulose ester resin dope, it is preferable to reduce metal salts contained in the resin (alkali metal salts such as calcium acetate and magnesium acetate) and impurities derived from source material of the resin (hemicellulose, lignin, etc.).

The dope preferably contains a poor solvent of cellulose ester resin such as alcohol or water, preferably contains 6 to 18% by mass, relative to the total mixed solvent, of methanol or ethanol and preferably contains 0.5 to 2.0% of water.

The cellulose ester resin dope may be raised in the concentration ratio by reducing the viscosity as described above, and thereby the production adaptability may be improved. The solid concentration is preferably 20 to 35% by mass.

The viscosity of the dope, in terms of oscillatory viscosity at 33° C., preferably ranges from 1,000 mPa·s to 5,000 Pa·s, and more preferably from 2,600 mPa·s to 3,200 Pa·s.

For improved production adaptability, also a method of controlling the viscosity of the dope in the process of film making by casting by adjusting temperature of a film-forming dies, is preferably used.

(Removal of Gel-Like Foreign Matter and Impurities)

In the present invention, it is preferable to remove the gel-like foreign matter and impurities in the dope having the cellulose ester resin dissolved therein. Methods of removal preferably rely upon adjustment and optimization of conditions for dissolving the source materials (species of solvent, ratio of solvent, concentration, dissolving temperature, stirring time) and conditions for filtration.

For example, the dope containing the cellulose ester resin is preferably dissolved at high temperatures, preferably in the temperature range from 50 to 90° C., for 1 to 6 hours.

Species of solvent preferably used herein are those described later. The solvent preferably contains alcohol or water, and preferably contains 10% or more of ethanol. Concentration of the dope preferably satisfies a relation of 2.0≤ (mass of solvent)/(mass of cellulose ester resin+additive) ≤4.0.

For the purpose of reducing the gel-like foreign matter and impurities, it is also preferable, for example, to prepare the dope while reducing as possible the amount of the above-described salts contained in the source material.

<Filter Medium>

Filter medium preferably has a small absolute filter rating in view of removing insoluble matters, whereas the filter medium may suffer from clogging if the absolute filter rating is excessively small. Accordingly, the filter medium preferably has an absolute filter rating of 0.008 mm or smaller, more preferably 0.001 to 0.008 mm, and furthermore preferably 0.003 to 0.006 mm.

The "absolute filter rating" herein means a minimum size of particle completely removable by filtration, confirmed by filtration test using standard particles, such as glass bead, with known and uniform particle size.

The filter medium used herein is selectable from general filter media without special limitation. Preferable examples include plastic media such as polypropylene and Teflon (registered trademark), and metal media such as stainless steel, which are free from dropping of fiber. By the filtration, impurities contained in the source cellulose ester resin, in particular foreign matter causative of bright dot, may successfully be reduced.

The foreign matter causative of bright dot herein is a dot (foreign matter) seen as leakage of light, when the optical film is placed between two polarizing plates arranged in the crossed-Nicol configuration, and the stack is illuminated from the side of one polarizing plate and observed from the side of the other polarizing plate. The number of bright dots of 0.01 mm or larger in diameter is preferably 200/cm$^2$ or less, more preferably 100/cm$^2$ or less, furthermore preferably 50/m$^2$ or less, and particularly 10/cm$^2$ or less. Also it is more preferable when the population of dots of 0.01 mm or smaller in diameter becomes smaller.

The dope may be filtered by any of general methods. In view of suppressing difference in filtration pressure (pressure difference) before and after the filtration, it is preferable to proceed the filtration under heating in the temperature range not lower than the boiling point of the solvent at nomal pressure, and not allowing the solvent to boil under pressure. The temperature range is preferably 45 to 120° C., more preferably 45 to 70° C., and furthermore preferably 45 to 55° C.

The smaller the filtration pressure, the better. The filtration pressure is preferably 1.6 MPa or lower, more preferably 1.2 MPa or lower and furthermore preferably 1.0 MPa or lower.

The cellulose ester resin used in the present invention is generally manufactured by converting the cellulosic resin into a triacetylated form, followed by hydrolysis. Since a gel-like fine by-product generated in the series of processes is supposed to affect the disordered alignment, so that by removing the by-product, the scattering may be suppressed. Multi-step filtration through a filter with a filter rating of smaller than 5 μm is preferable as the method of filtration for this purpose.

Filter media usable in the present invention are available, for example, from Rokitechno Co. Ltd. under the trade names of 125L-HC-05, 125L-HC-1, 250L-HC-05, 250L-HC-1, 500L-HC-05, 500L-HC-1, 125L-SHP-005, 125L-SHP-010, 125L-SHP-030, 250L-SHP-005, 250L-SHP-010, 250L-SHP-030, 500L-SHP-005, 500L-SHP-010, 500L-SHP-030, 750L-SHP-005, 750L-SHP-010, 750L-SHP-030, 125L-MPH-006, 125L-MPH-012, 125L-MPH-025, 125L-MPH-045, 250L-MPH-006, 250L-MPH-012, 250L-MPH-025, 250L-MPH-045, 500L-MPH-006, 500L-MPH-012, 500L-MPH-025, 500L-MPH-045, 750L-MPH-006, 750L-MPH-012, 750L-MPH-025, 750L-MPH-045, 125L-EX-05, 125L-EX-1, 125L-EX-3, 250L-EX-05, 250L-EX-1, 250L-EX-3, 500L-EX-05, 500L-EX-1, 500L-EX-3, 750L-EX-05, 750L-EX-1, and 750L-EX-3.

Also Profile II with a filter rating of 3 μm or smaller, Profile UP with a filter rating of 4.5 μm or smaller, Poly-Fine XLD with a filter rating of 4.5 μm or smaller, and Ultipleat High Flow with a filter rating of 4.5 μm or smaller, all from Nihon Pall Ltd., are usable.

Also TCP Submicron Series TSC-3, TSP-3, TMC-2 and TMP-2 from ADVANTEC; and CP-01, CP-03, CPH-01, CPH-03, CHW-01, CHW-03, CPII-01 and CPII-03 from Chisso Filter Co. Ltd. are usable.

<Optimization of Stretching Conditions>

In order to express the features of the optical film of the present invention, in addition to control of the contrast-degrading factor, the optical film is preferably stretched in the process of manufacturing as one means for implementing a predetermined phase difference, while optimally controlling the stretching conditions. The stretching is preferably performed using a tenter.

The in-plane phase difference value (Ro) and the thickness-wise phase difference value (Rth) of the optical film of the present invention may be determined by the equation below, wherein the in-plane phase difference value (Ro) measured at 590 nm falls in the range from 30 to 100 nm, and the thickness-wise phase difference value (Rth) falls in the range from 70 to 400 nm. By controlling the phase difference values in the above-described ranges, the optical film may preferably be used as an optical compensation film for expanding viewing angle of the VA-mode liquid crystal display device.

$$Ro = (nx - ny) \times d \qquad \text{Formula (i)}$$

$$Rth = \{(nx + ny)/2 - nz\} \times d \qquad \text{Formula (ii)}$$

(In the formula, nx, ny and nz represent refractive indices measured at 23° C., 55% RH, 590 nm, where nx represents an in-plane maximum refractive index, also referred to as refractive index in the direction of slow axis, ny represents an in-plane refractive index in the direction normal to the slow axis, nz represents a thickness-wise refractive index, and d represents thickness of the film (nm).)

The phase difference value is determined using an automatic birefringence analyzer KOBRA-21ADH (from Oji Scientific Instruments), under an environment of 23° C. and 55% RH, and with a wavelength of 590 nm.

In the stretching on the tenter, it is preferable to control the amount of residual solvent in a web and stretching temperature. The amount of residual solvent in the web is preferably 20 to 100% by mass at the start of tentering. The web is preferably dried on a tenter until the content of residual solvent is reduced down to 10% by mass or below, and more preferably 5% by mass or below.

In the stretching on the tenter, the drying temperature is preferably 30 to 160° C., more preferably 50 to 150° C., and most preferably 70 to 140° C.

The draw ratio is preferably 5 to 50% in the transverse direction (TD stretching). The film may also be stretched in the longitudinal direction (MD stretching) in the range from 1 to 10%. In the present invention, so-called biaxial stretching, by which the film is stretched both by TD stretching and MD stretching, is preferable in view of aligning the cellulose molecules.

For example, the film may preferably be heated to 160° C., stretched by 1.05 times by roll stretching in the longitudinal direction, then introduced into a tenter having a preheating zone, a stretching zone, a holding zone, and a cooling zone (also having, between the every adjacent zones, a neutral zone for ensuring heat insulation between the zones), stretched at 160° C. in the width-wise direction by 1.20 times, and then cooled down to 70° C. while relaxing the film by 2% in the width-wise direction.

Note that, since the refractive index (nz value) in the thickness-wise direction tends to decrease under a high draw-ratio stretching, so that it is necessary to balance the in-plane phase difference (Ro) and the thickness-wise phase difference (Rth).

For the purpose of reducing the thickness-wise refractive index (nz value), the film is preferably stretched in the longitudinal direction (MD stretching).

In order to adjust the phase difference, it is also preferable to add an additive (styrene compound, acrylic compound, etc.) having a negative birefringence in the in-plane direction. It is alternatively preferable to add an additive capable of increasing the in-plane phase difference (Ro) and the phase difference (Rth) in the thickness-wise direction (triazines, etc.). These additives will be detailed later.

The stretched film is preferably annealed so as to relax the residual stress. The annealing is conducted at 80 to 200° C., preferably at 100 to 180° C., and more preferably at 130 to 160° C. The annealing herein is preferably conducted at a heat transfer coefficient of 20 to 130×10³ J/m² hr.

The heat transfer coefficient is more preferably in the range from 40 to 130×10³ J/m² hr, and most preferably from 42 J/m² hr to 84×10³ J/m² hr. In this way, the residual stress may be reduced, and the dimensional stability under high temperature conditions typically at 90° C., or under high-temperature and high-humidity conditions typically at 80° C., 90% RH, may be improved.

Also a method of controlling the refractive index (nz value) in the thickness-wise direction, by annealing after the stretching, is preferably used. The annealing is preferred also because it can reduce the haze.

For the purpose of improving the angle of alignment, the stretching is preferably followed by relaxation by 1 to 10%, and more preferably 1 to 5%.

<Optical Film>

The optical film of the present invention characteristically contains the cellulose ester resin with an average degree of substitution of acetyl group of 2.0 to 2.6. The constituent of the optical film will be detailed below.

<Cellulose Ester Resin>

The cellulose ester resin used in the present invention preferably has an average degree of substitution of acetyl group of 2.0 to 2.6, and more preferably 2.2 to 2.5. The average degree of substitution of acetyl group in this context means the number of esterified (acylated) hydroxy groups from among three hydroxy groups bound to an anhydrous glucose composing the cellulose, and therefore represents a value within the range from 0 to 3.

If the cellulose ester resin has an average degree of substitution of acetyl group of smaller than 2.0, the surface quality of the film may degrade due to increased viscosity of the dope, and the haze may increase due to increased tension of stretching. On the other hand, if the average degree of substitution of acetyl group exceeds 2.6, the birefringence will appear only to a small degree, and thereby a necessary level of phase difference is less readily obtainable.

The cellulose ester resin used in the present invention is, in particular, preferably at least one species selected from cellulose diacetate and cellulose triacetate. Among them, particularly preferable cellulose ester resin is cellulose diacetate.

The average degree of substitution of acetyl group is determined by a method specified by ASTM-D817-96 (Standard Test Methods of Testing Cellulose Acetate, etc.).

The number-average molecular weight (Mn) of the cellulose ester resin used in the present invention is preferably in the range from 30,000 to 300,000 from the viewpoint of mechanical strength of the resultant film, and is more preferably 60,000 to 200,000.

Ratio Mw/Mn of the weight-average molecular weight (Mw) and the number-average molecular weight (Mn) of the cellulose ester resin is preferably 1.4 to 3.0.

The weight-average molecular weight Mw and the number-average molecular weight Mn of the cellulose ester resin were measured by gel permeation chromatography (GPC).

Conditions of measurement are as follow.
Solvent: methylene chloride
Column: Shodex K806, K805, K803G (from Showa Denko K.K., these three used in connection)
Column temperature: 25° C.
Sample concentration: 0.1% by mass
Detector: RI Model 504 (from GL Sciences Inc.)
Pump: L6000 (from Hitachi, Ltd.)
Flow rate: 1.0 ml/min
Calibration curve: standard curve based on 13 samples of STK standard polystyrene (from Tosoh Corporation), Mw=1,000,000 to 500, used at nearly regular intervals.

Cellulose used as an origin of the cellulose ester resin in the present invention is exemplified by cotton linter, wood pulp and kenaf, without special limitation. The cellulose ester resins obtained from these origins may be mixed in an arbitrary ratio.

For the purpose of reducing impurities (hemicellulose, lignin) deribed from the source cellulosic resin, it is preferable to use linter pulp (cotton flower) as the source resin, rather than wood pulp (softwood pulp, hardwood pulp).

The cellulose ester in the cellulose ester resin in the present invention may be manufactured by any of publicly-known methods. In general, cellulose as a source material and a predetermined organic acid (acetic acid, propionic acid, etc.), acid anhydride (acetic anhydride, propionic anhydride, etc.), and catalyst (sulfuric acid, etc.) are mixed so as to esterify the cellulose. The reaction is proceeded until a cellulose triester is formed. In the triester, three hydroxy groups in a glucose unit are substituted by the acyl groups of the organic acid. Mixed ester-type cellulose ester, such as cellulose acetate propionate and cellulose acetate butyrate, may be manufactured, by using two species of organic acid at the same time. The cellulose triester is then hydrolyzed to thereby synthesize the cellulose ester resin with a desired degree of acyl substitution. The cellulose ester resin is finally obtained after the individual processes of filtration, precipitation, washing with water, dehydrating, drying and so forth.

More specifically, the cellulose ester resin may be synthesized referring to a method described in JP-A-H10-45804.

Commercially available products include L20, L30, L40 and L50 from Daicel Corporation; and Ca398-3, Ca398-6, Ca398-10, Ca398-30 and Ca394-60S from Eastman Chemical Company.

From the viewpoint of improving the separability of the dope containing the cellulose ester resin from the film-forming base, the total content of calcium and magnesium contained in the optical film of the present invention and the content of acetic acid preferably satisfy the relational expression (a) below:

$$1 \leq \text{(content of acetic acid)}/\text{(total content of calcium and magnesium)} \leq 30 \quad \text{Relational expression (a)}$$

While calcium and magnesium are contained in the cellulose ester resin which is a source material in the process of manufacturing thereof, they may be added as a metal oxide, metal hydroxide, or metal salt (inorganic acid salt, organic acid salt), for the purpose of neutralizing and stabilizing an acid catalyst (in particular, sulfuric acid) added in the process of manufacturing the cellulose ester resin. They may alternatively be added as a metal oxide, metal hydroxide, or metal salt (inorganic acid salt, organic acid salt), in the process of forming the optical film. The total content of calcium and magnesium contained in the optical film in the context of the present invention means the total amount in these substances.

In the process of manufacturing of the cellulose ester resin, acetic anhydride or acetic acid is used as a solvent for reaction or an esterifying agent. An unreacted portion of acetic anhydride produces acetic acid after being hydrolyzed with a reaction terminating agent (water, alcohol, acetic acid, etc.). The amount of acetic acid contained in the optical film in the context of the present invention means the total amount of such residual acetic acid and free acetic acid.

In the relational expression (a), if (content of acetic acid)/(total content of calcium and magnesium) is smaller than 1, scattering of light will occur due to the calcium and magnesium metal salts, and this unfortunately degrades the contrast. On the other hand, if the value is larger than 30, the polarizer, after being bonded with the optical film, may unfortunately become more susceptible to degradation due to acetic acid.

In view of achieving the object of the present invention, the range from 5 to 20 is preferable, and the range from 5 to 10 is more preferable.

The total content of calcium and magnesium contained in the optical film is preferably 5 to 130 ppm, more preferably 5 to 80 ppm, and furthermore preferably 5 to 50 ppm.

Calcium and magnesium contained in the optical film may be quantified by any of publicly-known methods, wherein for example a dry cellulose ester resin is completely combusted, the resultant ash is dissolved into hydrochloric acid and subjected to pre-treatment, and the sample may be measured by atomic absorption spectrometry. Measurement value may be obtained, in ppm, as the content of calcium and magnesium in 1 g of bone-dry cellulose ester resin.

The content of acetic acid in the optical film is preferably 20 to 500 ppm, more preferably 25 to 250 ppm, and furthermore preferably 30 to 150 ppm.

Acetic acid contained in the optical film may be quantified by any of publicly-known methods, wherein an exemplary method is as follows. The film is dissolved in methylene chloride, and is then re-precipitated by adding methanol. The supernatant is filtrated, and then analyzed by gas chromatography, to thereby obtain the content of acetic acid.

In the present invention, the optical film of the present invention is preferably adjusted to have a melting point of 200 to 290° C. The melting point is adjustable within the above-described range, typically by controlling the degree of substitution of the cellulose ester resin, or by adding a plasticizer.

Note that, for the optical film of the present invention, a thermoplastic resin other than the above-described cellulose ester resin may be used in combination, so long as the effects of the present invention will not be harmed.

The "thermoplastic resin" herein means resin which may be softened by heating up to the glass transition point or melting point thereof, and is moldable into any desired shape.

Examples of general-purpose resin usable as the thermoplastic resin include polyethylene (PE), high-density polyethylene, middle-density polyethylene, low-density polyethylene, polypropylene (PP), polyvinyl chloride (PVC), polyvinylidene chloride, polystyrene (PS), polyvinyl acetate (PVAc), Teflon (registered trademark) (polytetrafluoroethylene, PTFE), ABS resin (acrylonitrile butadiene styrene resin), AS resin, and acrylic resin (PMMA).

For the case where particularly high levels of strength and durability are required, examples of usable resin include polyamide (PA), nylon, polyacetal (POM), polycarbonate (PC), modified polyphenylene ether (m-PPE, modified PPE, PPO), polybutylene terephthalate (PBT), polyethylene terephthalate (PET), glass fiber-reinforced polyethylene terephthalate (GF-PET), and cyclic polyolefin (COP).

For the case where high thermal deformation temperature and characteristics allowing long-term use are additionally required, examples of usable resins include polyphenylene sulfide (PPS), polytetrafluoroethylene (PTFE), polysulfone, polyethersulfone, amorphous polyallylate, liquid crystal polymer, polyether ether ketone, thermoplastic polyimide (PI), and polyamide-imide (PAI).

Species and molecular weight of the resin may be appropriately combined depending on applications of the present invention.

<Relative Relation Among Solubility Parameters>

The optical film of the present invention preferably contains 0.01 to 30% by mass of at least one species of additive which satisfies the formula below. By adding the additive, the resin is relieved from load in the process of forming, and thereby the front contrast may be improved.

Formula: $|SPt-SPc|<1.5$

SPc in the formula represents a solubility parameter value (SP value) of the cellulose ester resin measured by the Hoy's method, and SPt represents a solubility parameter value (SP value) of the additive measured by the same method.

"$|SPt-SPc|$" is an absolute value of difference (also noted as "$\Delta SP$") of a solubility parameter value of the additive measured by the Hoy's method (SPt value) and a solubility parameter value of the cellulose ester resin measured by the Hoy's method (SPc value).

The Hoy's method is described in Polymer Handbook Fourth Edition.

While preferable additives are not specifically limited so far as the relational expression described above is satisfied, preferable examples include those which satisfy the relational expression selected from sugar ester compound, polyester-based compound and so forth described later.

<Sugar Ester Compound>

The optical film of the present invention preferably uses a compound (also referred to as sugar ester compound) represented by the general formula (FA) below with a total average degree of substitution of 3.0 to 6.0:

[Chemical Formula 2]

General formula (FA)

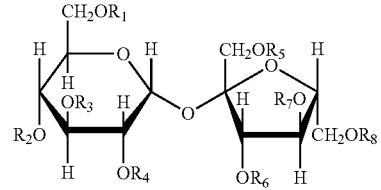

(in the formula, each of $R_1$ to $R_8$ independently represents a hydrogen atom, substituted or non-substituted alkylcarbonyl group, or, substituted or non-substituted aryl carbonyl group, and $R_1$ to $R_8$ may be same with or different from each other.)

The average degree of substitution of the compound represented by the general formula (FA) in the present invention is preferably 3.0 to 6.0, from the viewpoint of suppressing increase in the back scattering in the process of stretching.

The degree of substitution of the compound represented by the general formula (FA) means the number of hydroxy groups, from among 8 hydroxy groups contained in the general formula (FA), substituted by substituent(s) other than hydrogen, in other words, the number of groups other than hydrogen, from among $R_1$ to $R_8$ contained in the general formula (FA). Accordingly, the degree of substitution is maximized at 8.0 when all of $R_1$ to $R_8$ are substituted by substituents other than hydrogen, whereas minimized at 0.0 when all of $R_1$ to $R_8$ represent hydrogen atoms.

It has been known that it is difficult to synthesize the compound having a structure represented by the general formula (FA), as a single species with the fixed numbers of hydroxy groups and OR groups, but generally as a mixture of several species of component with different numbers of hydroxy groups and OR groups. It is therefore appropriate to use the average degree of substitution, as the degree of substitution of the general formula (FA) in the present invention. The average degree of substitution may be determined by general procedures, based on a ratio of areas read on a high performance liquid chromatographic chart showing a distribution of the degree of substitution.

In the general formula (FA), each of $R_1$ to $R_8$ represents a substituted or non-substituted alkylcarbonyl group, or, substituted or non-substituted aryl carbonyl group, wherein $R_1$ to $R_8$ may be same or different.

Examples of sugar as a source of synthesis of the sugar ester compound in the present invention include those listed below, without the intention of limiting the present invention to the examples.

The examples include glucose, galactose, mannose, fructose, xylose, or arabinose, lactose, sucrose, nystose, 1F-fructosyl nystose, stachyose, maltitol, lactitol, lactulose, cellobiose, maltose, cellotriose, maltotriose, raffinose and kestose.

Other examples include genthiobiose, genthiotriose, genthiotetraose, xylotriose, and galactoxyl sucrose.

Monocarboxylic acid used for synthesis of the sugar ester compound in the present invention is arbitrarily selectable from publicly known aliphatic monocarboxylic acid, alicyclic monocarboxylic acid, and aromatic monocarboxylic acid, without special limitation. The carboxylic acid herein may be used independently or in the form of mixture of two or more species.

Preferable examples of the aliphatic monocarboxylic acid include saturated fatty acid such as acetic acid, propionic acid, butyric acid, isobutyric acid, valeric acid, caproic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, and lacceric acid; and unsaturated fatty acid such as undecylenic acid, oleic acid, sorbic acid, linoleic acid, linolenic acid, arachidonic acid, and octenoic acid.

Preferable examples of the alicyclic monocarboxylic acid include cyclopentanecarboxylic acid, cyclohexanecarboxylic acid, cyclooctanecarboxylic acid, and derivatives of these compounds.

Preferable examples of the aromatic monocarboxylic acid include benzoic acid; aromatic monocarboxylic acid having 1 to 5 alkyl groups or alkoxy groups introduced into a benzene ring of benzoic acid, such as toluic acid; cinnamic acid; aromatic monocarboxylic acid having two or more benzene rings such as benzilic acid, biphenyl carboxylic acid, naphthalene carboxylic acid, and tetralin carboxylic acid; and derivatives of these compounds. Benzoic acid is particularly preferable.

Specific examples of the sugar ester compound used in the present invention will be listed below, with any of $R_1$ to $R_8$ represented by the same substituent R, without limiting the present invention.

| COMPOUND No. | R | AVERAGE DEGREE OF SUBSTITUTION |
|---|---|---|
| [Chemical Formula 3] | | |
| FA-1 | 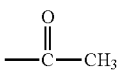 | 3.3 |
| FA-2 | —C(=O)—CH₃ | 4.2 |
| FA-3 | —C(=O)—CH₃ | 5.7 |
| FA-4 | —C(=O)—CH₃ | 6.0 |
| FA-5 | —C(=O)—C₆H₅ | 3.5 |
| FA-6 | —C(=O)—C₆H₅ | 4.0 |
| FA-7 | —C(=O)—C₆H₅ | 5.5 |
| FA-8 | —C(=O)—C₆H₅ | 6.0 |
| FA-9 | —C(=O)—C₆H₄—CH₃ | 3.2 |
| FA-10 | —C(=O)—C₆H₄—CH₃ | 4.4 |
| FA-11 | —C(=O)—C₆H₄—CH₃ | 5.5 |
| FA-12 | —C(=O)—C₆H₄—CH₃ | 6.0 |
| [Chemical Formula 4] | | |
| FA-13 | —C(=O)—CH₂—C₆H₅ | 3.0 |
| FA-14 | —C(=O)—CH₂—C₆H₅ | 4.0 |
| FA-15 | —C(=O)—CH₂—C₆H₅ | 5.5 |

-continued

| COMPOUND No. | R | AVERAGE DEGREE OF SUBSTITUTION |
|---|---|---|
| FA-16 | —C(=O)—CH$_2$—C$_6$H$_5$ | 6.0 |
| FA-17 | —C(=O)—C$_6$H$_2$(OCH$_3$)$_3$ (3,4,5-trimethoxybenzoyl) | 3.1 |
| FA-18 | —C(=O)—C$_6$H$_2$(OCH$_3$)$_3$ | 4.7 |
| FA-19 | —C(=O)—C$_6$H$_2$(OCH$_3$)$_3$ | 5.3 |
| FA-20 | —C(=O)—C$_6$H$_2$(OCH$_3$)$_3$ | 6.0 |

-continued

| COMPOUND No. | R | AVERAGE DEGREE OF SUBSTITUTION |
|---|---|---|
| | [Chemical Formula 5] | |
| FA-21 | —C(=O)—CH(CH$_3$)$_2$ | 3.5 |
| FA-22 | —C(=O)—CH(CH$_3$)$_2$ | 4.6 |
| FA-23 | —C(=O)—CH(CH$_3$)$_2$ | 5.6 |
| FA-24 | —C(=O)—CH(CH$_3$)$_2$ | 6.0 |

The sugar ester compound in the present invention may be manufactured by allowing the sugar to react with an acylating agent (also referred to as esterifying agent, exemplified by acid halide such as acetyl chloride, and acid anhydride such as acetic anhydride). Distribution of the degree of substitution may be controlled by adjusting the amount of acylation agent, timing of addition, and estrification reaction time. A component with a desired degree of substitution or a component with a degree of substitution of 4 or smaller may be prepared by mixing the sugar ester compounds with different degrees of substitution or by mixing isolated pure compounds with different degrees of substitution.

(Exemplary Synthesis: Synthesis of Compound of Present Invention)

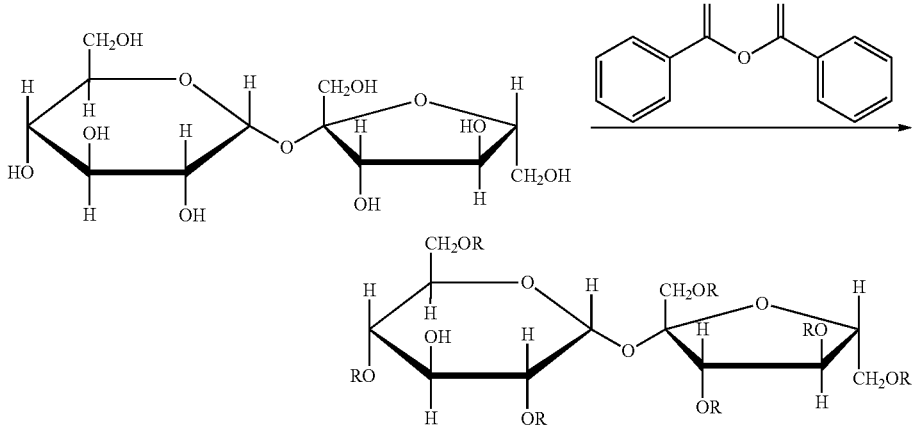

[Chemical Formula 6]

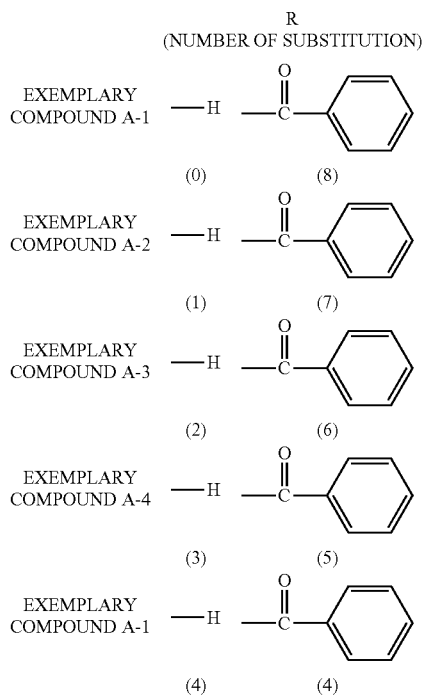

Into a four-necked flask equipped with a stirrer, a reflux condenser, a thermometer, and a nitrogen gas feeding pipe, 34.2 g (0.1 mol) of sucrose, 135.6 g (0.6 mol) of benzoic anhydride, and 284.8 g (3.6 mol) of pyridine were placed, then the mixture was heated under stirring and bubbling with nitrogen gas fed through the nitrogen gas feeding pipe and allowed to proceed esterification at 70° C. for 5 hours.

Inner pressure of the flask was then reduced down to $4\times10^2$ Pa or below, an excessive portion of pyridine was evaporated off at 60° C., the inner pressure of the flask was reduced down to $1.3\times10$ Pa or below, and the content was heated to 120° C. to thereby evaporate most portions of benzoic anhydride and benzoic acid generated therefrom. Then 1 L of toluene, and 300 g of a 0.5% by mass aqueous sodium carbonate solution were added, the mixture was stirred at 50° C. for 30 minutes, allowed to stand, and the toluene layer was collected. The collected toluene layer was added with 100 g of water, washed at normal temperature for 30 minutes, collected again, the toluene was evaporated off under reduced pressure ($4\times10^2$ Pa or below) at 60° C., to thereby obtain a sugar ester compound 1 as a mixture of compounds A-1, A-2, A-3, A-4 and A-5, etc.

The obtained mixture was analyzed by high performance liquid chromatography and mass spectrometry (HPLC-MS), and was found to contain 1.2% by mass of A-1, 13.2% by mass of A-2, 14.2% by mass of A-3, 35.4% by mass of A-4, and 40.0% by mass of A-5, etc. The average degree of substitution was found to be 5.2.

Similarly, 158.2 g (0.70 mol), 146.9 g (0.65 mol), 135.6 g (0.60 mol), or 124.3 g (0.55 mol) of benzoic anhydride was allowed to react with an equal moles of pyridine, to thereby obtain sugar esters having compositions listed in Table 1.

TABLE 1

| COMPONENT | NUMBER OF MOLES OF BENZOIC ANHYDRIDE | | | |
|---|---|---|---|---|
| (% BY MASS) | 0.70 | 0.65 | 0.60 | 0.55 |
| A-1 | 7.3 | 2.3 | 1.2 | 0.5 |
| A-2 | 28.4 | 18.8 | 13.2 | 7.0 |
| A-3 | 29.0 | 17.8 | 14.2 | 9.4 |
| A-4 | 26.4 | 34.0 | 35.4 | 26.5 |
| A-5, etc. | 8.8 | 27.1 | 40.0 | 56.7 |
| AVERAGE DEGREE OF SUBSTITUTION | 6.0 | 5.4 | 5.2 | 4.7 |

Next, portions of the individual resultant mixtures were purified by column chromatography using silica gel, to thereby obtain A-1, A-2, A-3, A-4 and A-5, etc. respectively, with 100% purity.

Note that A-5, etc. means a mixture of all components having degrees of substitution of 4 or smaller, in other words, the compounds have the degrees of substitution of 4, 3, 2 and 1. The average degree of substitution was calculated assuming that A-5, etc. has a degree of substitution of 4.

In the present invention, the average degree of substitution was adjusted by combining and mixing the sugar ester having an average degree of substitution close to a desired value prepared as described above, and the isolated compounds A-1 to A-5, etc.

<Conditions for HPLC-MS Analysis>
1) LC Section
Apparatus: Column oven (JASCO CO-965), detector (JASCO UV-970-240 nm), pump (JASCO PU-980), degasser (JASCO DG-980-50), all from JASCO Corporation;
Column: Inertsil ODS-3, particle size=5 μm, 4.6×250 mm (from GL Sciences Inc.);
Column temperature: 40° C.;
Flow rate: 1 ml/min;
Mobile phase: THF (1% acetic acid):$H_2O$ (50:50); and
Injection volume: 3 μl.

2) MS Section
Apparatus: LCQ DECA (from Thermo Quest Co.);
Ionization method: Electrospray ionization (ESI);
Spray voltage: 5 kV;
Capillary temperature: 180° C.; and
Vaporizer temperature: 450° C.
<Polyester-Based Compound>

In the present invention, a polyester-based compound represented by the general formula (FB) below is preferably used as a plasticizer, in addition to the sugar ester compound.

$$B\text{-}(G\text{-}A)_n\text{-}G\text{-}B \quad \text{General formula (FB)}$$

(In the formula, B represents a hydroxy group or carboxylic acid residue, G represents a $C_{2-12}$ alkylene glycol residue or $C_{6-12}$ aryl glycol residue or $C_{4-12}$ oxyalkylene glycol residue, A represents a $C_{4-12}$ alkylene dicarboxylic acid residue or $C_{6-12}$ aryl dicarboxylic acid residue, and n represents an integer of 1 or larger.)

The polyester-based compound represented by the general formula (FB) is composed of a hydroxy group or carboxylic acid residue represented by B, an alkylene glycol residue or oxyalkylene glycol residue or aryl glycol residue represented by G, and an alkylene dicarboxylic acid residue or aryl dicarboxylic acid residue represented by A, and is obtainable by a reaction similarly to general ester-based compounds.

The carboxylic acid component in the polyester-based compound represented by the general formula (FB) is exemplified by acetic acid, propionic acid, butyric acid, benzoic acid, para tertiary butyl benzoic acid, orthotoluic acid, metatoluic acid, paratoluic acid, dimethylbenzoic acid, ethylbenzoic acid, normal propylbenzoic acid, aminobenzoic acid, acetoxybenzoic acid, and aliphatic acid. These compounds may be used independently, or in the form of mixture of two or more species.

The $C_{2-12}$ alkylene glycol component in the polyester-based compound represented by the general formula (FB) is exemplified by ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-octadecanediol. These glycols may be used independently, or in the form of mixture of two or more species.

Among them, the $C_{2-12}$ alkylene glycol is particularly preferable by virtue of their excellent compatibility with the cellulose ester resin.

The $C_{4-12}$ oxyalkylene glycol component in the polyester-based compound represented by the general formula (FB) is exemplified by diethylene glycol, triethylene glycol, tetraethylene glycol, dipropylene glycol, and tripropylene glycol. These glycols may be used independently, or in the form of mixture of two or more species.

The $C_{4-12}$ alkylene dicarboxylic acid component in the polyester-based compound represented by the general formula (FB) is exemplified by succinic acid, maleic acid, fumaric acid, glutaric acid, adipic acid, azelaic acid, sebacic acid, and dodecanedicarboxylic acid. These compounds may be used independently, or in the form of mixture of two or more species. The $C_{6-12}$ aryl dicarboxylic acid component is exemplified by phthalic acid, terephthalic acid, isophthalic acid, 1,5-naphthalenedicarboxylic acid, and 1,4-naphthalenedicarboxylic acid.

The polyester-based compound represented by the general formula (FB) preferably has a number-average molecular weight of 300 to 1,500, and more preferably 400 to 1,000. The acid value thereof is 0.5 mgKOH/g or smaller and the hydroxy value is 25 mgKOH/g or smaller, and more preferably, the acid value is 0.3 mgKOH/g or smaller and the hydroxy value is 15 mgKOH/g or smaller.

Specific examples of the polyester-based compound represented by the general formula (FB), usable in the present invention, will be listed below, without limiting the present invention.

[Chemical Formula 7]

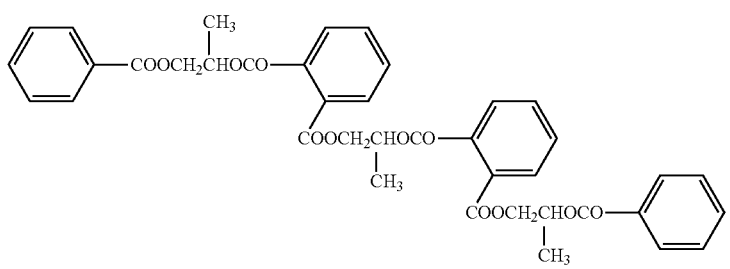

FB-1

Mw: 696

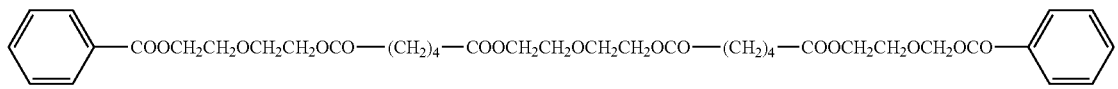

FB-2

Mw: 746

-continued
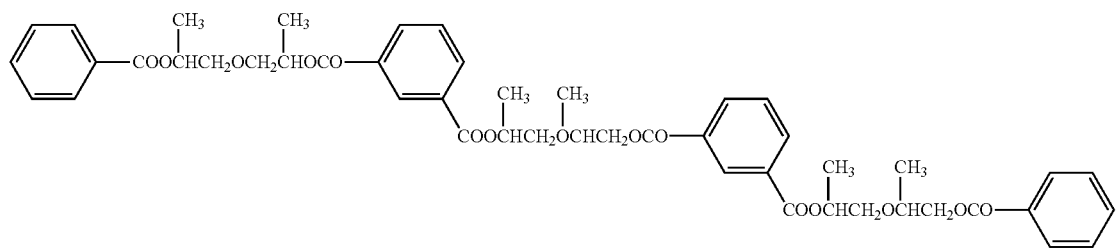
Mw: 830
FB-3
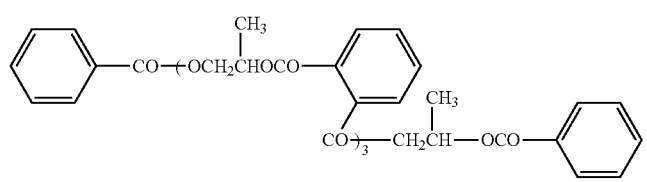
Mw: 886
FB-4
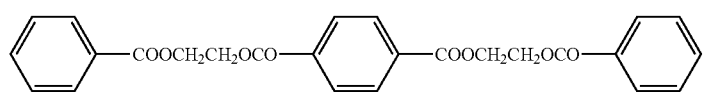
Mw: 462
FB-5
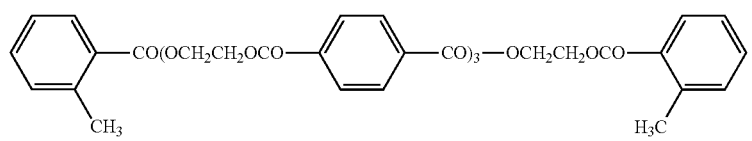
Mw: 874
FB-6
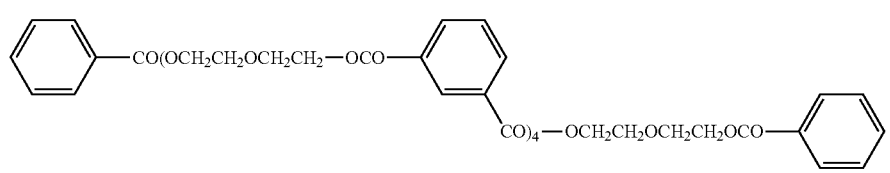
Mw: 1258
FB-7
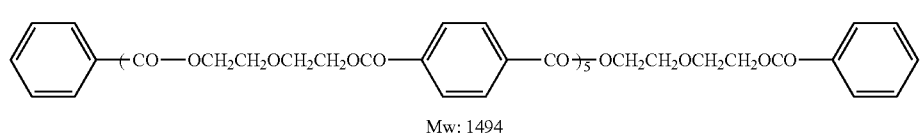
Mw: 1494
FB-8
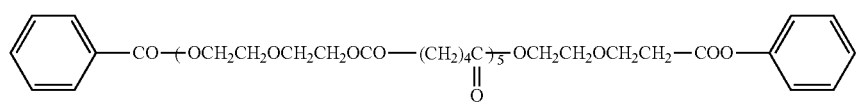
Mw: 1394
FB-9
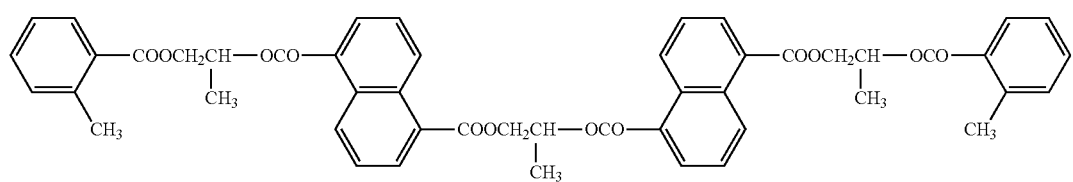
Mw: 852
FB-10

-continued
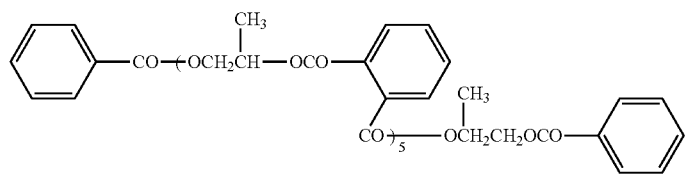
FB-11
Mw: 1314
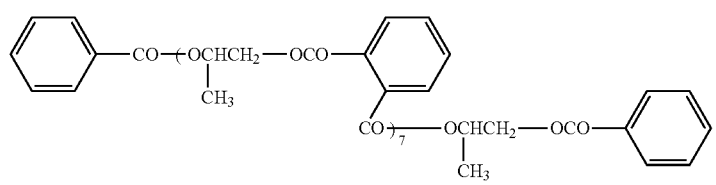
FB-12
Mw: 1726
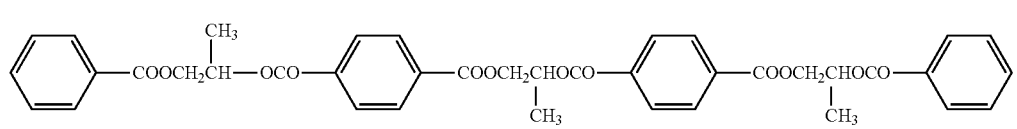
FB-13
Mw: 696
[Chemical Formula 9]
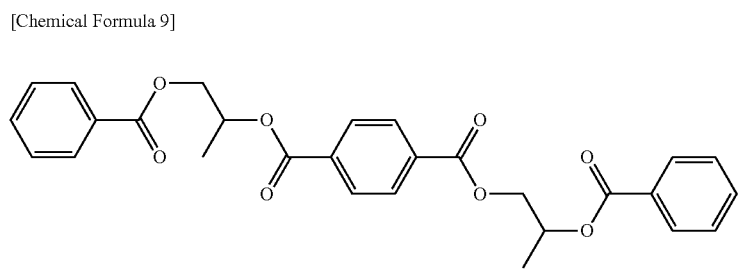
FB-14
Mw: 491
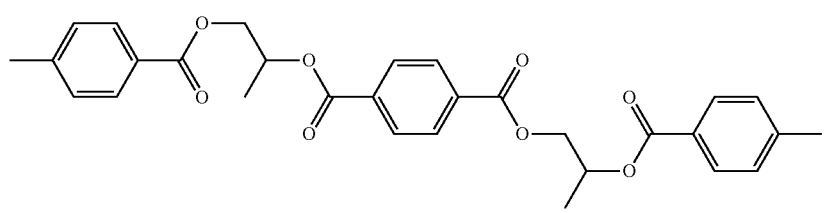
FB-15
Mw: 519
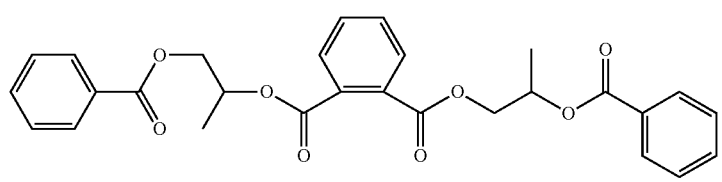
FB-16
Mw: 491
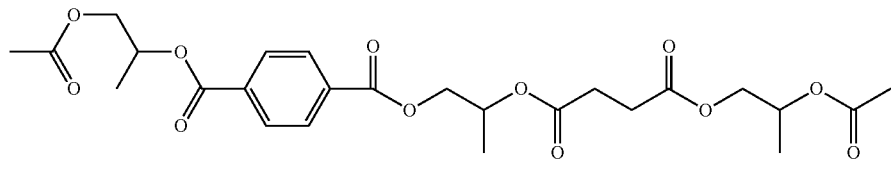
FB-17
Mw: 525

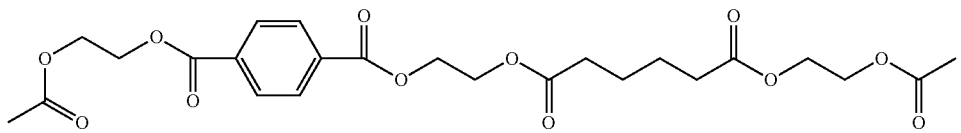

FB-18

Mw: 510

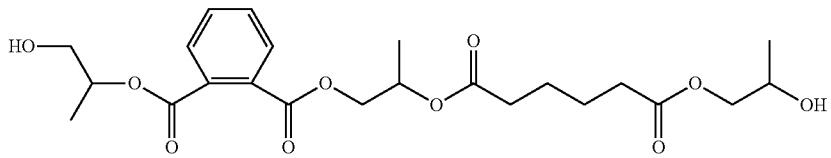

FB-19

Mw: 469

The optical film of the present invention preferably contains 0.1 to 30% by mass, and particularly 0.5 to 10% by mass, of the above sugar ester compound and the polyester-based compound, relative to the mass of the optical film.

<Phase Difference Generating Agent>

The optical film of the present invention preferably contains a phase difference generating agent, from the viewpoint of avoiding excessive stretching step, and suppressing the contrast-degrading factor ascribable to micro-crack (craze) or alignment of foreign matters in the film which possibly occurs in the process of stretching aimed at controlling phase difference.

Ratio of content of the phase difference generating agent is preferably 0.5 to 10% by mass, and more preferably 2 to 6% by mass. By using the phase difference generating agent, high potency of Ro expression is obtainable at low draw ratio. The phase difference generating agent is exemplified by those composed of discotic or rod-shaped (rod-like) compound, although not specifically limited. The discotic or rod-shaped compound having at least two aromatic rings is preferably used as the phase difference generating agent.

Amount of use of the discotic phase difference generating agent, per 100 parts by mass of the cellulose ester resin, is preferably 0.5 to 10 parts by mass, more preferably 1 to 8 parts by mass, and furthermore preferably 2 to 6 parts by mass.

Amount of addition of the phase difference generating agent composed of the rod-shaped compound, per 100 parts by mass of cellulose ester resin, is preferably 0.5 to 10 parts by mass, and more preferably 2 to 6 parts by mass.

Two or more species of the phase difference generating agent may be used in combination.

It is preferable that the phase difference generating agent has the maximum absorption in the wavelength range from 250 to 400 nm, and substantially has no absorption in the visible light region.

The discotic compound will be explained below. The discotic compound usable herein is a compound having at least two aromatic rings.

In the context of this specification, "aromatic ring" includes not only aromatic hydrocarbon ring, but also aromatic heterocycle.

The aromatic hydrocarbon ring is in particular preferably a six-membered ring (or, benzene ring).

The aromatic heterocycle is generally an unsaturated heterocycle. The aromatic heterocycle is preferably a five-membered ring, six-membered ring or seven-membered ring, and is more preferably a five-membered ring or six-membered ring. The aromatic heterocycle generally has the possibly maximum number of double bonds. The hetero atom is preferably nitrogen atom, oxygen atom and sulfur atom, wherein nitrogen atom is particularly preferable. Examples of the aromatic heterocycle include furan ring, thiophene ring, pyrrole ring, oxazole ring, isooxazole ring, thiazole ring, isothiazole ring, imidazole ring, pyrazole ring, furazan ring, triazole ring, pyran ring, pyridine ring, pyridazine ring, pyrimidine ring, pyrazine ring and 1,3,5-triazine ring.

The aromatic ring is preferably a benzene ring, condensed benzene ring, and biphenyls. In particular, 1,3,5-triazine ring is preferably used. More specifically, the compounds disclosed for example in JP-A-2001-166144 are preferably used.

The number of carbon atoms contained in the aromatic rings of the phase difference (retardation) generating agent is preferably 2 to 20, more preferably 2 to 12, furthermore preferably 2 to 8, and most preferably 2 to 6.

Mode of connection of two aromatic rings may be classified into (a) formation of a condensed ring, (b) direct connection via a single bond, and (c) connection via a linking group (spiro bond cannot be formed due to nature of the aromatic ring). The mode of connection may be any of (a) to (c).

Examples of the (a) condensed ring (condensed ring composed of two or more aromatic rings) include indene ring, naphthalene ring, azulene ring, fluorene ring, phenanthrene ring, anthracene ring, acenaphthylene ring, biphenylene ring, naphthacene ring, pyrene ring, indole ring, isoindole ring, benzofuran ring, benzothiophene ring, indolizine ring, benzoxazole ring, benzothiazole ring, benzoimidazole ring, benzotriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxathiin ring, pheoxazine ring and thianthrene ring. Naphthalene ring, azulene ring, indole ring, benzoxazole ring, benzothiazole ring, benzoimidazole ring, benzotriazole ring and quinoline ring are preferable.

The (b) single bond is preferably a bond between carbon atoms of two aromatic rings. Two or more single bonds may combine two aromatic rings so as to form in between an aliphatic ring or non-aromatic heterocycle.

Also the (c) linking group preferably combines carbon atoms of two aromatic rings. The linking group is preferably an alkylene group, alkenylene group, alkynylene group, —CO—, —O—, —NH—, —S— or combination of them.

Examples of combined linking group will be listed below. Note that the linking groups listed below are horizontally reversible. c1: —CO—O—, c2: —CO—NH—, c3: -alkylene-O—, c4: —NH—CO—NH—, c5: —NH—CO—O—, c6: —O—CO—O—, c7: —O-alkylene-O—, c8: —CO-alkenylene-, c9: —CO-alkenylene-NH—, c10: —CO-alkenylene-O—, c11: -alkylene-CO—O-alkylene-O—CO-alkylene-, c12: —O-alkylene-CO—O-alkylene-O—CO-alkylene-O—, c13: —O—CO-alkylene-CO—O—, c14: —NH—CO-alkenylene-, c15: —O—CO-alkenylene- Each of the aromatic ring and the linking group may have a substituent.

Examples of the substituent include halogen atom (F, Cl, Br, I), hydroxy group, carboxy group, cyano group, amino group, nitro group, sulfo group, carbamoyl group, sulfamoyl group, ureido group, alkyl group, alkenyl group, alkynyl group, aliphatic acyl group, aliphatic acyloxy group, alkoxy group, alkoxycarbonyl group, alkoxy carbonylamino group, alkylthio group, alkylsulfonyl group, aliphatic amide group, aliphatic sulfonamide group, aliphatic substituted amino group, aliphatic substituted carbamoyl group, aliphatic substituted sulfamoyl group, aliphatic substituted ureido group and non-aromatic heterocyclic group.

The alkyl group preferably has 1 to 8 carbon atoms. Chain-like alkyl group is preferred over cyclic alkyl group, wherein straight-chain alkyl group is particularly preferable. The alkyl group may have an additional substituent (for example, hydroxy group, carboxy group, alkoxy group, and alkyl-substituted amino group). Examples of the alkyl group (including substituted alkyl group) include methyl group, ethyl group, n-butyl group, n-hexyl group, 2-hydroxyethyl group, 4-carboxybutyl group, 2-methoxyethyl group and 2-diethyl aminoethyl group.

The alkenyl group preferably has 2 to 8 carbon atoms. Chain-like alkenyl group is preferred over cyclic alkenyl group, wherein straight-chain alkenyl group is particularly preferable. The alkenyl group may have an additional substituent. Examples of the alkenyl group include vinyl group, allyl group and 1-hexenyl group.

The alkynyl group preferably has 2 to 8 carbon atoms. Chain-like alkynyl group is preferred over cyclic alkynyl group, wherein straight-chain alkynyl group is particularly preferable. The alkynyl group may have an additional substituent. Examples of the alkynyl group include ethynyl group, 1-butynyl group and 1-hexynyl group.

The aliphatic acyl group preferably has 1 to 10 carbon atoms. Examples of the aliphatic acyl group include acetyl group, propanoyl group and butanoyl group.

The aliphatic acyloxy group preferably has 1 to 10 carbon atoms. Examples of the aliphatic acyloxy group include acetoxy group.

The alkoxy group preferably has 1 to 8 carbon atoms. The alkoxy group may have an additional substituent (for example, alkoxy group). Examples of the alkoxy group (including substituted alkoxy group) include methoxy group, ethoxy group, butoxy group and methoxyethoxy group.

The alkoxycarbonyl group preferably has 2 to 10 carbon atoms. Examples of the alkoxycarbonyl group include methoxycarbonyl group and ethoxycarbonyl group.

The alkoxycarbonylamino group preferably has 2 to 10 carbon atoms. Examples of the alkoxycarbonylamino group include methoxycarbonylamino group and ethoxycarbonylamino group.

The alkylthio group preferably has 1 to 12 carbon atoms. Examples of the alkylthio group include methylthio group, ethylthio group and octylthio group.

The alkylsulfonyl group preferably has 1 to 8 carbon atoms. Examples of the alkylsulfonyl group include methanesulfonyl group and ethanesulfonyl group.

The aliphatic amide group has 1 to 10 carbon atoms. Examples of the aliphatic amide group include acetoamido group.

The aliphatic sulfonamide group preferably has 1 to 8 carbon atoms. Examples of the aliphatic sulfonamide group include methanesulfonamide group, butanesulfonamide group and n-octane sulfonamide group.

The aliphatic substituted amino group preferably has 1 to 10 carbon atoms. Examples of the aliphatic substituted amino group include dimethylamino group, diethylamino group and 2-carboxyethylamino group.

The aliphatic substituted carbamoyl group preferably has 2 to 10 carbon atoms. Examples of the aliphatic substituted carbamoyl group include methylcarbamoyl group and diethylcarbamoyl group.

The aliphatic substituted sulfamoyl group preferably has 1 to 8 carbon atoms. Examples of the aliphatic substituted sulfamoyl group include methylsulfamoyl group and diethylsulfamoyl group.

The aliphatic substituted ureido group preferably has 2 to 10 carbon atoms. Examples of the aliphatic substituted ureido group include methylureido group.

Examples of the non-aromatic heterocyclic group include piperidino group and morpholino group.

The phase difference (retardation) generating agent preferably has a molecular weight of 300 to 800.

Triazine compound represented by the formula (I) below is preferably used as the discotic compound.

[Chemical Formula 10]

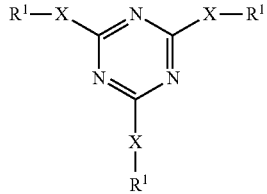

General formula (I)

In the formula (I), each $R^1$ independently represents an aromatic ring or heterocycle having substituent (s) at least at any one of ortho, meta and para positions.

Each X independently represents a single bond or $NR^2$—.

Each $R^2$ independently represents a hydrogen atom, substituted or non-substituted alkyl group, alkenyl group, aryl group or heterocyclic group.

The aromatic ring represented by $R^1$ is preferably a phenyl group or naphthyl group, wherein phenyl group is particularly preferable. The aromatic ring represented by $R^1$ may have at least one substituent at any position of substitution. Examples of the substituent include halogen atom, hydroxy group, cyano group, nitro group, carboxy group, alkyl group, alkenyl group, aryl group, alkoxy group, alkenyloxy group, aryloxy group, acyloxy group, alkoxycarbonyl group, alkenyloxycarbonyl group, aryloxycarbonyl group, sulfamoyl group, alkyl-substituted sulfamoyl group, alkenyl-substituted sulfamoyl group, aryl-substituted sulfamoyl group, sulfoamide group, carbamoyl group, alkyl-substituted carbamoyl group, alkenyl-substituted carbamoyl group, aryl-substituted carbamoyl group, amido group, alkylthio group, alkenylthio group, arylthio group and acyl group.

The heterocyclic group represented by $R^1$ preferably has aromaticity. The heterocycle having aromaticity is generally unsaturated heterocycle, and preferably heterocycle having a maximum number of double bonds. The heterocycle is preferably a five-membered ring, six-membered ring or seven-membered ring, more preferably a five-membered ring or six-membered ring, and most preferably a six-membered ring. Hetero atom in the heterocycle is preferably a nitrogen atom, sulfur atom or oxygen atom, and particularly a nitrogen atom. As the heterocycle having aromaticity, pyridine ring (2-pyridyl or 4-pyridyl as the heterocyclic group) is particularly preferable. The heterocyclic group may have a substituent. Examples of the substituent on the heterocyclic group are same as those of substituent on the aryl moiety described above.

The heterocyclic group when X represents a single bond is preferably a heterocyclic group having a free valency on the nitrogen atom. The heterocyclic group having a free valency on the nitrogen atom is preferably a five-membered ring, six-membered ring or seven-membered ring, more preferably a five-membered ring or six-membered ring, and most preferably a five-membered ring. The heterocyclic group may have a plurality of nitrogen atoms. The heterocyclic group may have a hetero atom (for example, O, S) other than nitrogen atom. Examples of the heterocyclic group having a free valency on the nitrogen atom will be listed below.

The alkyl group represented by $R^2$ may be a cyclic alkyl group or may be a chain alkyl group, and chain alkyl group is preferable. The straight-chain alkyl group is preferred over the branched chain alkyl group.

The number of carbon atoms of the alkyl group is preferably 1 to 30, more preferably 1 to 20, more preferably 1 to 10, furthermore preferably 1 to 8, and most preferably 1 to 6. The alkyl group may have a substituent. Examples of the substituent include halogen atom, alkoxy group (for example, methoxy group, ethoxy group), and acyloxy group (for example, acryloyloxy group, methacryloyloxy group).

The alkenyl group represented by $R^2$ may be a cyclic alkenyl group or may be a chain alkenyl group, and is preferably a chain alkenyl group, wherein straight-chain alkenyl group is preferred over branched chain alkenyl group. The number of carbon atoms of the alkenyl group is preferably 2 to 30, more preferably 2 to 20, more preferably 2 to 10, furthermore preferably 2 to 8, and most preferably 2 to 6. The alkenyl group may have a substituent. Examples of the substituent are same as those of the alkyl group described above.

The aromatic ring group and heterocyclic group represented by $R^2$ are same as the aromatic ring and heterocycle represented by $R^1$, with the same preferable ranges. The aromatic ring group and the heterocyclic group may have a substituent. Examples of the substituent are same as those on the aromatic ring and the heterocycle represented by $R^1$.

Specific examples of the compound represented by the general formula (I) will be listed below, but not limited thereto.

[Chemical Formula 11]

[Chemical Formula 12]

I-(1)

I-(2)

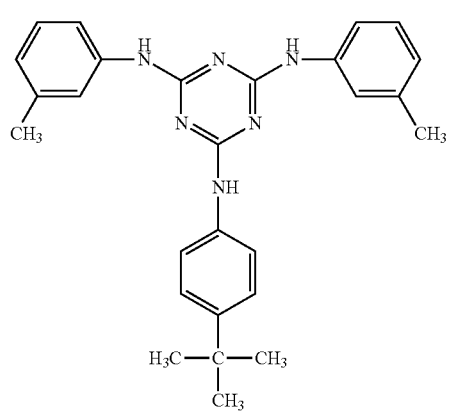
I-(3)
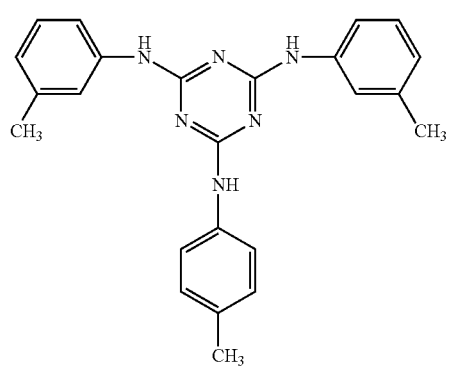
I-(4)
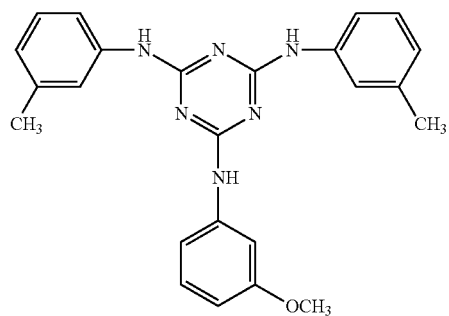
I-(5)
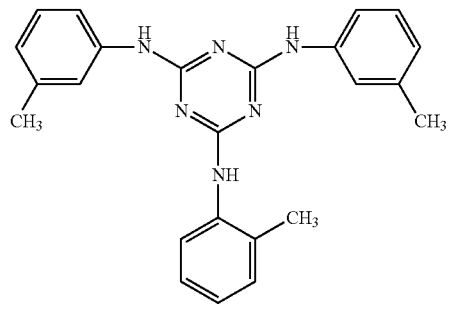
I-(6)
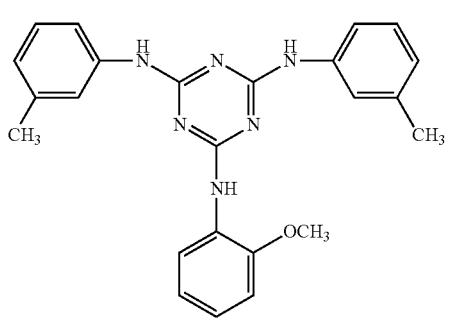
I-(7)
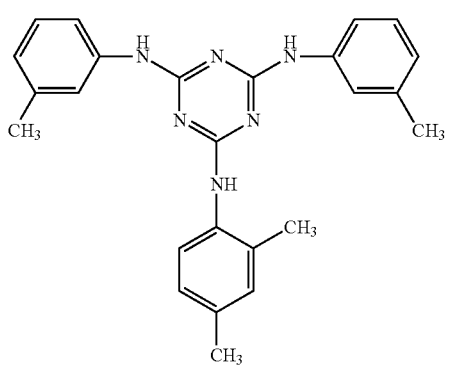
I-(8)
[Chemical Formula 13]
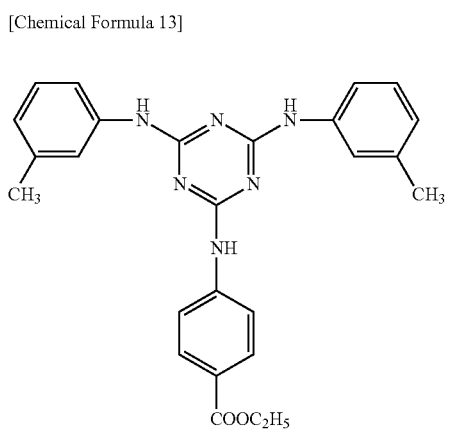
I-(9)
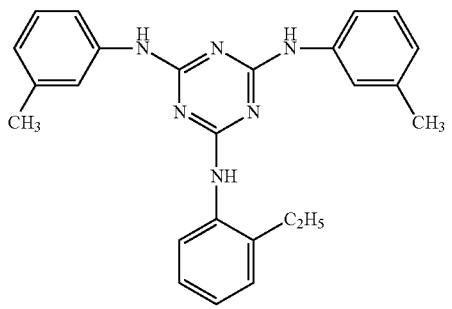
I-(10)

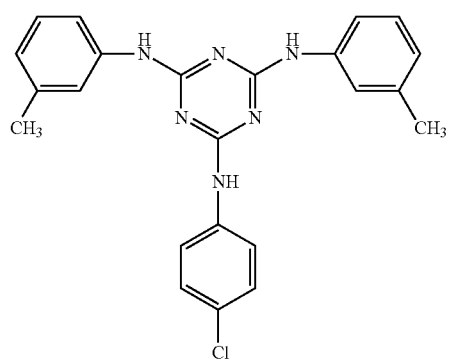
I-(11)
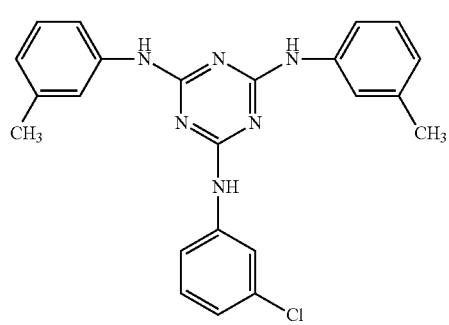
I-(12)
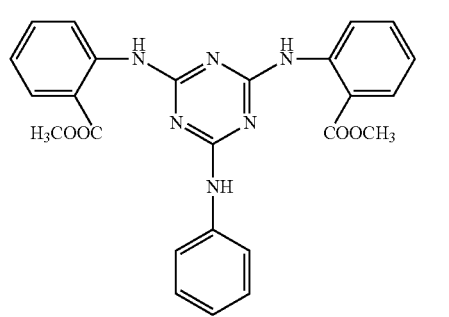
I-(13)
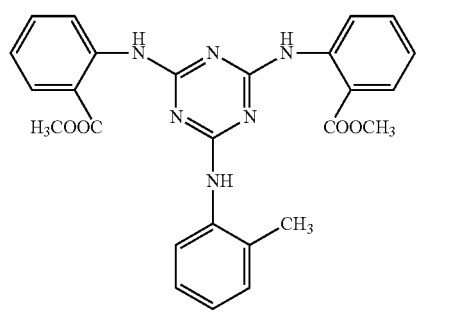
I-(14)
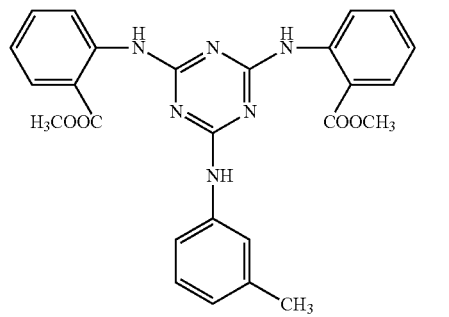
I-(15)
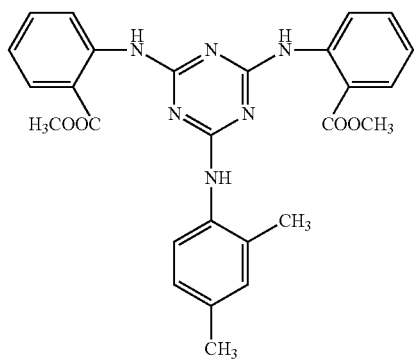
I-(16)
[Chemical Formula 14]
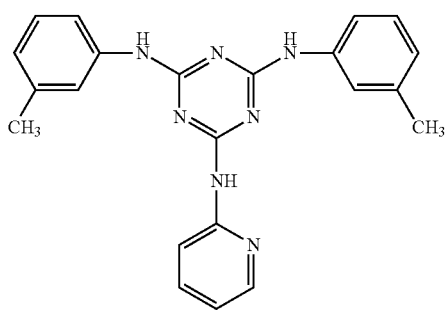
I-(17)
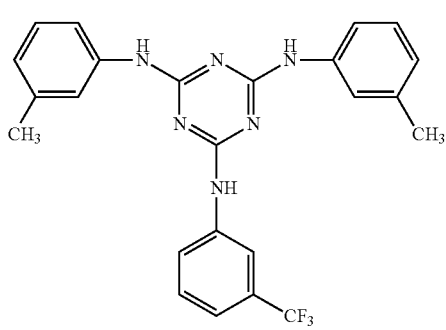
I-(18)
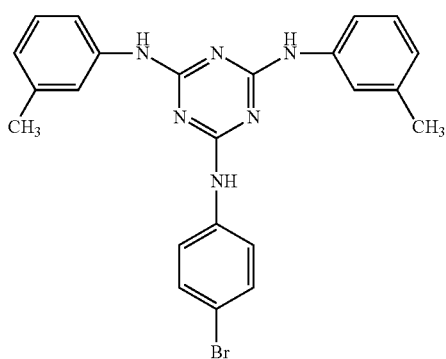
I-(19)

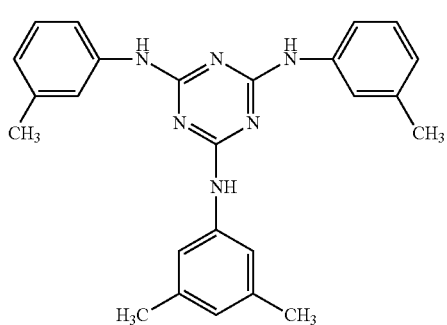
I-(20)
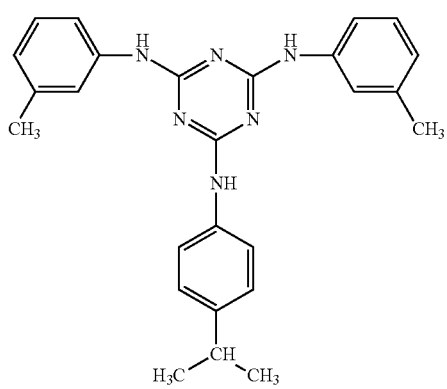
I-(21)
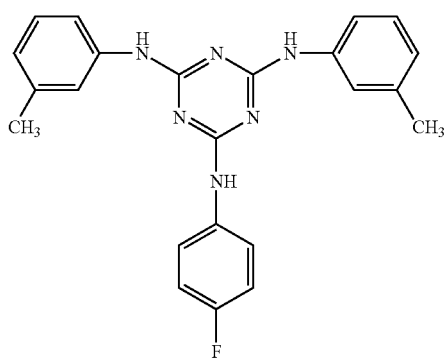
I-(22)
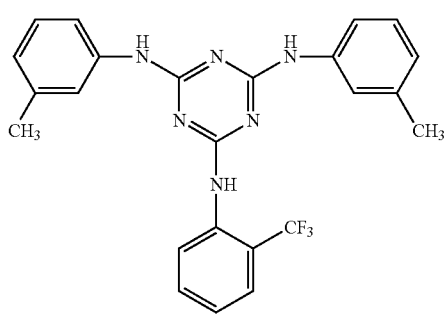
I-(23)
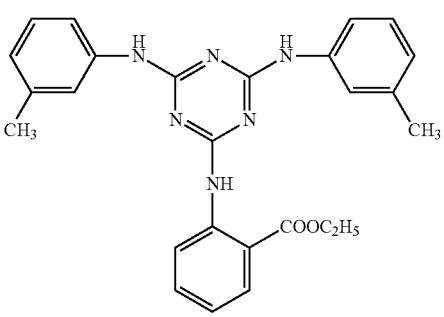
I-(24)
[Chemical Formula 15]
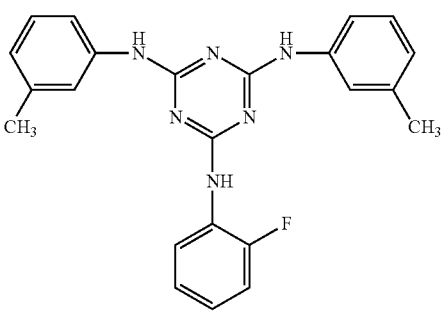
I-(25)
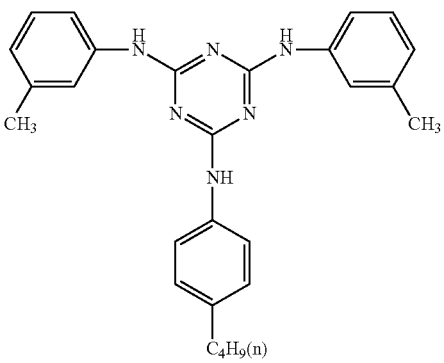
I-(26)
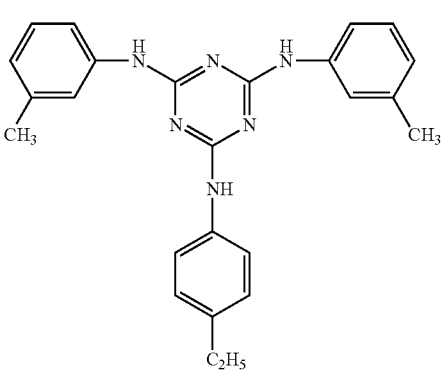
I-(27)

I-(28)
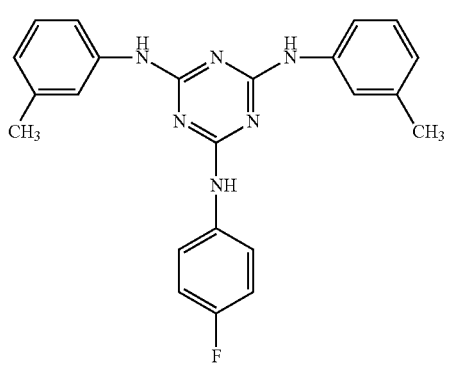
I-(29)
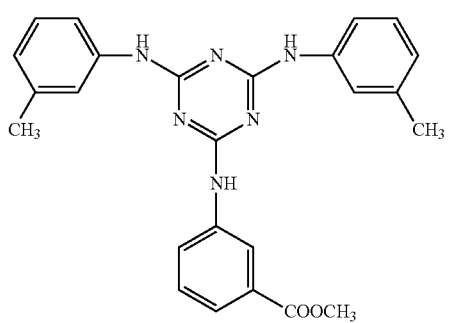
I-(30)
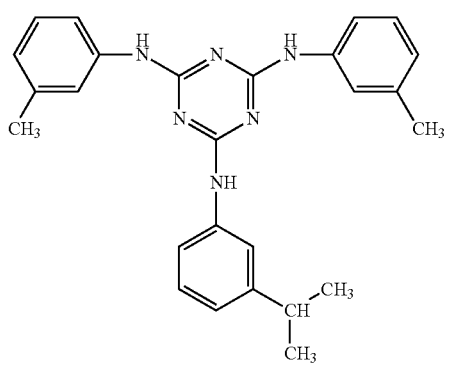
I-(31)
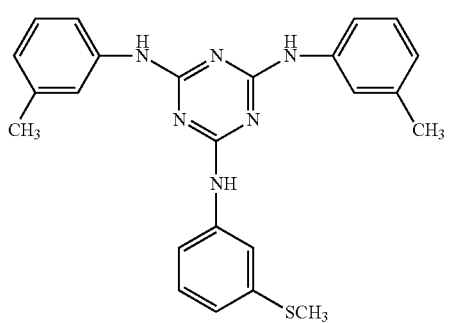
I-(32)
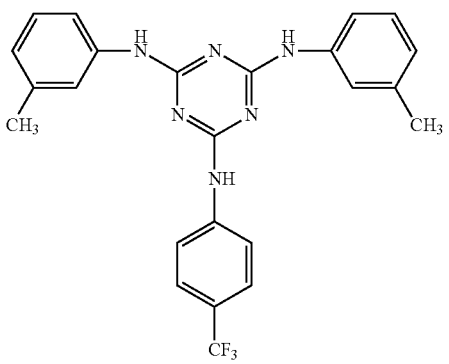
[Chemical Formula 16]
I-(33)
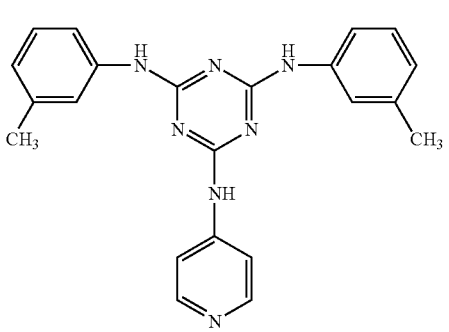
I-(34)
I-(35)
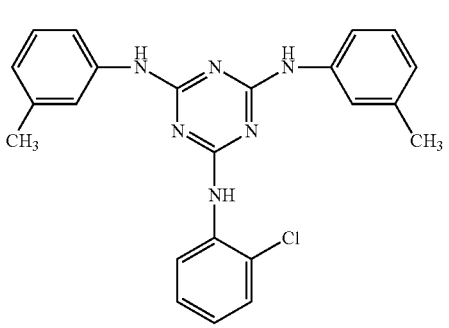

I-(36)
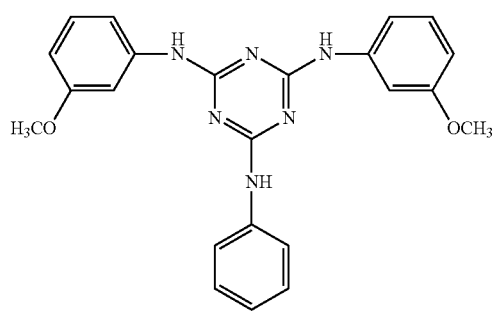
I-(37)
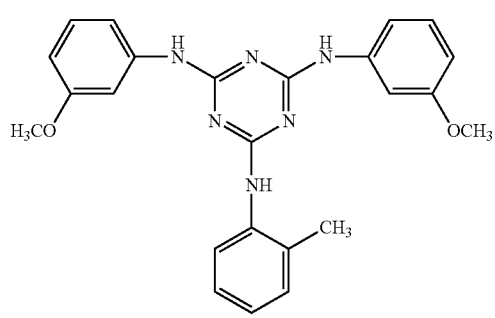
I-(38)
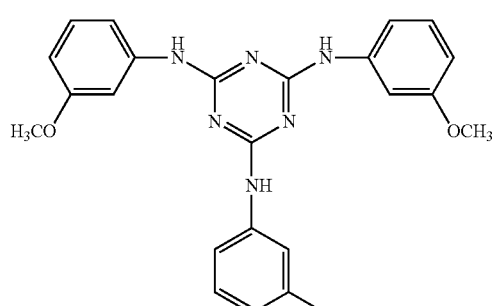
I-(39)
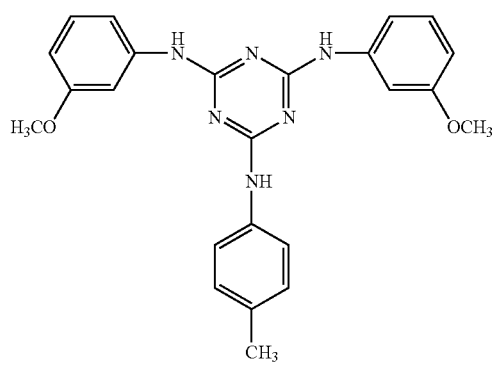
I-(40)
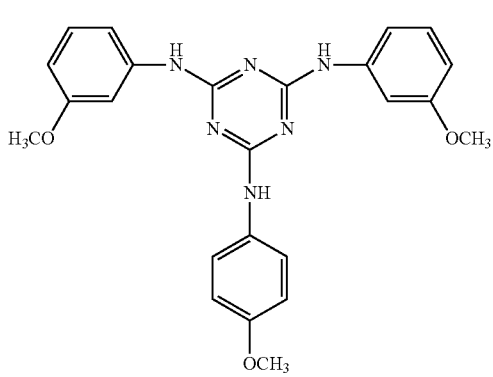
[Chemical Formula 17]
I-(41)
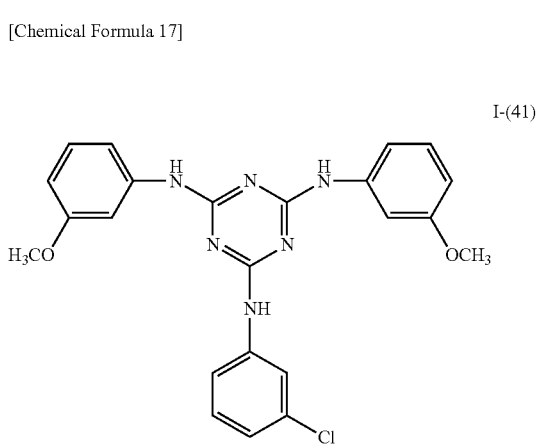
I-(42)
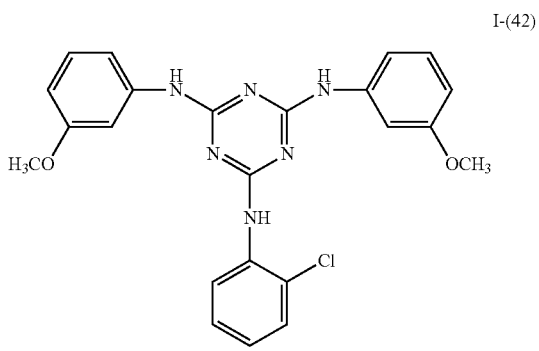
I-(43)
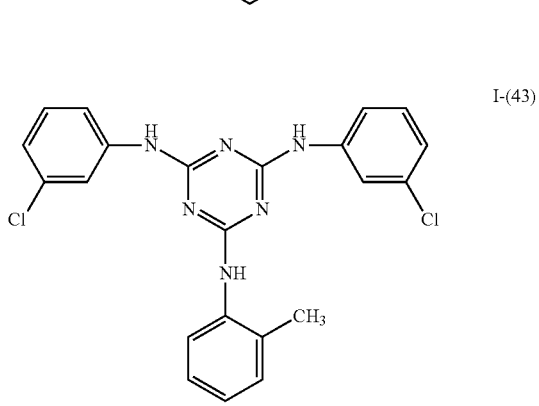

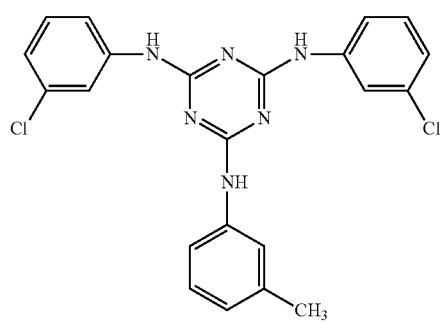
I-(44)
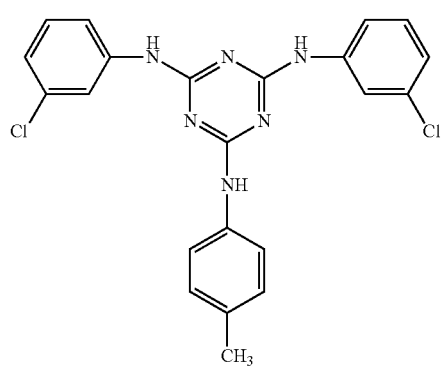
I-(45)
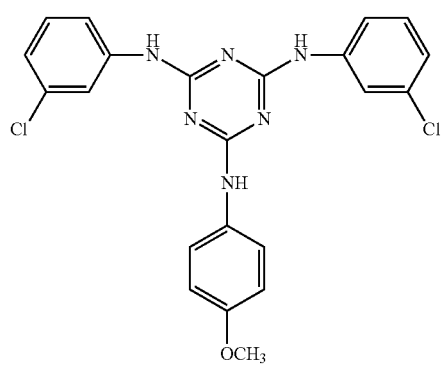
I-(46)
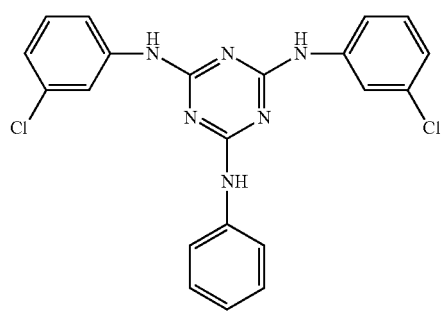
I-(47)
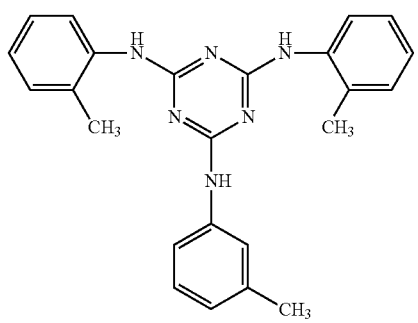
I-(48)
[Chemical Formula 18]
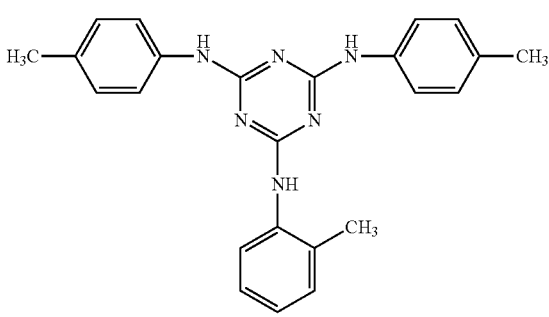
I-(49)
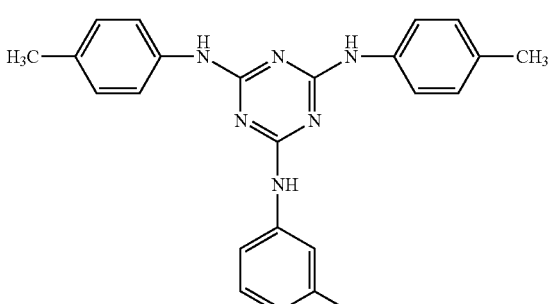
I-(50)
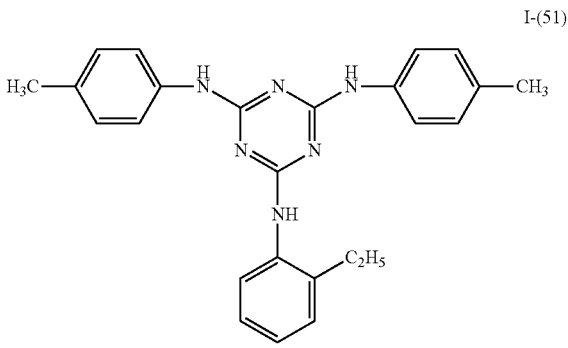
I-(51)

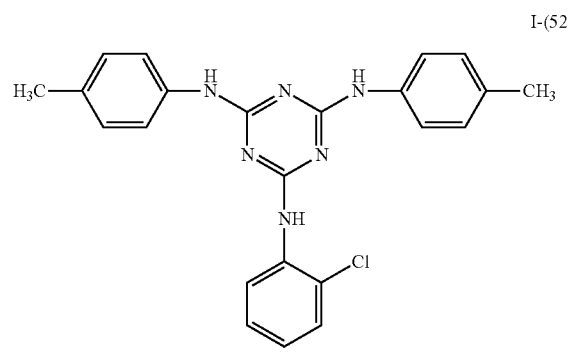
I-(52)
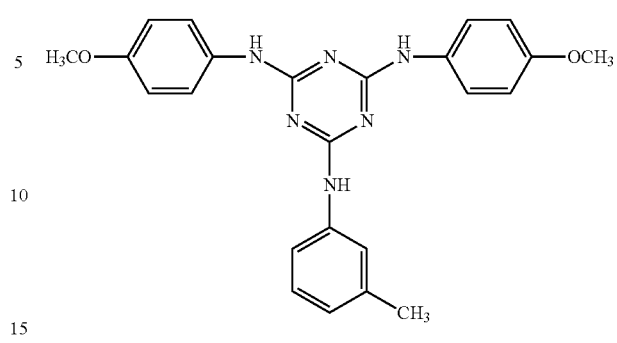
I-(56)
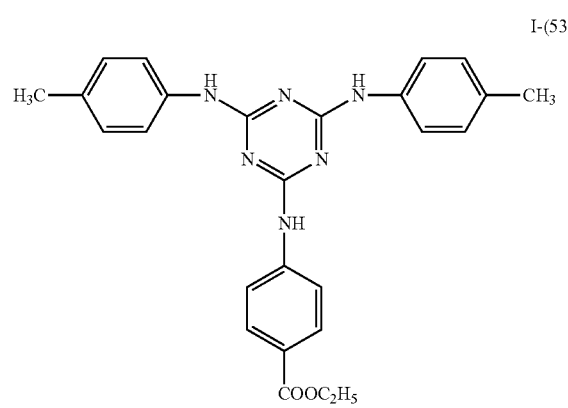
I-(53)
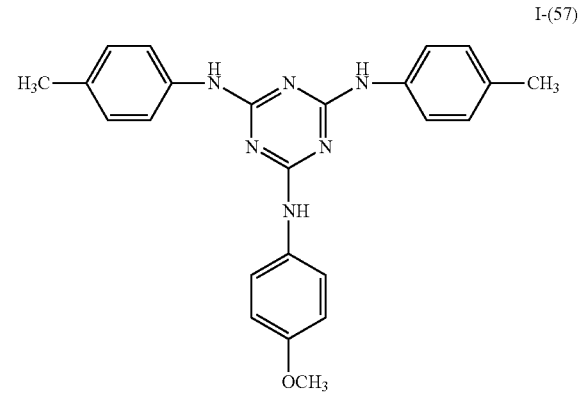
I-(57)
[Chemical Formula 20]
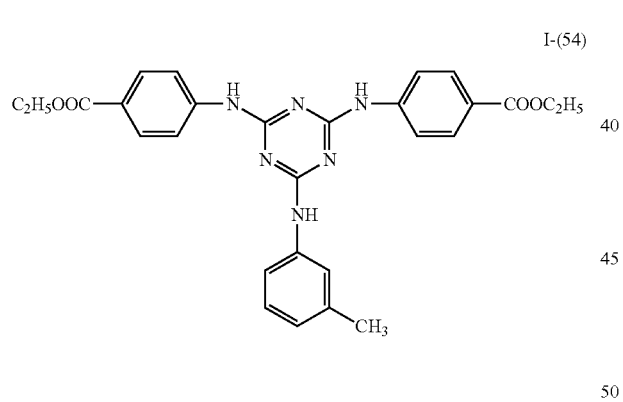
I-(54)
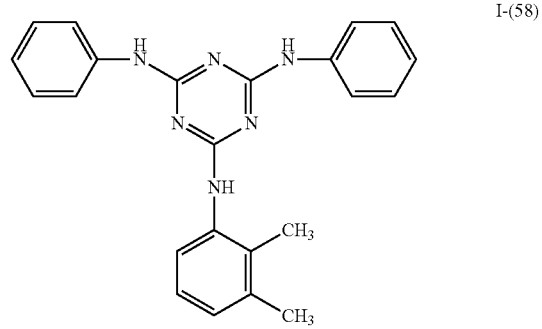
I-(58)
[Chemical Formula 19]
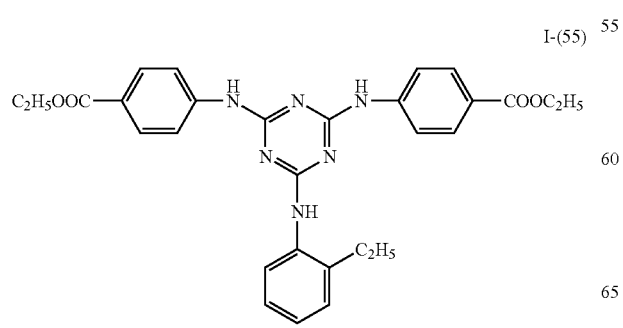
I-(55)
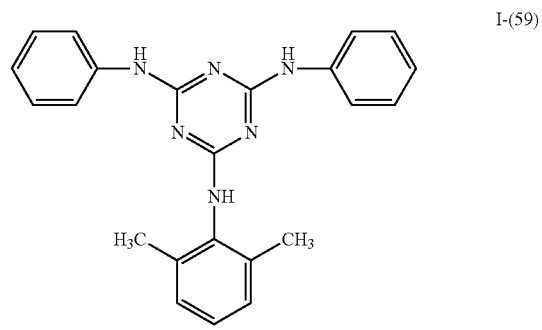
I-(59)

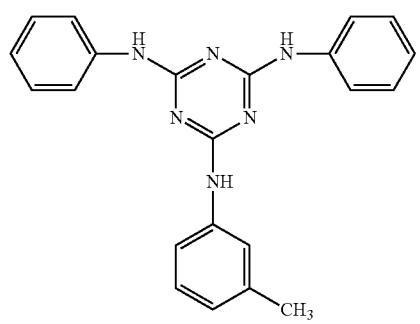 I-(60)
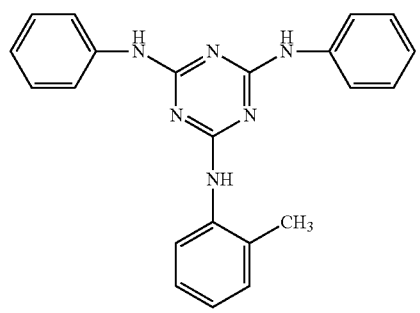 I-(61)
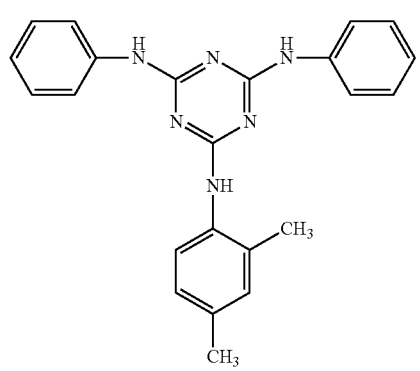 I-(62)
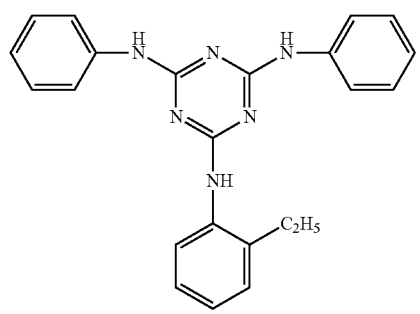 I-(63)
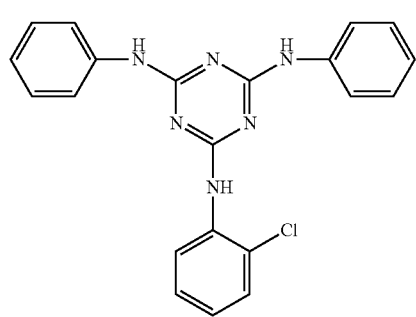 I-(64)
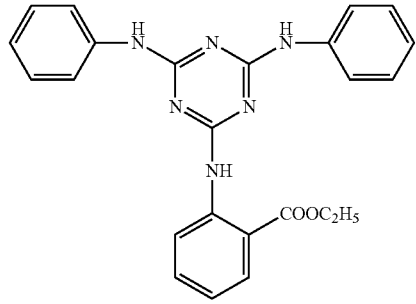 I-(65)
[Chemical Formula 21]
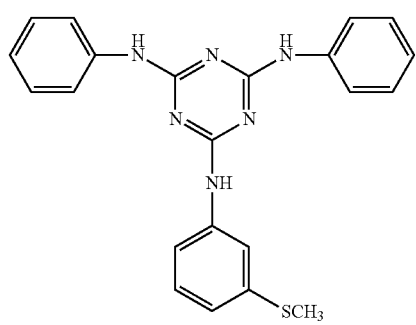 I-(66)
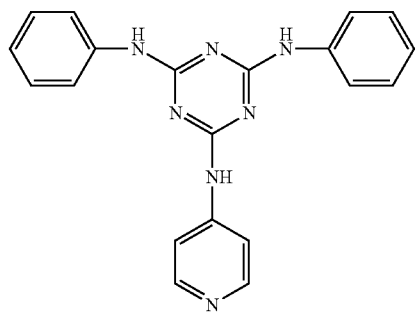 I-(67)
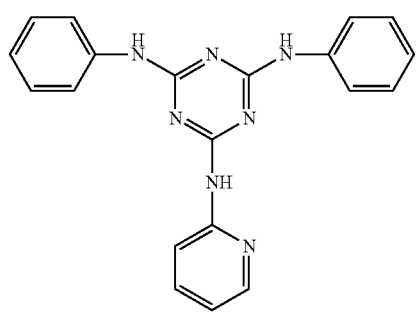 I-(68)
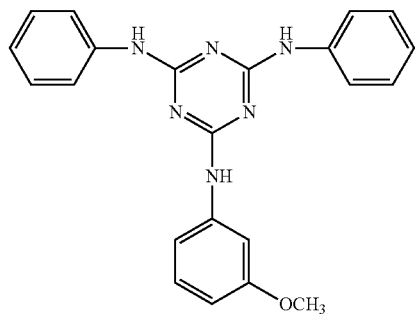 I-(69)

-continued
[Chemical Formula 22]
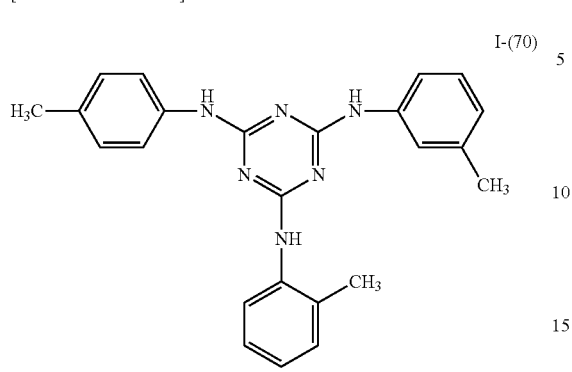
I-(70)
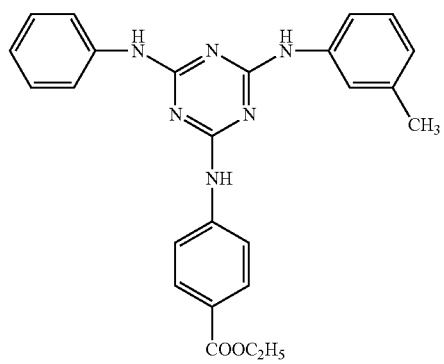
I-(74)
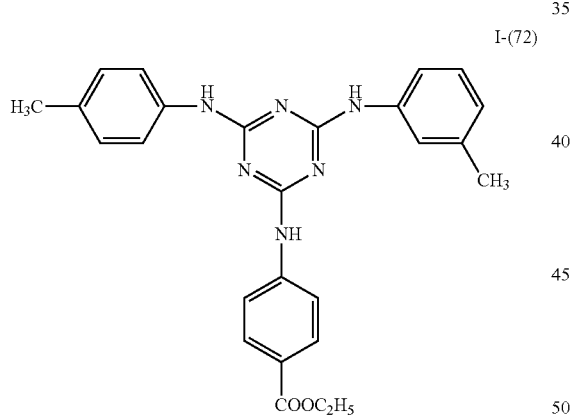
I-(71)
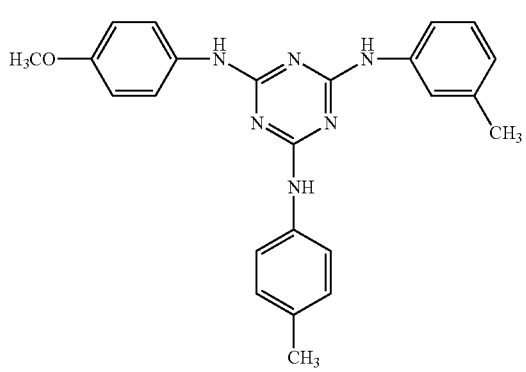
I-(75)
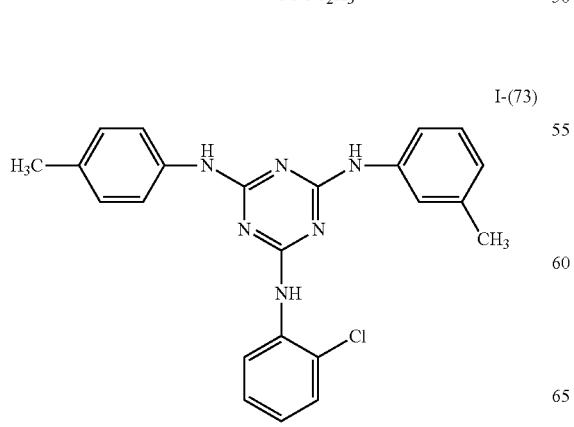
I-(72)
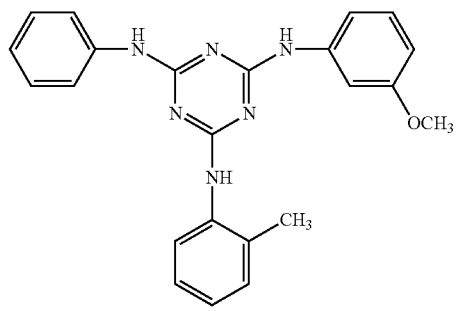
I-(76)
I-(73)
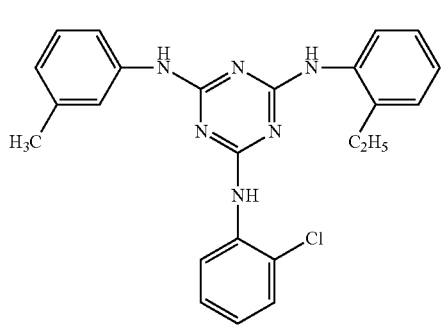
I-(77)
As the discotic compound, also a triphenylene compound represented by the general formula (II) below may preferably be used.

[Chemical Formula 23]

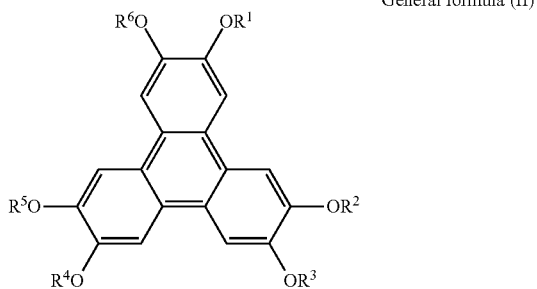

General formula (II)

In the general formula (II), each of $R^1$, $R^2$, $R^3$, $R^4$, $R^5$ and $R^6$ independently represents a hydrogen atom or substituent.

Examples of the substituent independently represented by each of $R^1$, $R^2$, $R^3$, $R^4$, $R^5$ and $R^6$ include alkyl group (preferably $C_{1-40}$, more preferably $C_{1-30}$, particularly $C_{1-20}$ alkyl group, exemplified by methyl group, ethyl group, isopropyl group, tert-butyl group, n-octyl group, n-decyl group, n-hexadecyl group, cyclopropyl group, cyclopentyl group and cyclohexyl group), alkenyl group (preferably, $C_{2-40}$, more preferably $C_{2-30}$, particularly $C_{2-20}$ alkenyl group, exemplified by vinyl group, allyl group, 2-butenyl group and 3-pentenyl group), alkynyl group (preferably $C_{2-40}$, more preferably $C_{2-30}$, particularly $C_{2-20}$ alkynyl group, exemplified by propargyl group and 3-pentynyl group), aryl group (preferably $C_{6-30}$, more preferably $C_{6-20}$, particularly $C_{6-12}$ aryl group, exemplified by phenyl group, p-methylphenyl group and naphthyl group), substituted or non-substituted amino group (preferably $C_{0-40}$, more preferably $C_{0-30}$, particularly $C_{0-20}$ amino group, exemplified by non-substituted amino group, methylamino group, dimethylamino group, diethylamino group and anilino group), alkoxy group (preferably $C_{1-40}$, more preferably $C_{1-30}$, particularly $C_{1-20}$ alkoxy group, exemplified by methoxy group, ethoxy group and butoxy group), aryloxy group (preferably $C_{6-40}$, more preferably $C_{6-30}$, particularly $C_{6-20}$ aryl oxy group, exemplified by phenyloxy group and 2-naphthyloxy group), acyl group (preferably $C_{1-40}$, more preferably $C_{1-30}$, particularly $C_{4-20}$ acyl group, exemplified of acetyl group, benzoyl group, formyl group, pivaloyl group), alkoxycarbonyl group (preferably $C_{2-40}$, more preferably $C_{2-30}$, particularly $C_{2-20}$ alkoxycarbonyl group, exemplified by methoxycarbonyl group and ethoxycarbonyl group), aryloxycarbonyl group (preferably $C_{7-40}$, more preferably $C_{7-30}$, particularly $C_{7-20}$ aryloxycarbonyl group, exemplified by phenyloxycarbonyl group), acyloxy group (preferably $C_{2-40}$, more preferably $C_{2-30}$, particularly $C_{2-20}$ acyloxy group, exemplified by acetoxy group and benzoyloxy group), acylamino group (preferably $C_{2-40}$, more preferably $C_{2-30}$, particularly $C_{2-20}$ acylamino group, exemplified by acetylamino group and benzoylamino group), alkoxycarbonylamino group (preferably $C_{2-40}$, more preferably $C_{2-30}$, particularly $C_{2-20}$ alkoxycarbonylamino group, exemplified by methoxycarbonylamino group), aryloxycarbonylamino group (preferably $C_{7-40}$, more preferably $C_{7-30}$, particularly $C_{7-20}$ aryloxycarbonylamino group, exemplified by phenyloxycarbonylamino group), sulfonylamino group (preferably $C_{1-40}$, more preferably $C_{1-30}$, particularly $C_{1-20}$ sulfonylamino group, exemplified by methanesulfonylamino group and benzenesulfonylamino group), sulfamoyl group (preferably $C_{0-40}$, more preferably $C_{0-30}$, particularly $C_{0-20}$ sulfamoyl group, exemplified by sulfamoyl group, methylsulfamoyl group, dimethylsulfamoyl group and phenylsulfamoyl group), carbamoyl group (preferably $C_{1-40}$, more preferably $C_{1-30}$, particularly $C_{1-20}$ carbamoyl group, exemplified by non-substituted carbamoyl group, methylcarbamoyl group, diethylcarbamoyl group and phenylcarbamoyl group), alkylthio group (preferably $C_{1-40}$, more preferably $C_{1-30}$, particularly $C_{1-20}$, exemplified by methylthio group, ethylthio group, propylthio group, butylthio group, pentylthio group, hexylthio group, heptylthio group and octylthio group), arylthio group (preferably, $C_{6-40}$, more preferably $C_{6-30}$, particularly $C_{1-20}$, exemplified by phenylthio group), sulfonyl group (preferably $C_{1-40}$, more preferably $C_{1-30}$, particularly $C_{1-20}$ sulfonyl group, exemplified by mesyl group and tosyl group), sulfinyl group (preferably $C_{1-40}$, more preferably $C_{1-30}$, particularly $C_{1-20}$ sulfinyl group, exemplified by methanesulfinyl group and benzenesulfinyl group), ureido group (preferably $C_{1-40}$, more preferably $C_{1-30}$, particularly $C_{1-20}$ ureido group, exemplified by non-substituted ureido group, methylureido group, phenylureido group), phosphoric amide group (preferably $C_{1-40}$, more preferably $C_{1-30}$, particularly $C_{1-20}$ phosphoric amide group, exemplified by diethylphosphoric amide group, phenylphosphoric amide group), hydroxy group, mercapto group, halogen atom (exemplified by fluorine atom, chlorine atom, bromine atom and iodine atom), cyano group, sulfo group, carboxy group, nitro group, hydroxamic acid group, sulfino group, hydrazino group, imino group, heterocyclic group (preferably $C_{1-30}$, more preferably $C_{1-12}$ heterocyclic group, heterocyclic group having a hetero atom such as nitrogen atom, oxygen atom or sulfur atom, exemplified by imidazolyl group, pyridyl group, quinolyl group, furyl group, piperidyl group, morpholino group, benzoxazolyl group, benzimidazolyl group, benzthiazolyl group and 1,3,5-triazyl group), and silyl group (preferably, $C_{3-40}$, more preferably $C_{3-30}$, particularly, $C_{3-24}$ silyl group, exemplified by trimethyl silyl group and triphenyl silyl group). These substituents may further be substituted by these substituents. When the compound has two or more substituents, the substituents may be same or different. The substituents may combine to form a ring if possible.

The substituent independently represented by each of $R^1$, $R^2$, $R^3$, $R^4$, $R^5$ and $R^6$ is preferably an alkyl group, aryl group, substituted or non-substituted amino group, alkoxy group, alkylthio group or halogen atom.

Specific examples of compound represented by the general formula (II) will be listed below, but not limited thereto.

[Chemical Formula 24]

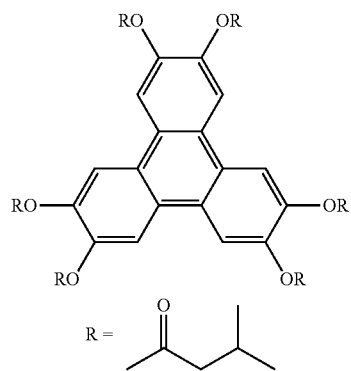

V-1

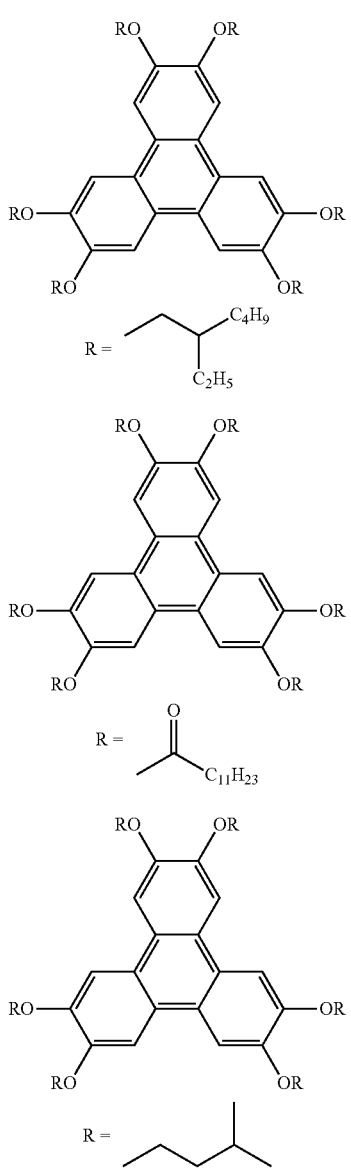
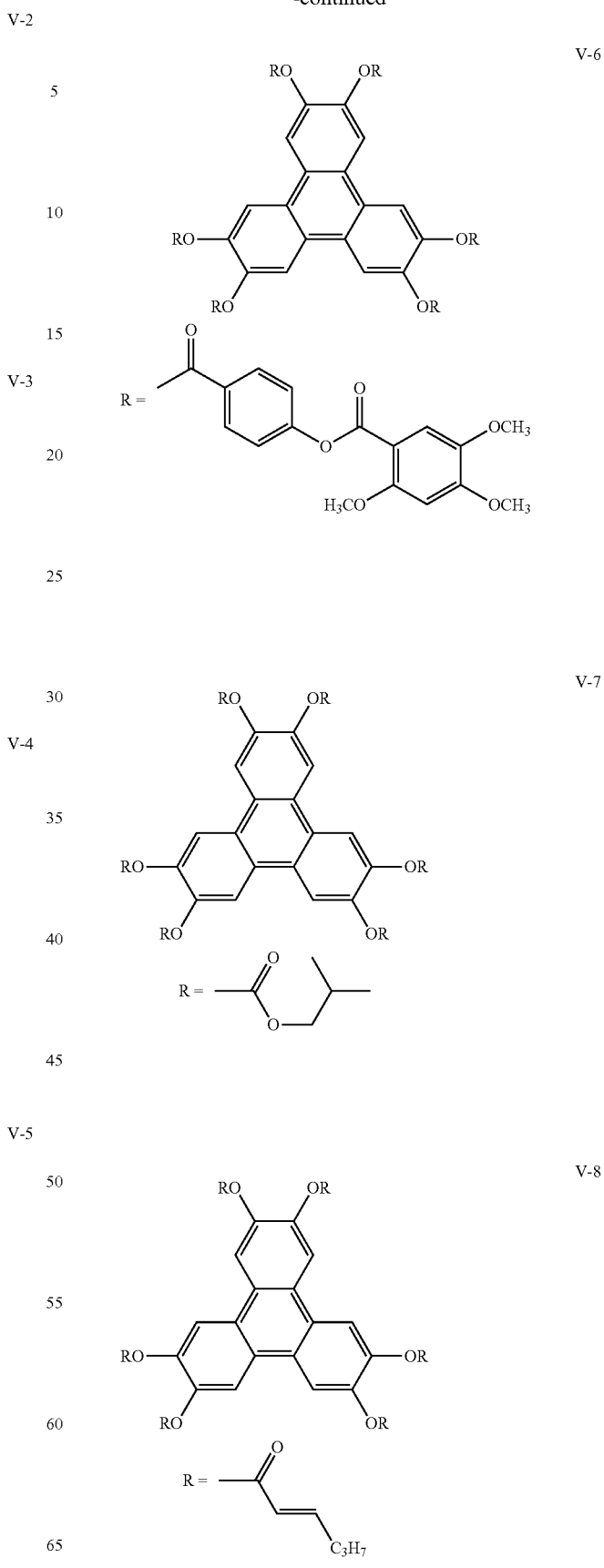

[Chemical Formula 26]

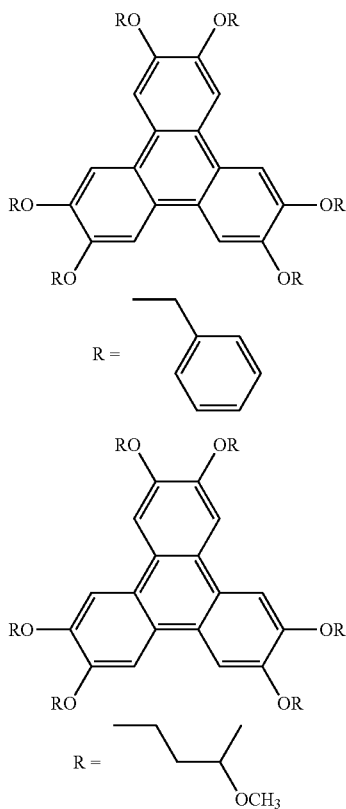

V-9

V-10

The compound represented by the general formula (I) may be synthesized by any of publicly known methods, such as by a method described in JP-A-2003-344655, and the compound represented by the general formula (II) may be synthesized by, for example, a method described in JP-A-2005-134884.

In the present invention, rod-shaped compound which has a straight molecular structure may preferably be used. The straight molecular structure herein means that the molecular structure of the rod-shaped compound is straight in its most thermodynamically stable structure. The most thermodynamically stable structure may be determined by crystallographic analysis or molecular orbital calculation. For example, a structure of molecule minimized in the heat of generation thereof may be determined by molecular orbital calculation using molecular orbital calculation software (for example, WinMOPAC2000, from Fujitsu Ltd.). What is meant by "molecular structure is straight" is that the principal chain in the molecular structure forms an angle of 140° or larger in its most thermodynamically stable structure determined by the calculation described above.

The rod-shaped compound having at least two aromatic rings is preferably a compound represented by the general formula (III) below.

$Ar_1-L_1-Ar_2$    General formula (III)

In the formula (III), each of $Ar_1$ and $Ar_2$ independently represents an aromatic group. In this specification, the aromatic group includes aryl group (aromatic hydrocarbon group), substituted aryl group, aromatic heterocyclic group and substituted aromatic heterocyclic group.

The aryl group and substituted aryl group are preferred over aromatic heterocyclic group and substituted aromatic heterocyclic group. The heterocycle of the aromatic heterocyclic group is generally unsaturated. The aromatic heterocycle is preferably a five-membered ring, six-membered ring or seven-membered ring, and more preferably a five-membered ring or six-membered ring. The aromatic heterocycle generally has the possibly maximum number of double bonds. The hetero atom is preferably a nitrogen atom, oxygen atom or sulfur atom, and is more preferably a nitrogen atom or sulfur atom.

The aromatic ring in the aromatic group is preferably a benzene ring, furan ring, thiophene ring, pyrrole ring, oxazole ring, triazole ring, imidazole ring, triazole ring, pyridine ring, pyrimidine ring or pyrazine ring. Benzene ring is particularly preferable.

Examples of substituents on the substituted aryl group and substituted aromatic heterocyclic group include halogen atom (F, Cl, Br, I), hydroxy group, carboxy group, cyano group, amino group, alkylamino group (for example, methylamino group, ethylamino group, butylamino group and dimethylamino group), nitro group, sulfo group, carbamoyl group, alkylcarbamoyl group (for example, N-methylcarbamoyl group, N-ethylcarbamoyl group, and N,N-dimethylcarbamoyl group), sulfamoyl group, alkylsulfamoyl group (for example, N-methylsulfamoyl group, N-ethylsulfamoyl group and N,N-dimethylsulfamoyl group), ureido group, alkylureido group (for example, N-methylureido group, N,N-dimethylureido group and N,N,N'-trimethylureido group), alkyl group (for example, methyl group, ethyl group, propyl group, butyl group, pentyl group, heptyl group, octyl group, isopropyl group, s-butyl group, tert-amyl group, cyclohexyl group and cyclopentyl group), alkenyl group (for example, vinyl group, allyl group and hexenyl group), alkynyl group (for example, ethynyl group and butynyl group), acyl group (for example, formyl group, acetyl group, butylyl group, hexanoyl group and lauryl group), acyloxy group (for example, acetoxy group, butylyloxy group, hexanoyloxy group and lauryloxy group), alkoxy group (for example, methoxy group, ethoxy group, propoxy group, butoxy group, pentyloxy group, heptyloxy group and octyloxy group), aryloxy group (for example, phenoxy group), alkoxycarbonyl group (for example, methoxycarbonyl group, ethoxycarbonyl group, propoxycarbonyl group, butoxycarbonyl group, pentyloxycarbonyl group and heptyloxycarbonyl group), aryloxycarbonyl group (for example, phenoxycarbonyl group), alkoxycarbonylamino group (for example, butoxycarbonylamino group, hexyloxycarbonylamino group), alkylthio group (for example, methylthio group, ethylthio group, propylthio group, butylthio group, pentylthio group, heptylthio group and octylthio group), arylthio group (for example, phenylthio group), alkylsulfonyl group (for example, methylsulfonyl group, ethylsulfonyl group, propylsulfonyl group, butylsulfonyl group, pentylsulfonyl group, heptylsulfonyl group and octylsulfonyl group), amide group (for example, acetamide group, butylamide group, hexylamide group and laurylamide group), and non-aromatic heterocyclic group (for example, morphoryl group and pyradinyl group).

Among them, preferable examples of the substituent include halogen atom, cyano group, carboxy group, hydroxy group, amino group, alkylamino group, acyl group, acyloxy group, amide group, alkoxycarbonyl group, alkoxy group, alkylthio group and alkyl group.

Alkyl moieties of the alkylamino group, alkoxycarbonyl group, alkoxy group and alkylthio group, and the alkyl group may have an additional substituent. Examples of the substituents substitutable on the alkyl moiety and alkyl group include halogen atom, hydroxy group, carboxy group, cyano group, amino group, alkylamino group, nitro group, sulfo group, carbamoyl group, alkylcarbamoyl group, sulfamoyl group, alkylsulfamoyl group, ureido group, alkylureido group, alkenyl group, alkynyl group, acyl group, acyloxy group, alkoxy group, aryl oxy group, alkoxycarbonyl group, aryl oxycarbonyl group, alkoxycarbonylamino group, alkylthio group, arylthio group, alkylsulfonyl group, amide group and non-aromatic heterocyclic group. Examples of substituent substitutable on the alkyl moieties and the alkyl group include halogen atom, hydroxy group, amino group, alkylamino group, acyl group, acyloxy group, acyl amino group, alkoxycarbonyl group and alkoxy group.

In the general formula (III), $L_1$ represents a divalent linking group selected from the group consisting of alkylene group, alkenylene group, alkynylene group, —O—, —CO— and combinations of them.

The alkylene group may have a cyclic structure. The cyclic alkylene group is preferably a cyclohexylene, and particularly 1,4-cyclohexylene. Chain alkylene group is preferably a straight chain alkylene group, rather than a branched alkylene group.

The number of carbon atoms of the alkylene group is preferably 1 to 20, more preferably 1 to 15, more preferably 1 to 10, furthermore preferably 1 to 8, and most preferably 1 to 6.

The alkenylene group and the alkynylene group preferably has a chain structure rather than a cyclic structure, and preferably has a straight chain structure rather than a branched chain structure.

The number of carbon atoms of the alkenylene group and the alkynylene group is preferably 2 to 10, more preferably 2 to 8, more preferably 2 to 6, furthermore preferably 2 to 4, and most preferably 2-(vinylene, or ethynylene) group.

The number of carbon atoms of arylene group is preferably 6 to 20, more preferably 6 to 16, and furthermore preferably 6 to 12.

In the molecular structure represented by the formula (III), the angle formed between $Ar_1$ and $Ar_2$, while placing $L_1$ in between, is preferably 140° or larger.

The rod-shaped compound is more preferably represented by the general formula (IV) below.

$Ar_1$-$L_2$-X-$L_3$-$Ar_2$  General formula (IV)

In the general formula (IV), each of $Ar_1$ and $Ar_2$ independently represents an aromatic group. Definition and examples of the aromatic group are same as those for $Ar_1$ and $Ar_2$ in the general formula (III).

In the formula (IV), each of $L_2$ and $L_3$ independently represents a divalent linking group selected from the group consisting of alkylene group, —O—, —CO— and combinations of them.

The alkylene group preferably has a chain structure rather than a cyclic structure, and more preferably has a straight chain structure rather than a branched chain structure.

The number of carbon atoms of the alkylene group is preferably 1 to 10, more preferably 1 to 8, more preferably 1 to 6, furthermore preferably 1 to 4, and most preferably 1 or 2 (methylene group or ethylene group).

Each of $L_2$ and $L_3$ is in particular preferably —O—CO— or CO—O—.

In the formula (IV), X represents a 1,4-cyclohexylene group, vinylene group or ethynylene group.

Specific examples of compound represented by the formula (III) or (IV) include those represented by [Chemical Formula 1] to [Chemical Formula 11] in JP-A-2004-109657.

Two or more rod-shaped compounds showing maximum absorption wavelength (λmax) of 250 nm or longer, when measured by ultraviolet absorption spectrometry in the state of solution, may be used in combination.

The rod-shaped compound may be synthesized according to methods described in literatures. Examples of the literature include *Mol. Cryst. Liq. Cryst., Vol.* 53, p. 229 (1979); ibid. Vol. 89, p. 93 (1982); ibid. Vol. 145, p. 111 (1987); ibid. Vol. 170, p. 43 (1989), *J. Am. Chem. Soc., Vol.* 113, p. 1349 (1991); ibid. Vol. 118, p. 5346 (1996); ibid. Vol. 92, p. 1582 (1970); *J. Org. Chem., Vol.* 40, p. 420 (1975); and *Tetrahedron*, Vol. 48, No. 16, p. 3437 (1992).

Also the rod-shaped aromatic compounds described in p. 11-14 of JP-A-2004-50516 may be used as the phase difference (retardation) generating agent.

When the optical film is manufactured by the solvent casting method, the phase difference (retardation) generating agent may be added into the dope. The phase difference (retardation) generating agent may be added at any time. For example, it may be added to a cellulose ester solution (dope) after being dissolved into an organic solvent such as alcohol, methylene chloride, dioxolane or the like, or it may be added directly into the dope composition.

Examples of preferred rod-shaped compound other than those described in the individual literatures will be listed below.

[Chemical Formula 27]

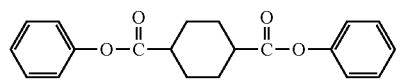

(1)

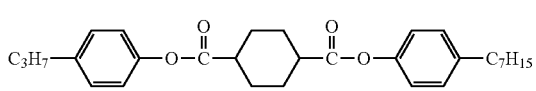

(2)

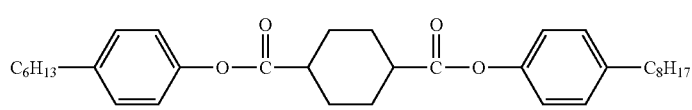

(3)

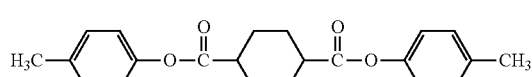

(4)

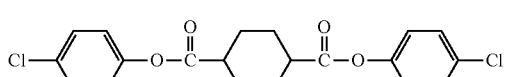

(5)

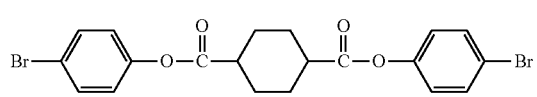

(6)

-continued
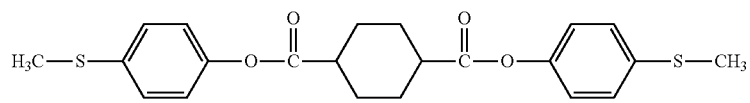
(7)
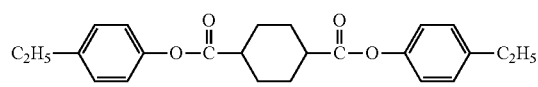
(8)
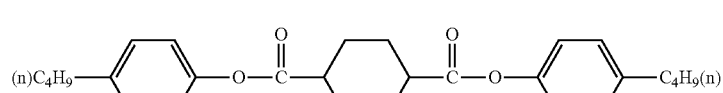
(9)
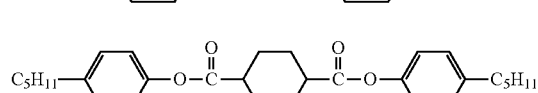
(10)
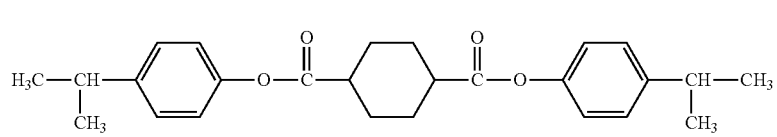
(11)
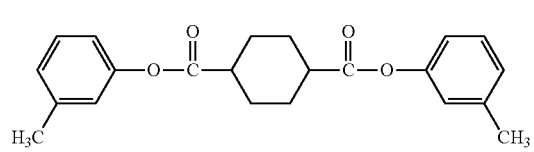
(12)
[Chemical Formula 28]
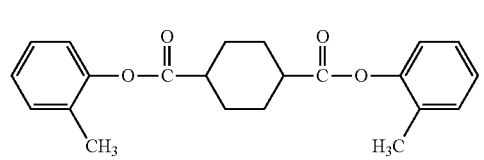
(13)
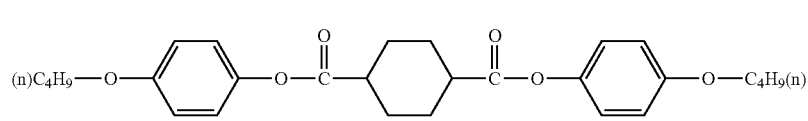
(14)
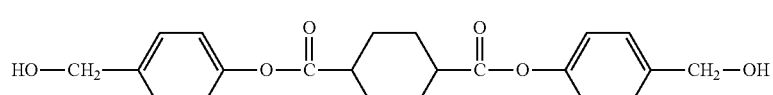
(15)
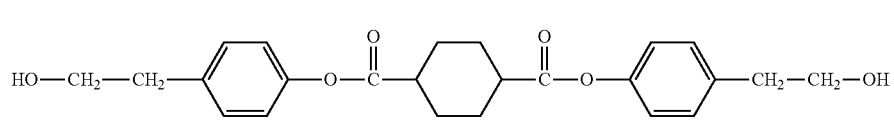
(16)
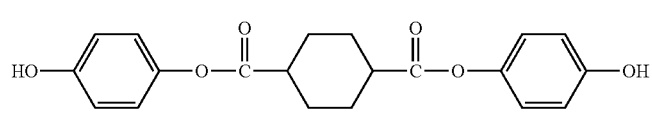
(17)
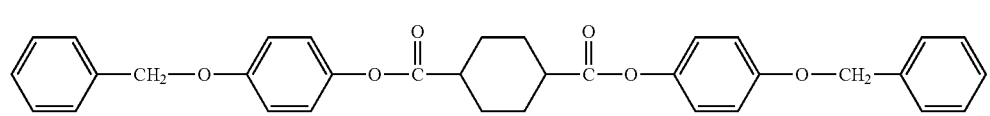
(18)
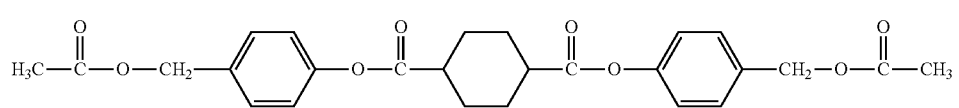
(19)

(20)
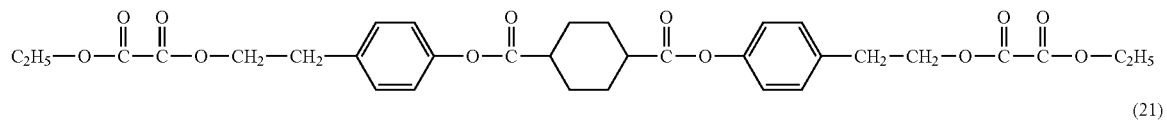
(21)
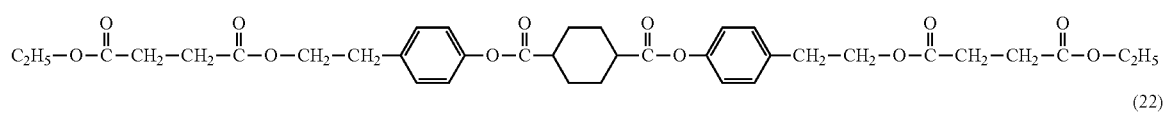
(22)
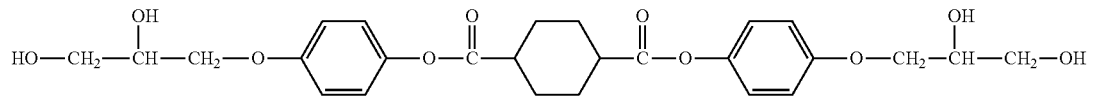
[Chemical Formula 29]
(23)
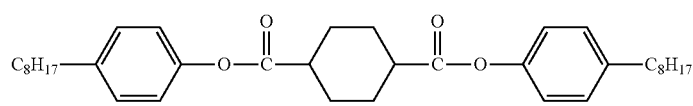
(24)
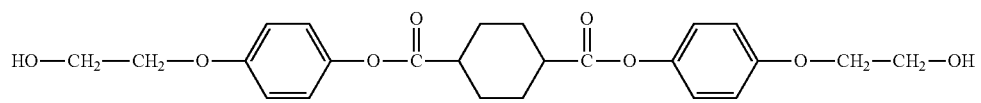
(25)
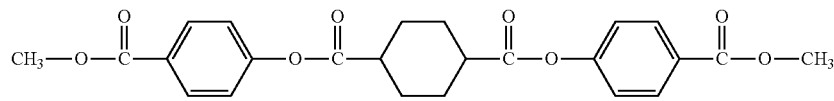
(26)
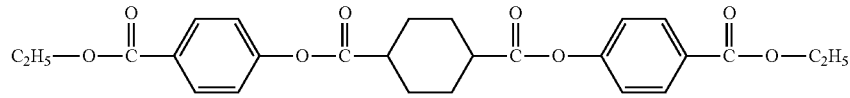
(27)
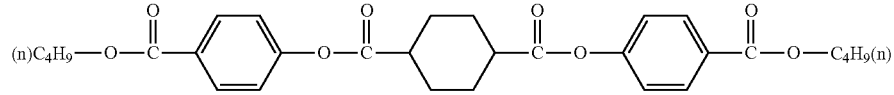
(28)
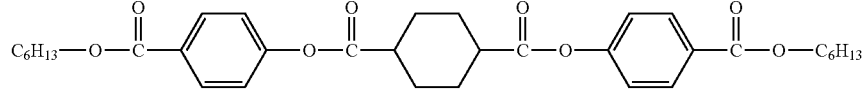
(29)
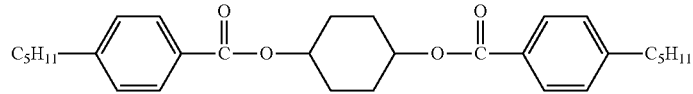
(30)
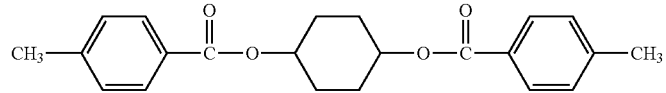
(31)
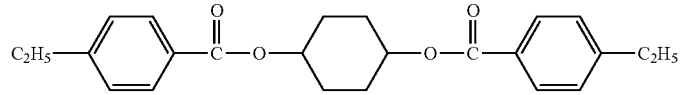
(32)
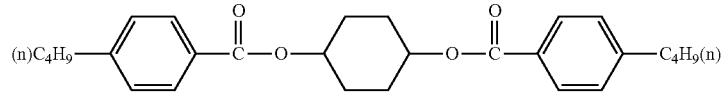
[Chemical Formula 30]
(33)
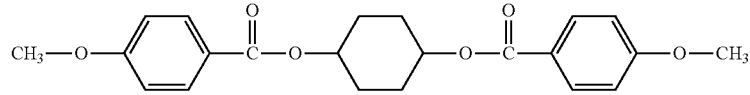

(34)
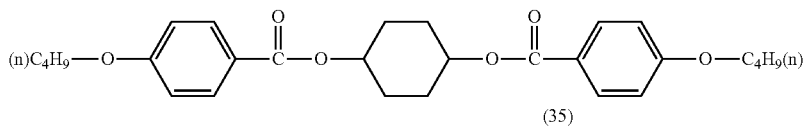
(35)
(36)
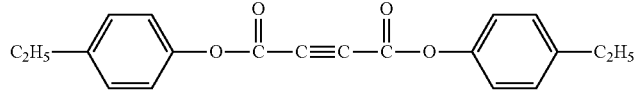
(37)
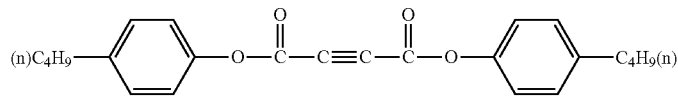
(38)
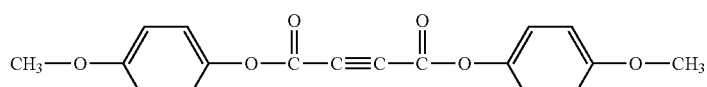
(39)
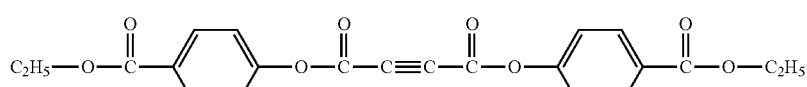
(40)
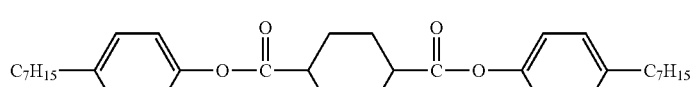
(41)
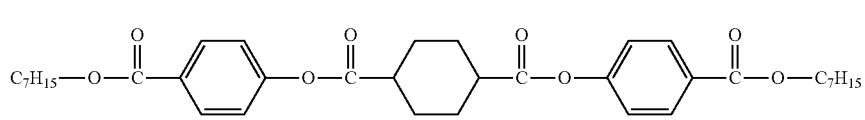
(42)
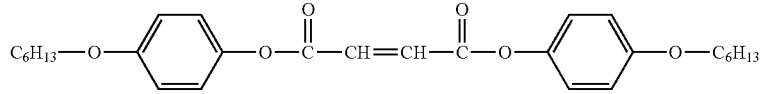
[Chemical Formula 31]
(43)
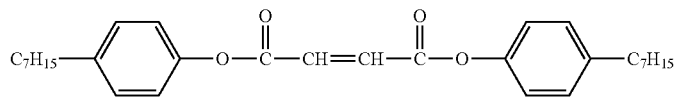
(44)
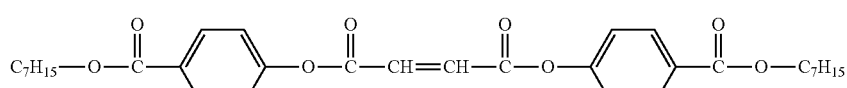
(45)
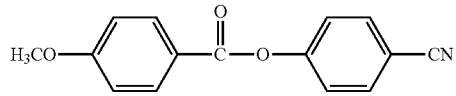
[Chemical Formula 32]
(46)
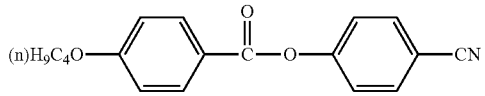
(47)
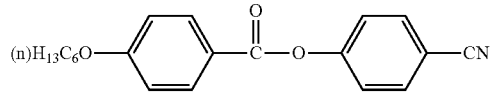
(48)
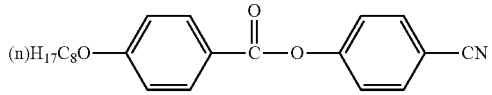
(49)
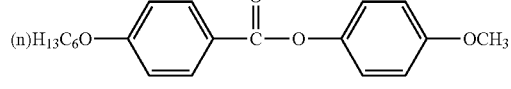
(50)
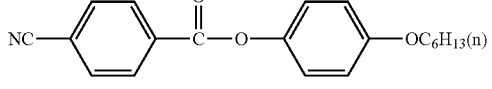
(51)

(52)
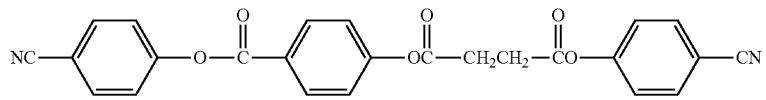

(53)
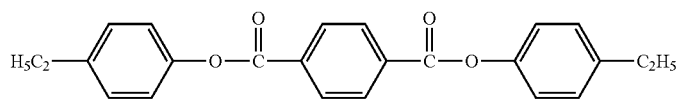

(54)
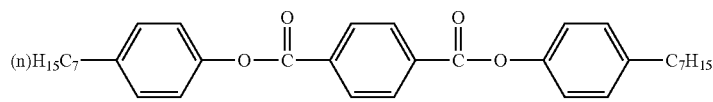

(55)
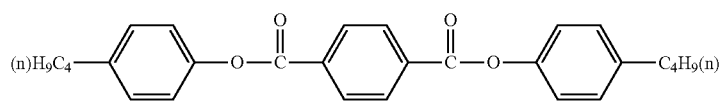

(56)
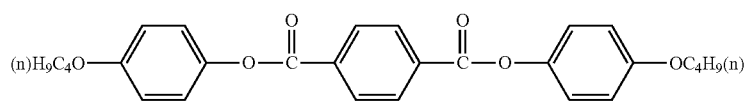

(57)
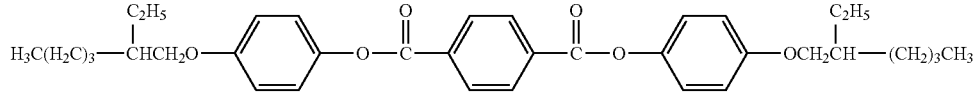

(58)
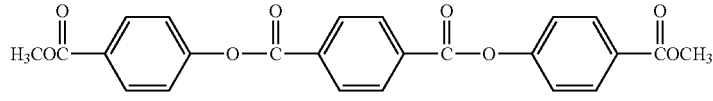

(59)
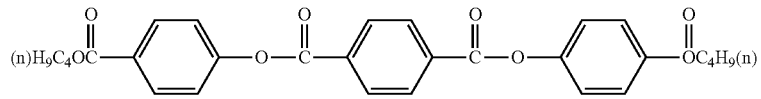

(60)
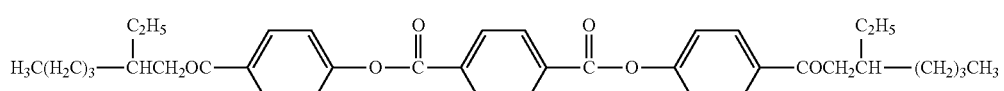

(61)
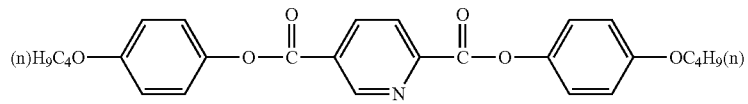

(62)
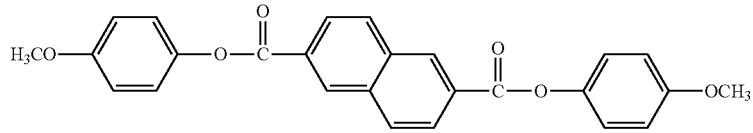

(63)
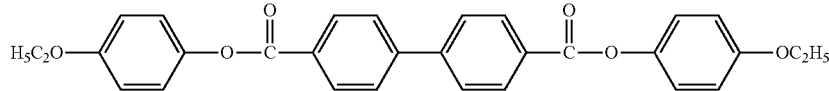

Each of the Exemplary Compounds (1) to (34), (41) and (42) has two asymmetric carbon atoms at the 1-position and the 4-position of a cyclohexane ring. Note that since each of the Exemplary Compounds (1), (4) to (34), (41) and (42) has a symmetric meso-form molecular structure, so that they do not have optical isomers (optical activity), but only have geometrical isomers (cis-form and trans-form). The trans-form (1-trans) and the cis-form (1-cis) of Exemplary Compounds (1) will be shown below.

[Chemical Formula 33]

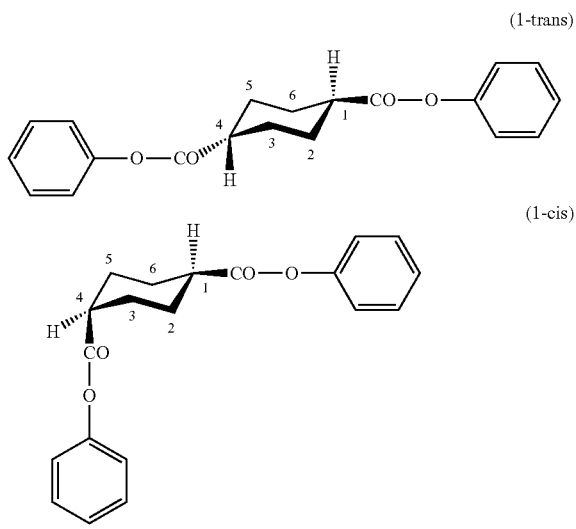

As described above, the rod-shaped compound preferably has a straight molecular structure. For this reason, the trans form is preferred over the cis form.

Each of Exemplary Compounds (2) and (3) has optical isomers in addition to the geometrical isomers (4 species in total). The geometrical isomer again preferably has the trans form, rather than the cis form. There is little to choose between the optical isomers, so that D-form, L-form and the racemic compound may equally be used.

Each of Exemplary Compounds (43) to (45) has the trans form and the cis form with respect to the central vinylene bond. Again for the reason described above, the trans form is preferred over the cis form.

<Other Additives>
(Plasticizer)

The optical film of the present invention may contain another plasticizer, as necessary for the purpose of obtaining the effects of the present invention.

The plasticizer is preferably selected from polyvalent carboxylate ester-based plasticizer, glycolate-based plasticizer, phthalate ester-based plasticizer, fatty acid ester-based plasticizer and polyhydric alcohol ester-based plasticizer, ester-based plasticizer, and acrylic plasticizer, although not specifically limited.

When two or more species of plasticizer are used, at least one of which is preferably a polyhydric alcohol ester-based plasticizer.

The polyhydric alcohol ester-based plasticizer is composed of an ester formed between an aliphatic polyhydric alcohol with a valency of 2 or larger, and a monocarboxylic acid, and preferably has in the molecule thereof an aromatic ring or cycloalkyl ring. It is preferably an aliphatic polyhydric alcohol ester with a valency of 2 to 20.

The polyhydric alcohol preferably used in the present invention is represented by the general formula (a) below:

$R_{11}$—(OH)$_n$  General formula (a)

where, $R_{11}$ represents an organic group with a valency of n which is a positive integer of 2 or larger, and OH group represents an alcoholic and/or phenolic hydroxy group.

Preferable examples of the polyhydric alcohol include those listed below, with no intention of limiting the present invention.

Exemplified are adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, and xylitol.

Particularly preferable are triethylene glycol, tetraethylene glycol, dipropylene glycol, tripropylene glycol, sorbitol, trimethylolpropane, and xylitol.

The monocarboxylic acid used for forming the polyhydric alcohol ester may be any of publicly known aliphatic monocarboxylic acid, alicyclic monocarboxylic acid, aromatic monocarboxylic acid and so forth, without special limitation. Use of alicyclic monocarboxylic acid or aromatic monocarboxylic acid is preferable in view of improving moisture permeability and retainability.

Preferable examples of the monocarboxylic acid include those listed below, with no intention of limiting the present invention.

The aliphatic monocarboxylic acid preferably used herein is a $C_{1-32}$ straight or branched-chain fatty acid. The number of carbon atoms is more preferably 1 to 20, and furthermore preferably 1 to 10. Inclusion of acetic acid is preferable in view enhancing compatibility with the cellulose ester resin. It is also preferable to use acetic acid in a mixed manner with other monocarboxylic acid.

Preferable examples of the aliphatic monocarboxylic acid include saturated fatty acid such as acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, and lacceric acid; and unsaturated fatty acid such as undecylenic acid, oleic acid, sorbic acid, lionolic acid, linolenic acid, and arachidonic acid.

Preferable examples of the alicyclic monocarboxylic acid include cyclopentanecarboxylic acid, cyclohexanecarboxylic acid, cyclooctanecarboxylic acid, and derivatives of these compounds.

Preferable examples of the aromatic monocarboxylic acid include benzoic acid; compound composed of a benzene ring of benzoic acid introduced with 1 to 3 alkyl groups, or alkoxy groups such as methoxy group or ethoxy group, such as toluic acid; and aromatic monocarboxylic acid having two or more benzene rings such as biphenylcarboxylic acid, naphthalenecarboxylic acid, and tetralincarboxylic acid, and derivatives of these compounds. Benzoic acid is particularly preferable.

Molecular weight of the polyhydric alcohol ester is preferably 300 to 1,500, and more preferably 350 to 750, although not specifically limited. Large molecular weight is preferable in view of suppressing the volatility, whereas small molecular weight is preferable in view of moisture permeability, and compatibility with the cellulose ester resin.

The carboxylic acid for composing the polyhydric alcohol ester may be used independently, or in the form of mixture of two or more species. OH groups in the polyhydric alcohol may fully be esterified, or part of the OH groups may be left intact.

Specific compounds of the polyhydric alcohol ester will be listed below.

[Chemical Formula 34]
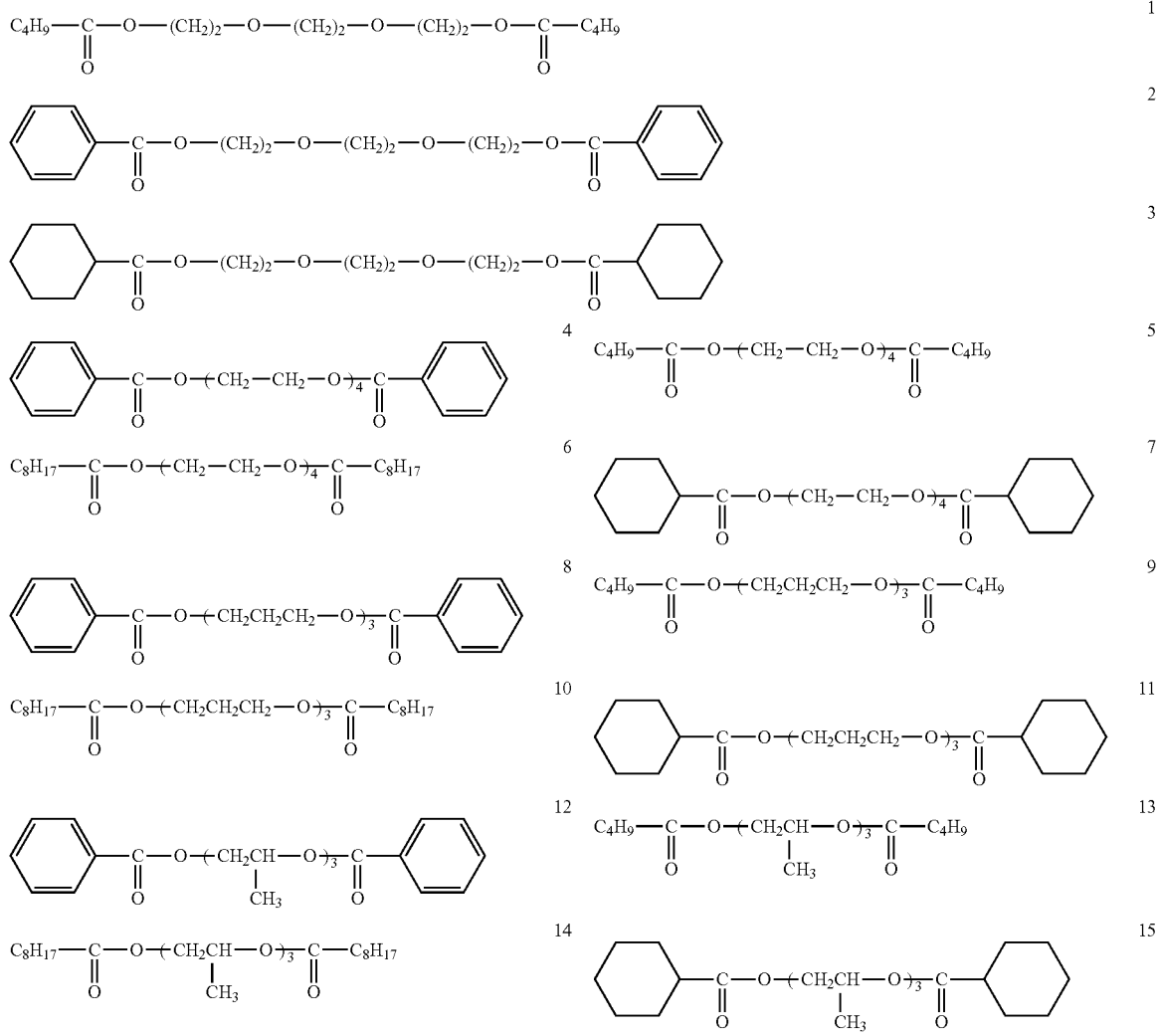
[Chemical Formula 35]
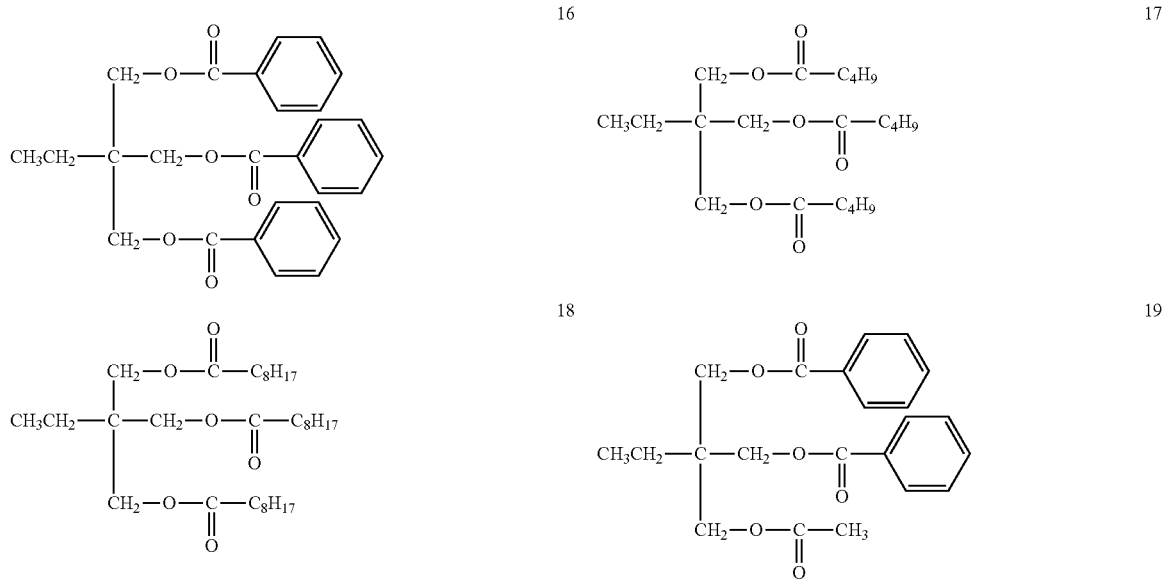

20 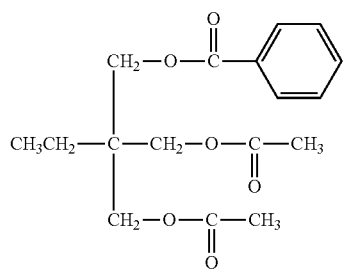
21 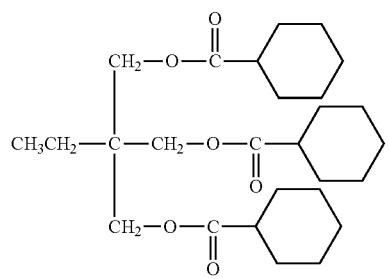
22 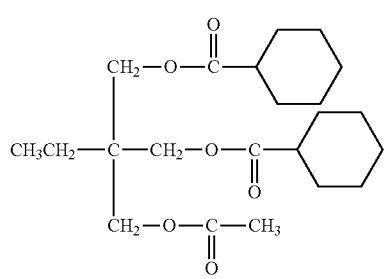
23 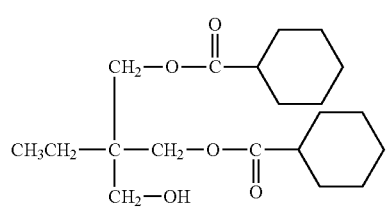
[Chemical Formula 36]
24 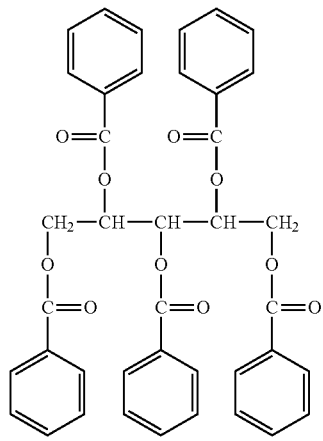
25 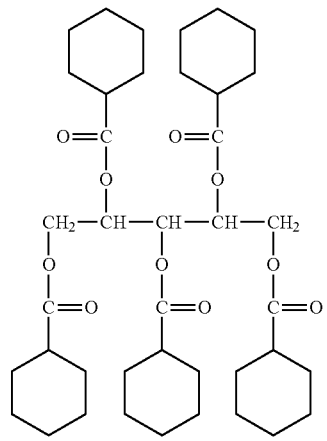
26 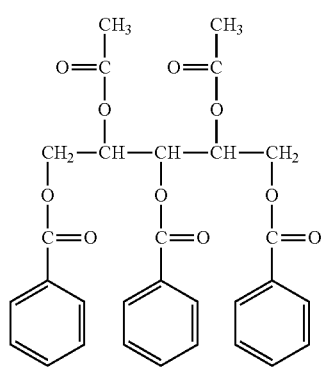
27 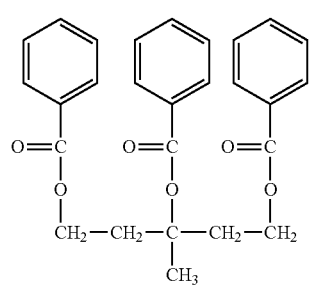

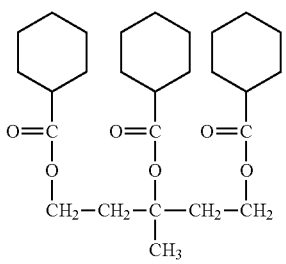

28

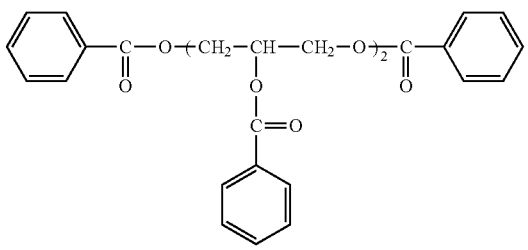

29

[Chemical Formula 37]

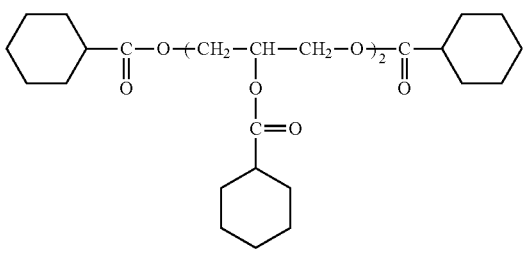

30

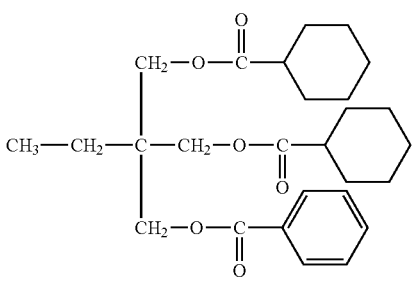

31

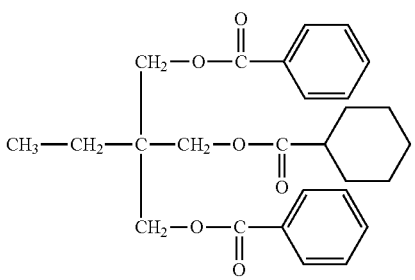

32

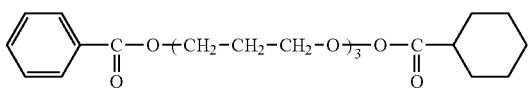

33

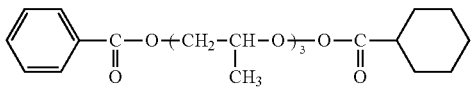

34

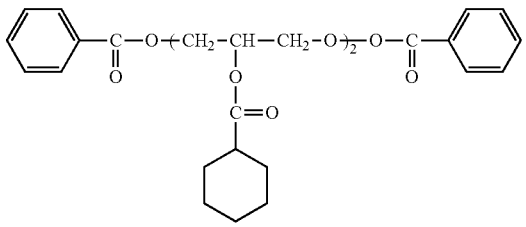

35

Alkylphthalylalkyl glycolates are preferably used as the glycolate-based plasticizer, but not limited thereto.

Examples of the alkylphthalylalkyl glycolates include methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthalylethyl glycolate, propylphthalylbutyl glycolate, butylphthalylpropyl glycolate, methylphthalyloctyl glycolate, ethylphthalyloctyl glycolate, octylphthalylmethyl glycolate, and octylphthalylethyl glycolate.

The phthalate ester-based plasticizer is exemplified by diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate, and dicyclohexyl terephthalate.

The citrate ester-based plasticizer is exemplified by acetyl trimethyl citrate, acetyl triethyl citrate, and acetyl tributyl citrate.

The fatty acid ester-based plasticizer is exemplified by butyl oleate, methyl acetyl ricinolate, and dibutyl sebacate.

The polyvalent carboxylate ester is formed between a polyvalent carboxylic acid with a valency of 2 or more, preferably with a valency of 2 to 20, and an alcohol. Aliphatic polyvalent carboxylic acid preferably has a valency of 2 to 20, whereas aromatic polyvalent carboxylic acid and alicyclic polyvalent carboxylic acid preferably have a valency of 3 to 20.

The polyvalent carboxylic acid is represented by the general formula (b) below:

$$R_{12}(COOH)_{m1}(OH)_{n1}$$  General formula (b)

In the formula, $R_{12}$ represents an (m1+n1)-valent organic group, m1 represents an integer of 2 or larger, n1 represents an integer of 0 or larger, COOH group represents a carboxy group, and OH group represents an alcoholic or phenolic hydroxy group.

Preferable examples of the polyvalent carboxylic acid include those listed below, with no intention of limiting the present invention.

The examples include aromatic polyvalent carboxylic acid with a valency of 3 or larger and derivatives thereof, such as trimellitic acid, trimesic acid and pyromellitic acid; aliphatic polyvalent carboxylic acid such as succinic acid, adipic acid, azelaic acid, sebacic acid, oxalic acid, fumaric acid, maleic acid, and tetrahydrophthalic acid; and polyvalent oxycarboxylic acid such as tartaric acid, tartronic acid, malic acid and citric acid. In particular, polyvalent oxycarboxylic acid is preferably used in view of improving the retainability.

Alcohol used for composing the polyvalent carboxylate ester is selectable from publicly known alcohols and phenols, without special limitation.

For example, $C_{1-32}$ straight or branched-chain aliphatic saturated alcohol or aliphatic unsaturated alcohol is preferably used. The number of carbon atoms is more preferably 1 to 20, and furthermore preferably 1 to 10.

Also preferably used are alicyclic alcohols or the derivatives thereof such as cyclopentanol, and cyclohexanol; and aromatic alcohol or the derivatives thereof such as benzyl alcohol, and cinnamyl alcohol.

When the polyvalent oxycarboxylic acid is used as the polyvalent carboxylic acid, the alcoholic or phenolic hydroxy group of the polyvalent oxycarboxylic acid may be esterified using a monocarboxylic acid. Preferable examples of the monocarboxylic acid include those listed below, with no intention of limiting the present invention.

Aliphatic monocarboxylic acid preferably used herein is a $C_{1-32}$ straight or branched-chain fatty acid. The number of carbon atoms is preferably 1 to 20, and particularly 1 to 10.

Preferable examples of the aliphatic monocarboxylic acid include saturated fatty acid such as acetic acid, propionic acid, butyric acid, valeric acid, caproic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, and lacceric acid; and unsaturated fatty acid such as undecylenic acid, oleic acid, sorbic acid, lionolic acid, linolenic acid, and arachidonic acid.

Preferable examples of the alicyclic monocarboxylic acid include cyclopentanecarboxylic acid, cyclohexanecarboxylic acid, cyclooctanecarboxylic acid, and derivatives of these compounds.

Preferable examples of the aromatic monocarboxylic acid include benzoic acid; compound having an alkyl group introduced into a benzene ring of benzoic acid, such as toluic acid; aromatic monocarboxylic acid having two or more benzene rings such as biphenylcarboxylic acid, naphthalenecarboxylic acid, and tetralincarboxylic acid; and derivatives of these compounds. Acetic acid, propionic acid and benzoic acid are particularly preferable.

Molecular weight of the polyvalent carboxylate ester compound is preferably 300 to 1000, and more preferably 350 to 750, although not specifically limited. Large molecular weight is preferable in view of improving the retainability, whereas small molecular weight is preferable in view of moisture permeability, and compatibility with the cellulose ester.

The alcohols for composing the polyvalent carboxylate ester may be used independently, or in the form of mixture of two or more species.

Acid value of the polyvalent carboxylate ester compound is preferably 1 mg KOH/g or smaller, and more preferably 0.2 mg KOH/g or smaller. By adjusting the acid value within the above-described ranges, environment-dependent fluctuation in the retardation is preferably suppressed.

Acid value herein is defined as the number of milligrams of potassium hydroxide necessary for neutralizing acid (carboxy group contained in the sample) contained in one gram of sample. The acid value is measured in compliance with JIS K0070.

(UV Absorber)

The optical film of the present invention may also contain an UV absorber. The UV absorber is aimed at improving the durability by absorbing ultraviolet radiation of 400 nm or shorter. The optical film preferably shows a transmittance of 10% or smaller, more preferably 5% or smaller, and furthermore preferably 2% or smaller at the wavelength of 370 nm.

The UV absorber preferably used in the present invention is exemplified by benzotriazole-based UV absorber, benzophenone-based UV absorber, and triazine-based UV absorber. The benzotriazole-based UV absorber and the benzophenone-based UV absorber are particularly preferable.

Specific examples include 5-chloro-2-(3,5-di-sec-butyl-2-hydroxyphenyl)-2H-benzotriazole, (2-2H-benzotriazole-2-yl)-6-(straight or branched-chain dodecyl)-4-methylphenol, 2-hydroxy-4-benzyloxybenzophenone, 2,4-benzyloxybenzophenone, and Tinuvin Series products such as Tinuvin 109, Tinuvin 171, Tinuvin 234, Tinuvin 326, Tinuvin 327, and Tinuvin 328 which are commercially available from BASF Japan Ltd.

In addition, also discotic compounds such as those having 1,3,5-triazine ring are preferably used as the UV absorber.

The polarizing plate protective film used in the present invention preferably contains two or more species of the UV absorber.

Also polymer UV absorber is preferably used as the UV absorber, and in particular the polymer type UV absorbers described in JP-A-H06-148430 are preferably used.

The UV absorber may be added to a dope after being preliminarily dissolved into alcohol such as methanol, ethanol or butanol, or into an organic solvent such as methylene chloride, methyl acetate, acetone or dioxolane, or into a mixed solvent of any of these solvents, or may be added directly to the dope composition.

Those insoluble to the organic solvent such as inorganic powder is added to the dope after dispersed in the organic solvent and the cellulose ester using a dissolver or sand mill.

Amount of use of the UV absorber varies depending on species of the UV absorber, conditions of use and so forth. For the case where the dry thickness of the optical film is assumed to 30 to 200 μm, the amount of use is preferably 0.5 to 10% by mass, and more preferably 0.6 to 4% by mass, of the optical film.

(Antioxidant)

Antioxidant is also referred to as anti-deterioration agent. The optical film may degrade, if the liquid crystal display device or the like is allowed to stand in a high-humidity and high-temperature state.

The antioxidant retards or prevents decomposition of the optical film, typically due to halogen ascribable to the residual amount of solvent or phosphoric acid ascribable to a phosphate-based plasticizer in the optical film, so that it is preferably contained in the optical film.

Hindered phenol-based compound is preferably used as this sort of antioxidant, examples of which include 2,6-di-t-butyl-p-cresol, pentaerythrityl-tetrakis[3-(3,5-di-t-butyl-4-hydroxyphenyle)propionate], triethylene glycol-bis[3-(3-t-butyl-5-methyl-4-hydroxyphenyl)propionate], 1,6-hexanediol-bis[3-(3,5-di-t-butyl-4-hydroxyphenyl) propionate], 2,4-bis(n-octylthio)-6-(4-hydroxy-3,5-di-t-butylanilino)-1,3,5-triazine, 2,2-thiodiethylenebis[3-(3,5-di-t-butyl-4-hydroxyphenyl)propionate], octadecyl-3-(3,5-di-t- butyl-4-hydroxyphenyl)propionate, N,N'-hexamethylenebis(3,5-di-t-butyl-4-hydroxyhydrocinnamide), 1,3,5-trimethyl-2,4,6-tris(3,5-di-t-butyl-4-hydroxybenzyl)benzene, and tris (3,5-di-t-butyl-4-hydroxybenzyl)-isocyanulate.

Particularly preferable are 2,6-di-t-butyl-p-cresol, pentaerythrityl-tetrakis[3-(3,5-di-t-butyl-4-hydroxyphenyl)propionate], and triethylene glycol-bis[3-(3-t-butyl-5-methyl-4-hydroxyphenyl)propionate]. It is also preferable to use a hydrazine-based metal deactivator such as N,N'-bis[3-(3,5-di-t-butyl-4-hydroxyphenyl)propionyl]hydrazine, or a phosphorus-containing processing stabilizer such as tris(2,4-di-t-butylphenyl)phosphite in combination.

Amount of addition of these compounds is preferably 1 ppm to 1.0%, and more preferably 10 to 1000 ppm of the cellulose ester resin on the basis of ratio by mass.

(Particle)

In view of improving the handelability, the optical film of the present invention preferably contains a matting agent typically composed of inorganic particle such as silicon dioxide, titanium dioxide, aluminum oxide, zirconium oxide, calcium carbonate, kaolin, talc, clay, calcined calcium silicate, hydrated calcium silicate, aluminum silicate, magnesium silicate, and calcium phosphate, or crosslinked polymer. Among them, silicon dioxide is preferable since it can reduce the haze of the film.

Average primary particle size of the particle is preferably 20 nm or smaller, more preferably 5 to 16 nm, and particularly 5 to 12 nm.

The particle is preferably contained in the optical film, in the form of secondary particle with a particle size of 0.1 to 5 μm, wherein the average particle size is preferably 0.1 to 2 μm, and more preferably 0.2 to 0.6 μm. In this way, the surface of the film may be given an irregularity of 0.1 to 1.0 μm high, and thereby given a proper level of slidability.

The average primary particle size of the particle used in the present invention was determined by observing 100 particles under a transmission electron microscope (at a magnification of 500,000× to 2,000,000×), measuring the particle size thereof, and calculating an average value.

(Method of Manufacturing Optical Film)

Next, a method of manufacturing the optical film of the present invention will be explained.

Either of films manufactured by solution casting process and melt casting process may preferably be used as the optical film of the present invention.

According to the solution casting process, the optical film of the present invention is manufactured by a step of preparing a dope by dissolving the cellulose ester resin and the additives into a solvent; a step of casting the dope over an endlessly traveling metal support; a step of drying the cast dope to thereby form a web; a step of separating the web from the metal support; a step of stretching or keeping the width unchanged; a step of further drying; and a step of taking up of the finished film.

The step of preparing a dope will be explained. Concentration of the cellulose ester resin in the dope is preferably high in view of reducing load of drying after the casting over the metal support; however, load of filtering will increase if the concentration of the cellulose ester resin is excessively high. For harmonization, the concentration is preferably 10 to 35% by mass, and more preferably 15 to 25% by mass.

The solvent used for the dope may be a single species, or a mixture of two or more species. It is preferable to use a good solvent and a poor solvent for the cellulose ester resin, and to use the good solvent in excess to the poor solvent, in view of solubility of the cellulose ester resin.

Ratio of mixing of the good solvent and the poor solvent preferably falls in the range from 70 to 98% by mass for the good solvent, and 2 to 30% by mass for the poor solvent. The good solvent and the poor solvent herein are defined such that the good solvent is capable of solubilizing the cellulose ester resin to be used alone by itself, whereas the poor solvent is incapable of swelling or solubilizing it alone by itself.

For this reason, the good solvent and the poor solvent will change depending on the average degree of substitution with acyl group on the cellulose ester resin.

The good solvent usable in the present invention is exemplified by organohalogen compound such as methylene chloride, or by dioxolanes, acetone, methyl acetate, and methyl acetoacetate, although not specifically limited. In particular, methylene chloride or methyl acetate is preferable.

The poor solvent usable in the present invention is exemplified by methanol, ethanol, n-butanol, cyclohexane, and cyclohexanone, although not specifically limited. The dope preferably contains 0.01 to 2% by mass of water.

The solvent used for dissolving the cellulose ester resin is recycled from the film formation process in which the solvent removed from the film by drying is recovered.

The recovered solvent may preferably be used even if it contains trace amounts of additives added to the cellulose ester resin, such as plasticizer, UV absorber, polymer, and monomer component, or may be used after being purified as necessary.

A method of dissolving the cellulose ester resin in the process of preparing the dope is selectable from the general methods. Heating combined with pressurizing enables heating of the solvent above the boiling point at normal pressure.

Stirring for dissolution at a temperature above the boiling point of the solvent under normal pressure, but within the range not allowing the solvent to boil under pressure, is preferable in view of preventing formation of massive insoluble matter called gel or lump.

Also a method of moistening or swelling the cellulose ester resin by mixing it with the poor solvent, and then dissolving it by adding the good solvent, is preferably used.

The pressurizing is available by pressure-feeding an inert gas such as nitrogen gas or by elevating vapor pressure of the solvent under heating. The heating is preferably provided from the external. A jacket-type heating system, for example, is preferable by virtue of its readiness in temperature control.

The heating temperature in the presence of the solvent is preferably high from the viewpoint of solubility of the cellulose ester resin, whereas an excessively high heating temperature may require higher pressure to thereby degrade the productivity.

The heating temperature is preferably 45 to 120° C., more preferably 60 to 110° C., and furthermore preferably 70° C. to 105° C. The pressure is adjusted so as not allow the solvent to boil at a set temperature.

Alternatively, also the cooling solubilization method is preferably used, by which the cellulose ester resin may be dissolved into a solvent such as methyl acetate.

Next, the cellulose ester resin solution is filtered through an appropriate filter medium such as filter paper. The filter medium and the filtration method are as described above.

Casting of the dope will now be explained.

The metal support used in the casting process is preferably mirror-finished on the surface thereof. The metal support preferably used is a stainless steel belt or a die-cast drum with a plated surface.

Width of casting is selectable from 1 to 4 m. Temperature of the surface of the metal support in the casting process is adjustable in the range from −50° C. up to temperature lower than the boiling point of the solvent. The temperature is preferably high in view of accelerating the rate of drying of the web, whereas the web may foam or may be degraded in the planarity if the temperature is excessively high.

The support temperature is preferably 0 to 55° C., and more preferably 25 to 50° C. Alternatively, also the web is preferably gelated by cooling, and then separated from the drum, while keeping a plenty of residual solvent contained therein.

Methods of controlling the temperature of the metal support is not specifically limited, wherein possible methods include a method of blowing a hot air or cold air, and a method of bringing warm water into contact with the back surface of the metal support. The method of using warm water is more preferable, since heat conduction is more effective so that the temperature of the metal support may be stabilized within a short time. When the hot air is used, the temperature of the air may occasionally be higher than a target temperature.

In order to ensure a desirable planarity of the optical film, the amount of residual solvent of the web, when separated from the metal support, is preferably 10 to 150% by mass, more preferably 40% to 130% by mass, and particularly 50 to 120% by mass.

In the present invention, the amount of residual solvent is given by the equation below:

Amount of residual solvent (% by mass)=$\{(M-N)/N\}\times 100$ where, M represents mass of a sample collected at an arbitrary point of time in, or after, the process of manufacturing the web or film, and N represents mass of the sample after heated at 115° C. for 1 hour.

In the process of drying the optical film, it is preferable that the web separated from the metal support is further dried to reduce the content of residual solvent down to 1% by mass or below, more preferably 0.1% by mass or below, and particularly 0 to 0.01% by mass or below.

In the film drying process, generally used is a roll drying method (by which the web is dried while allowing it to alternately travel over a large number of rolls arranged up and down), and a method of drying the web while being transferred using a tenter.

It is particularly preferable to stretch the optical film of the present invention widthwise (transversely) by the tenter system by which both edges of the web are held with clips or the like. Preferable methods of stretching are same as those described previously.

Method of drying of the web is generally selectable from those making use of hot air, infrared radiation, heated roll, microwave and so forth, without special limitation. Hot air is preferable by virtue of its simplicity.

Drying temperature in the drying process of the web is preferably elevated in a stepwise manner from 40 to 200° C.

The optical film of the present invention is preferably 15 to 50 μm thick. Within this range of thickness, the back scattering may be suppressed and thereby the effects of the present invention may be enhanced. The thickness is more preferably 20 to 50 μm. The thickness is necessarily 50 μm or smaller since if the thickness exceeds 50 μm, not only the back scattering but also forward scattering will increase together therewith. On the other hand, the optical film of the present invention necessarily has a thickness of 15 μm or larger, if it is intended for use in the polarizing plate, since if the thickness is smaller than 15 μm, the optical film will no longer be able to keep a necessary level of strength, and will be degraded in the polarizer-protecting performance due to excessively increase in the moisture permeability.

The optical film of the present invention is 1 to 4 m wide, more preferably 1.4 to 4 m wide, and particularly 1.6 to 3 m wide. If the width exceeds 4 m, conveyance will be difficult.

<Physical Characteristics of Optical Film>

Water vapor transmission rate (moisture permeability) of the optical film of the present invention is preferably 300 to 1,800 g/m$^2$·24 h at 40° C., 90% RH, more preferably 400 to 1,500 g/m$^2$·24 h, and particularly 40 to 1,300 g/m$^2$·24 h. The water vapor transmission rate may be measured in compliance with the method described in JIS Z0208.

Rupture elongation of the optical film of the present invention is preferably 10 to 80%, and more preferably 20 to 50%.

Visible light transmittance of the optical film of the present invention is preferably 90% or above, and more preferably 93% or above.

Haze of the optical film of the present invention is preferably smaller than 1%, and more preferably 0 to 0.1%.

<Polarizing Plate>

The polarizing plate may be manufactured by any of general methods, when the optical film of the present invention is intended for use as a protective film for the polarizing plate. It is preferable to provide a tacky layer on the back surface of the optical film of the present invention and bond the optical film onto at least one surface of the polarizer manufactured by dipping into an iodine solution and stretching.

On the other surface, another optical film of the present invention may be used or any other polarizing plate protective film may be used. For example, commercially available optical films (for example, Konica-Minolta Tac KC8UX, KC4UX, KC5UX, KC8UY, KC4UY, KC12UR, KC8UCR-3, KC8UCR-4, KC8UCR-5, KC8UE, KC4UE, KC4FR-3, KC4FR-4, KC4HR-1, KC8UY-HA, KC8UX-RHA, all from Konica Minolta Opto Products Co. Ltd.) are preferably used.

The polarizer, which is a major constituent of the polarizing plate, is an element allowing therethrough transmission of light having a polarization plane in a specific direction. Poly (vinyl alcohol)-based polarizing film is a representative polarizer publicly known at present, which is classified into those dyed with iodine and those dyed with a dichroic dye.

The polarizer used herein is obtained by making a film using an aqueous poly(vinyl alcohol) solution and uniaxially stretching the film followed by dying, or by dying the film followed by uniaxial stretching, and then preferably by toughening the film using a boron compound.

The optical film of the present invention is preferably hydrophilized on the surface thereof, before bonded to the polarizer. Examples of the hydrophilization treatment include saponification, plasma treatment, flame treatment, and UV irradiation. The saponification includes acid saponification and alkali saponification. The alkali saponification is preferably used in the present invention.

In the alkali saponification, the optical film of the present invention is preferably saponified while adjusting the saponification index (M) to 0.5 or larger and 50 or smaller.

Saponification index (M): Concentration of alkali solution for saponification (mol/l)×Saponification temperature (×10° C.)×Saponification time (×10 seconds)

The saponification index M is an index of efficiency of saponification, wherein the larger the value, the higher the efficiency. Since the index is expressed by a product of alkali concentration, saponification temperature and saponification time, so that it suffices that conditions for three these factors are appropriately obtained, and an optimum combination of them is determined.

For example, given an alkali concentration of 1.5 mol %, a saponification temperature of 40° C., and a saponification time of 60 seconds, the saponification index will be 1.5×4×6=36.

By adjusting the saponification index of the optical film of the present invention within the above described ranges, distortion and cracks possibly occurs in the process of bonding the polarizing plate may be suppressed while ensuring a sufficient level of adhesiveness with the polarizing film, and thereby a problem of degraded front contrast when the polarizing plate of the present invention is used in the liquid crystal display device may be suppressed in an effective manner.

The alkali saponification is preferably implemented by a method of directly dipping the optical film into a bath of saponification solution, or a method of coating saponification solution. Methods of coating include dip coating, curtain coating, extrusion coating, bar coating and E-type coating. Solvent of the alkali saponification solution is preferably selected from those ensuring the saponification solution with excellent wetting on a transparent support, and capable of keeping a good smoothness of the transparent support without causing thereon irregularities due to the solvent. More specifically, alcoholic solvent is preferable, and isopropanol is particularly preferable. Alternatively, an aqueous solution of surfactant may be used as the solvent. Alkali in the alkali saponification solution is preferably soluble in the solvent described above, and is more preferably KOH or NaOH. pH of the saponification solution is preferably 10 or above, and more preferably 12 or above.

The saponification temperature in the alkali saponification is selectable in the range from room temperature to 80° C., and preferably from 30 to 60° C.

The saponification time is properly selectable in conjunction with necessary levels of saponification performance and productivity, which is 10 to 120 seconds and preferably 10 to 100 seconds.

After the alkali saponification, the surface coated with the saponification solution is preferably washed with water, or with acid and then water.

Tacky agent used for the tacky layer preferably has, in at least a part thereof, a storage modulus at 25° C. of $1.0 \times 10^4$ to $1.0 \times 10^9$ Pa. A curable tacky agent, capable of forming a polymer structure or crosslinked structure by a variety of reactions after being coated and bonded, is preferably used.

Specific examples include curable tacky agents such as urethane-based tacky agent, epoxy-based tacky agent, water-based polymer-isocyanate-based tacky agent and thermosetting acrylic tacky agent; moisture-curable urethane tacky agent; anaerobic tacky agents such as those of polyether methacrylate base, ester-methacrylate base and oxidized polyether methacrylate; instant tacky agent such as those of cyano acrylate base; and two-part instant tacky agent composed of acrylate and peroxide.

The tacky agent may be of one part type, or multi part type used by mixing two or more parts of component immediately before applied.

The tacky agent may be of solvent type using an organic solvent as a medium, of water type using a water-based medium such as an emulsion, colloidal dispersion or aqueous solution, or of non-solvent type. Concentration of the tacky agent may properly be determined based on the thickness after bonded in a pressure-sensitive manner, method of coating, and conditions of coating. It is generally 0.1 to 50% by mass.

The optical film of the present invention is also preferably used, for example, for a rolled polarizing plate which has a protective film placed on one surface of a polarizer protective film, has a separate film placed on a surface of a tacky layer on the other side, and is wound into a roll in the process of manufacturing.

<Liquid Crystal Display Device>

By incorporating the polarizing plate, bonded with the optical film of the present invention, into a liquid crystal display device, it is now possible to manufacture a liquid crystal display device high in the front contrast, small in variation in the contrast, and excellent in the viewability. The polarizing plate is preferably used in particular for large-sized liquid crystal display device and outdoor digital signage. The polarizing plate of the present invention is bonded to a liquid crystal cell, while placing the tacky layer or the like in between.

The polarizing plate of the present invention is preferably used for LCDs of reflection-type, transmission-type and semitransmission-type; or LCDs based on various drive modes such as TN-type, STN-type, OCB-type, HAN-type, VA-type (PVA-type, MVA-type), and IPS-type (also FFS-type included). In particular, in the VA-type display device of 30 inches or larger, and in particular large-screen display devices of 30 to 54 inches, the polarizing plate can maintain the effects thereof for a long term, without causing dead pixels in the periphery of the screen.

The backlight source of the liquid crystal display device usable herein include flat-shaped fluorescent lamp, light emitting diode (LED) backlight having red (R), green (G) and blue (B) LEDs, and white backlight using an organo-electroluminescent element board. The optical film of the present invention is particularly suitable for the light emitting diode (LED) backlight.

EXAMPLES

The present invention will specifically be explained below referring to Examples, to which the present invention is not limited.

Example 1

Manufacture of Cellulose Ester Resin CE-1

One hundred parts by mass of cellulose was added with 16 parts by mass of sulfuric acid, 260 parts by mass of acetic anhydride, and 420 parts by mass of acetic acid, and the mixture was heated from the room temperature up to 60° C. over 60 minutes under stirring, then kept at that temperature for 15 minutes, so as to allow an acetylation reaction to proceed. Next, sulfuric acid was neutralized by adding an acetic acid-water mixed solution containing magnesium acetate and calcium acetate, and steam was then introduced into the reaction system, the system was kept at 60° C. for 120 minutes so as to allow saponification ageing to proceed. The reaction mixture was washed with a large volume of water, and then dried, to thereby obtain cellulose ester resin CE-1.

The thus-obtained cellulose ester resin CE-1 was found to be a cellulose triacetate with an average degree of substitution by acetyl group of 2.88, Mn=80000, and Mw/Mn=2.4, where Mn is number-average molecular weight, and Mw is weight-average molecular weight. The solubility parameter (SP value) of the cellulosic resin determined by the Hoy's method was found to be 21.0.

Manufacture of Cellulose Ester Resin CE-2

Diacetyl cellulose with an average degree of substitution by acetyl group 2.45 was manufactured similarly to the cellulose ester resin CE-1. Assuming now the number-average molecular weight as Mn, and the weight-average molecular weight as Mw, the product was found to have Mn=62,000 and Mw/Mn=3.1. The solubility parameter (SP value) of the cellulosic resin determined by the Hoy's method was found to be 22.1.

The content of acetic acid in the cellulose ester resin CE-2 was found to be 300 ppm, the total content of calcium and magnesium was found to be 100 ppm, and the value of the relational expression (content of acetic acid)/(total content of calcium and magnesium) was found to be 3.

Manufacture of Cellulose Ester Resin CE-3

Cellulose ester resin CE-3 was manufactured similarly to the cellulose ester resin CE-2, except that the amount of use of acetic acid, the amount of sulfuric acid to be neutralized, and the number of repetition of washing were controlled so as to achieve an average degree of substitution by acetyl group of 2.35, a content of acetic acid of 300 ppm, and a total content of calcium and magnesium of 30 ppm, to thereby adjust the value of the relational expression (content of acetic acid)/(total content of calcium and magnesium) to 10.

The content of acetic acid, and the total content of calcium and magnesium were measured by the publicly known methods described above.

Manufacture of Cellulose Ester Resin CE-4

Cellulose acetate with an average degree of substitution by acetyl group 1.95 was manufactured similarly to the cellulose ester resin CE-1. Assuming now the number-average molecular weight as Mn and the weight-average molecular weight as Mw, the product was found to have Mn=70,000 and Mw/Mn=3.0. The solubility parameter (SP value) of the cellulosic resin determined by the Hoy's method was found to be 23.0.

Manufacture of Cellulose Ester Resin CE-5

Cellulose acetate with an average degree of substitution by acetyl group 2.65 was manufactured similarly to the cellulose ester resin CE-1. Assuming now the number-average molecular weight as Mn and the weight-average molecular weight as Mw, the product was found to have Mn=65,000 and Mw/Mn=3.2. The solubility parameter (SP value) of the cellulosic resin determined by the Hoy's method was found to be 21.3.

<Manufacture of Optical Films 101 to 122>
(Manufacture of Optical Film 101)<
<Fine Particle Dispersion Liquid>

| Fine particle (Aerosil R812, from Nippon Aerosil Co. Ltd.) | 11 parts by mass |
|---|---|
| Ethanol | 89 parts by mass |

The materials were mixed under stirred in a dissolver for 50 minutes and then allowed to disperse using a Manton-Gaulin homogenizer.

<Fine Particle Addition Liquid>

Into a dissolving tank containing methylene chloride, the cellulose ester resin CE-1 was added and completely dissolved under heating, and the solution was filtered through Azumi filter paper No. 244 from Azumi Filter Paper Co. Ltd. While vigorously stirring the filtered cellulose ester solution, the fine particle dispersion liquid was slowly added. The mixture was further allowed to disperse in an attritor so as to adjust the particle size of the secondary particle to a predetermined size. The mixture was filtered through Fine Met NF from Nippon Seisen Co. Ltd., to thereby prepare a fine particle addition solution.

| Methylene chloride | 99 parts by mass |
|---|---|
| Cellulose ester resin CE-1 | 4 parts by mass |
| Fine particle dispersion liquid | 11 parts by mass |

Using the cellulose ester resin CE-1, a main dope having the composition below was prepared.

First, methylene chloride and ethanol were placed in a pressure dissolving tank. Into the pressure dissolving tank thus containing the solvents, cellulose ester resin CE-11 was added under stirring. The mixture was heated to 50° C., completely dissolved under stirring, further added with plasticizer 1 listed in Table 2, and the mixture was further stirred for 90 minutes for complete dissolution.

The obtained dope was filtered through Azumi filter paper No. 244 from Azumi Filter Paper Co. Ltd., and further filtered through Fine Met NM (absolute filter rating=100 μm), and Fine Pore NF (products with values of absolute filter rating of 50 μm, 15 μm and 5 μm were sequentially used in the increasing order of filtration accuracy), the both from Nippon Seisen Co. Ltd., at a filtration pressure of 9.8 kPa, to thereby prepare the main dope.

One hundred parts by mass of the main dope was added with 2 parts by mass of the fine particle addition liquid, the mixture was thoroughly mixed in an in-line mixer (static in-tube mixer "Hi-Mixer SWJ", from Toray Engineering Co. Ltd.), and then cast uniformly over a 2 m-wide stainless steel band base of a belt casting apparatus. The solvent was allowed to vaporize on the stainless band base until the residual solvent content reduces down to 110%, and the resultant web was separated from the stainless steel band base. Next, the web was gripped at both edges thereof using a tenter, and stretched at a draw ratio of 1.10 times in the transverse direction at 160° C. The residual solvent at the start point of stretching was 30%. After the stretching, the web was kept for several seconds while keeping the width, then relieved from keeping in the width, and then dried while being conveyed in a third drying zone set at 125° C. for 30 minutes, to thereby manufacture a 1.5 m-wide and 80 μm-thick optical film 101 of Comparative Example, knurled at the edges over 1 cm wide to a height of 8 μm.

<Composition of Main Dope>

| Methylene chloride | 300 parts by mass |
|---|---|
| Ethanol | 30 parts by mass |
| Cellulose ester resin CE-1 | 100 parts by mass |
| Plasticizer (TPP: triphenyl phosphate) | 10 parts by mass |

(Manufacture of Optical Film 102)

An optical film 102 was manufactured similarly to the optical film 101, except that the composition of the main dope was altered as listed below and the thickness was adjusted to 60 μm.

<Composition of Main Dope>

| Methylene chloride | 300 parts by mass |
|---|---|
| Ethanol | 30 parts by mass |
| Cellulose ester resin CE-1 | 100 parts by mass |
| Plasticizer (TPP: triphenyl phosphate) | 5 parts by mass |
| Plasticizer (EPEG: ethyl phthalyl ethyl glycolate) | 5 parts by mass |
| Phase difference generating agent (triazine-based compound: Exemplary Compound I-(3)) | 2 parts by mass |

(Manufacture of Optical Films 103, 104)

Optical films 103, 104 were manufactured similarly to the optical films 101, 102, except that the cellulose ester resin was altered from CE-1 to CE-2.

(Manufacture of Optical Film 105)

A optical film 105 was manufactured similarly to optical film 101, except that the composition of the main dope was altered as listed below and the thickness was adjusted to 50 μm.

<Composition of Main Dope>

| | |
|---|---|
| Methylene chloride | 300 parts by mass |
| Ethanol | 30 parts by mass |
| Cellulose ester resin CE-2 | 100 parts by mass |
| Plasticizer (sugar ester compound FA- 7) | 10 parts by mass |

(Manufacture of Optical Film 106)

An optical film 106 was manufactured similarly to the optical film 105, except that the composition of the main dope was altered as listed below.

<Composition of Main Dope>

| | |
|---|---|
| Methylene chloride | 300 parts by mass |
| Ethanol | 30 parts by mass |
| Cellulose ester resin CE-2 | 100 parts by mass |
| Plasticizer (sugar ester compound FA-7) | 5 parts by mass |
| Plasticizer (aromatic terminal ester compound FB-19) | 5 parts by mass |
| Separation promoting agent (partially ethyl-esterified product of citric acid) | 0.2 parts by mass |

(Manufacture of Optical Film 107)

An optical film 107 was manufactured similarly to the optical film 106, except that the composition of the main dope was altered as shown below.

<Composition of Main Dope>

| | |
|---|---|
| Methylene chloride | 300 parts by mass |
| Ethanol | 30 parts by mass |
| Cellulose ester resin CE-2 | 100 parts by mass |
| Plasticizer (sugar ester compound FA-7) | 5 parts by mass |
| Plasticizer (aromatic terminal ester compound FB-19) | 5 parts by mass |
| Phase difference generating agent (triazine-based compound: Exemplary Compound I-(3)) | 2 parts by mass |
| Separation promoting agent (partially ethyl-esterified product of citric acid) | 0.2 parts by mass |

(Manufacture of Optical Films 108 to 122)

Optical films 108 to 122 were manufactured similarly to the optical film 107, except that the cellulose ester resin, plasticizer 2, plasticizer 3, phase difference generating agent, separation promoting agent, MD stretching and thickness were adjusted as listed in Table 2.

The MD stretching was effected in the MD direction by a stretching factor of 1.03, followed by relaxation by 2%.

(Calculation of Solubility Parameter (SP Value))

The solubility parameters (SP values) of the cellulose ester resins and the plasticizers listed in Table were determined by the Hoy's method. Values of ΔSP value in Table 2 represents the maximum value selected from among absolute values of difference between the SP value of the plasticizer composing the optical film and the SP value of the cellulose ester resin.

<<Items and Methods of Evaluation>>

The obtained optical films were evaluated as described below.

(Measurement of Retardation)

The retardation values Ro, Rth were determined according to the equations below:

$$Ro = (nx - ny) \times d$$

$$Rth = ((nx + ny)/2 - nz) \times d$$

In the formulae, d represents film thickness (nm), nx represents refractive index in the direction of slow axis, ny represents in-plane refractive index of the film in the direction normal to the slow axis, and nz represents thickness-wise refractive index of the film.

The retardation values (Ro), (Rth) were determined using an automatic birefringence analyzer KOBRA-21ADH (from Oji Scientific Instruments) under an environment of 23° C. and 55% RH, at 590 nm.

(Measurement of Haze (Forward Scattering))

The thus-manufactured optical films were conditioned in an environment of 23° C., 55% RH for 5 hours or longer, and haze value of the film was measured using a haze meter (turbidimeter) (Model: NDH 2000, from Nippon Denshoku Industries Co. Ltd.). A light source used herein was a 5 V/9 W halogen light bulb, and a light receiving unit was a silicon photocell (with a luminosity filter). The measurement was conducted in compliance with JIS K-7136.

(Measurement of Ratio of Intensities of Back Scattered Light S(bs)/S(T))

A sample of the optical film was set as illustrated in FIG. 1. Assuming now the angle of emergence of back-scattered light in the direction of the normal line on the optical film 1 and in the direction exactly opposite to the incident light from the backlight 2 as 0°, scattered light at 590 nm was measured using the photodetector 3 over a range of angle of emergence from 25° to 85° to obtain S(bs), and the value was then divided by the total amount of incident light S(T), to obtain a quotient S(bs)/S(T) as the ratio of intensities of back scattered light.

Specific conditions are as follows: S(bs) represents an integral of light obtained by measuring the amount of back scattered light at a measurement wavelength of 590 nm using the photodetector 3, over a range of angle of emergence from 25° to 85° at 1° intervals assuming that the light-incident angle onto a film surface is 0°, at a point 300 mm away from the surface of the film, and S(T) represents the total amount of incident light onto the surface of the film measured by the photodetector 3 from a light source placed by 600 mm away from the surface.

The light source 2 was a xenon light source MAX-302 from Asahi Spectra Co. Ltd., used in the white-light mode.

As the photodetector 3, a photomultiplier (R636-10, from Hamamatsu Photonics K.K.) was used.

The measurement was conducted while adjusting a beam spot size of the incident light on the optical film to 1 to 10 mm.

(Measurement of Ratio of intensities of Anisotropic Scattered Light)

The thus-manufactured optical film was conditioned in an environment of 23° C., 55% RH for 5 hours or longer, and the ratio of intensities of anisotropic scattered light was measured using a goniophotometer GP-1-3D (from Optec Co. Ltd., with a 12 V/50 W halogen lamp as a light source, and with a photomultiplier R636-10 (from Hamamatsu Photonics K.K.) as a light receiving unit).

Referring now to FIG. 2A and FIG. 2B, measured was the intensity of scattered light $I_t$ when the optical film was placed on the sample stage so as to align the slow axis thereof in agreement with the direction of scanning of the light receiving unit of the goniophotometer, at a position in the direction 50° away from the normal line of the light source, and also measured was the intensity of scattered light $I_s$ when the optical film was placed on the sample stage so as to align the fast axis thereof in agreement with the direction of scanning of the light receiving unit of the goniophotometer. The ratio ($I_t/I_s$) was then determined.

In further details, the sample was manufactured according to the method described below and set so as to align the slow axis thereof in agreement with the direction of scanning of the light receiving unit. The angle of incidence of light onto the film was set to 90°, and the light receiving unit was horizontally scanned over the range from 90° to 180°, to thereby obtain a scattered light profile. The amount of light during the measurement was corrected based on the amount of light measured at θ=180° (sensitivity of photomultiplier −185 V), and measured value at this amount of light was determined as the intensity of scattered light (It).

Next, the intensity of scattered light (Is) was measured similarly by placing the optical film on the sample stage so as to align the fast axis thereof in agreement with the direction of scanning of the light receiving unit.

<Manufacture of Sample>

Figure 3:
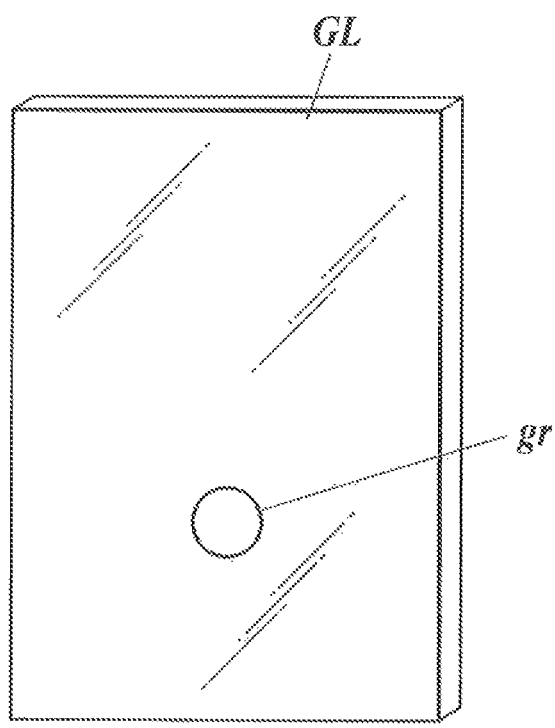
FIG. 3 is a schematic drawing illustrating glycerin dropped on a slide glass.

First, haze 1 was measured, as a blank value of the measuring instrument without the film set thereon. 1. Make a drop (0.05 ml) of glycerin onto a cleaned slide grass, while taking care so as to avoid inclusion of bubbles into the droplet. Be sure to use a glass cleaned with a detergent (see FIG. 3). 2. Place a cover glass thereon.

Figure 4:
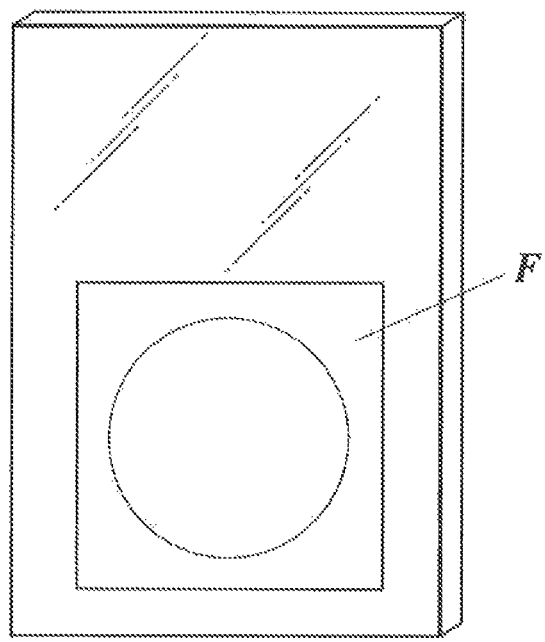
FIG. 4 is a schematic drawing illustrating a sample film placed on glycerin.
Figure 5:
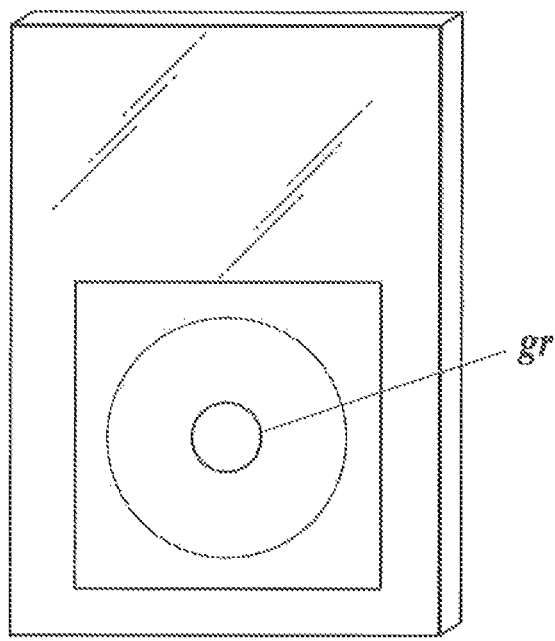
FIG. 5 is a schematic drawing illustrating glycerin dropped on a sample film.
Figure 6:
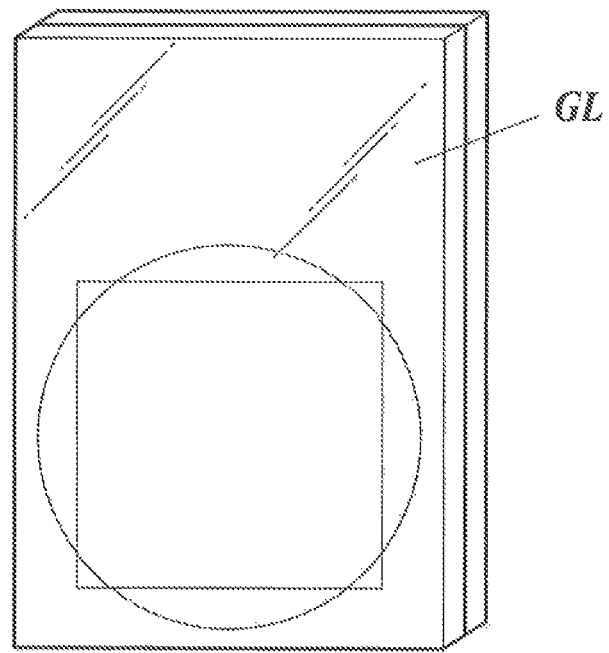
FIG. 6 is a schematic drawing illustrating a cover glass placed on glycerin.

Next, haze 2 of the system having the sample set thereon was measured according to the procedures below. 3. Drop 0.05 ml of glycerin on a slide glass (see FIG. 3). 4. Place thereon the sample film to be measured, so as not to entrain bubbles (see FIG. 4). 5. Drop 0.05 ml of glycerin onto the sample film (see FIG. 5). 6. Place thereon a cover glass (see FIG. 6). 7. Set the thus-manufactured stack (from the top, cover glass/glycerin/sample film/glycerin/slide glass) on the goniophotometer so as to align the slow axis of the film in agreement with the direction of scanning of the light receiving unit.

The glass and glycerin used in the measurement are listed below.

Glass: Micro Slide Glass 59213, from Matsunami Glass Ind., Ltd.

Glycerin: from Kanto Chemical Co. Inc., Cica special grade (purity>99.0%); refractive index=1.47

<Manufacture of Polarizing Plate>

Polarizing plates 201 to 222 were manufactured using the thus-obtained optical films 101 to 122 according to the method described below.

A polyvinyl alcohol film of 120 μm thick was uniaxially stretched (at 110° C., at a draw ratio of 5 times). The product was then immersed into an aqueous solution composed of 0.075 g of iodine, 5 g of potassium iodide and 100 g of water for 60 seconds, and then into an aqueous solution composed of 6 g of potassium iodide, 7.5 g of boric acid and 100 g of water at 68° C. The product was washed with water and then dried, to thereby obtain a polarizer.

Next, the polarizer, and any one of the optical films 101 to 122 were bonded, and Konica-Minolta Tac KC4UY from Konica Minolta Opto Products Co. Ltd. as the polarizing plate protective film was bonded on the back surface according to the steps 1 to 5 described below, to thereby manufacture the polarizing plate.

Step 1: Each of the optical films 101 to 122 was immersed into a 2 mol/l aqueous potassium hydroxide solution at 50° C. for 30 seconds, then washed with water and dried, to thereby obtain the optical film with a saponified surface.

Step 2: The polarizer was immersed into a tank, filled with a polyvinyl alcohol adhesive with a solid content of 2% by mass, for one to two seconds.

Step 3: The polarizer was gently wiped to remove an excessive portion of the adhesive adhered thereto in the polarizer in Step 2, placed on the optical film processed in Step 1, and was further stacked with a protective film on the back surface thereof. The optical film of the present invention was carefully arranged so that the slow axis crosses at right angles with the absorption axis of the polarizer.

Step 4: Each of the optical films 101 to 122, the polarizer and the protective film on the back side, stacked in Step 3, were bonded under a pressure of 20 to 30 N/cm² at a feeding speed of approximately 2 m/min.

Step 5: A sample obtained by bonding the polarizer, each of the optical films 101 to 122 and the protective film on the back side, manufactured in Step 4, was dried for 2 minutes in the a drying oven at 80° C., to thereby manufacture the polarizing plates 201 to 222.

<Manufacture of Liquid Crystal Display Device>

A liquid crystal panel to be subjected to measurement of viewing angle was manufactured as described below, and evaluated with respect to performances when used in a liquid crystal display device.

Polarizing plates already bonded to both surfaces of a VA-mode liquid crystal display device (40-inch BRAVIA V1, from SONY Corporation) were separated, and each of the polarizing plates manufactured above was bonded to both surfaces, so as to oppose each of the optical films 101 to 122 with the glass surface of the liquid crystal cell.

In this process, each polarizing plate was bonded so as to align the absorption axis thereof in the same direction with that of the originally-bonded polarizing plate, and thereby each of liquid crystal display devices 301 to 322 was manufactured.

<<Evaluation of Liquid Crystal Display Device>>

(Evaluation of Front Contrast)

A backlight of each liquid crystal display devices was left lit on in an environment of 23° C., 55% RH for one week, and front contrast was measured. Using EZ-Contrast 160D from ELDIM, brightness of the liquid crystal display device in the direction of normal line was measured both in the white display and the black display, and the ratio of these values was determined as front contrast.

⊚: 5,000≤front contrast;
○: 4,500≤front contrast<5000;
Δ: 4,000≤front contrast<4,500; and
x: front contrast<4,000.

(Nonuniformity in Front Contrast)

Now an arbitrary point A is assumed on the liquid crystal display device, two points B and C are assumed on a line I which passes through point A and respectively 2.5 cm away from the point A, and two points D and E are assumed on a line which passes through point A and crosses at right angles with the line I, and respectively 2.5 cm away from point A.

The front contrast was measured at points A to E, and the standard deviation of the measurement values was calculated, so as to be used as an index of nonuniformity in the front contrast.

The standard deviation calculated by the method described above was rated by ⊚ if not smaller than 0 and not larger than 10, rated by ○ if not smaller than 11 and not larger than 20, and rated by x if not smaller than 21.

Configurations of the optical films 101 to 122 and the results of the evaluations are listed in Table 2 and Table 3.

TABLE 2

| OPTICAL FILM No. | CELLULOSE ESTER RESIN TYPE | CELLULOSE ESTER RESIN SP VALUE | PLASTICIZER *1 | PLASTICIZER SP VALUE | PLASTICIZER *2 | PLASTICIZER SP VALUE | PLASTICIZER *3 | PLASTICIZER SP VALUE | *4 | PHASE DIFFERENCE GENERATING AGENT | *5 | MANUFACTURING CONDITIONS MD STRETCHING | *6 (μm) | Ro (nm) | *7 Rth (nm) | *8 (S(bs)/S(T)) | *9 (It/Is) | HAZE | REMARKS |
|---|---|---|---|---|---|---|---|---|---|---|---|---|---|---|---|---|---|---|---|
| 101 | CE-1 | 21.0 | TPP | 20.5 | — | — | — | — | 0.5 | — | — | — | 80 | 10 | 55 | 0.45 | 0.5 | 0.25 | COMPARATIVE EXAMPLE |
| 102 | CE-1 | 21.0 | TPP | 20.5 | EPEG | 20.7 | — | — | 0.5 | I-(3) | — | — | 60 | 25 | 65 | 0.55 | 0.3 | 0.51 | COMPARATIVE EXAMPLE |
| 103 | CE-1 | 21.0 | TPP | 20.5 | — | — | — | — | 1.6 | — | — | — | 80 | 35 | 95 | 0.60 | 0.5 | 0.45 | COMPARATIVE EXAMPLE |
| 104 | CE-2 | 22.1 | TPP | 20.5 | EPEG | 20.7 | — | — | 1.6 | I-(3) | — | — | 60 | 40 | 110 | 0.65 | 0.5 | 0.67 | COMPARATIVE EXAMPLE |
| 105 | CE-2 | 22.1 | — | — | FA-7 | 22.2 | — | — | 0.1 | — | — | — | 50 | 35 | 100 | 0.30 | 0.8 | 0.19 | INVENTION |
| 106 | CE-2 | 22.1 | — | — | FA-7 | 22.2 | FB-19 | 22.0 | 0.1 | — | YES | — | 50 | 40 | 105 | 0.20 | 0.8 | 0.18 | INVENTION |
| 107 | CE-2 | 22.1 | — | — | FA-7 | 22.2 | FB-19 | 22.0 | 0.1 | I-(3) | YES | YES | 50 | 45 | 125 | 0.17 | 0.8 | 0.17 | INVENTION |
| 108 | CE-2 | 22.1 | — | — | FA-7 | 22.2 | FB-19 | 22.0 | 0.1 | I-(3) | YES | YES | 40 | 45 | 125 | 0.17 | 0.8 | 0.17 | INVENTION |
| 109 | CE-2 | 22.1 | — | — | FA-3 | 22.3 | FB-19 | 22.0 | 0.2 | I-(3) | YES | YES | 40 | 45 | 125 | 0.18 | 0.8 | 0.17 | INVENTION |
| 110 | CE-2 | 22.1 | — | — | FA-20 | 22.3 | FB-19 | 22.0 | 0.2 | ROD-SHAPED(4) | YES | YES | 40 | 42 | 120 | 0.18 | 0.8 | 0.17 | INVENTION |
| 111 | CE-2 | 22.1 | — | — | FA-7 | 22.2 | FB-2 | 21.9 | 0.2 | I-(3) | YES | YES | 40 | 45 | 125 | 0.17 | 0.8 | 0.17 | INVENTION |
| 112 | CE-2 | 22.1 | — | — | FA-7 | 22.2 | FB-5 | 21.9 | 0.2 | I-(3) | YES | YES | 30 | 45 | 125 | 0.17 | 0.8 | 0.17 | INVENTION |
| 113 | CE-2 | 22.1 | — | — | FA-7 | 22.2 | — | — | 0.1 | — | — | — | 50 | 38 | 110 | 0.25 | 0.9 | 0.16 | INVENTION |
| 114 | CE-3 | 22.1 | — | — | FA-7 | 22.2 | FB-19 | 22.0 | 0.1 | I-(3) | YES | — | 50 | 40 | 113 | 0.16 | 0.9 | 0.15 | INVENTION |
| 115 | CE-3 | 22.1 | — | — | FA-7 | 22.3 | FB-19 | 22.0 | 0.1 | I-(3) | YES | YES | 50 | 50 | 135 | 0.15 | 1.0 | 0.15 | INVENTION |
| 116 | CE-3 | 22.1 | — | — | FA-3 | 22.3 | FB-19 | 22.0 | 0.1 | I-(3) | YES | YES | 40 | 50 | 135 | 0.15 | 1.0 | 0.16 | INVENTION |
| 117 | CE-3 | 22.1 | — | — | FA-7 | 22.2 | FB-19 | 22.0 | 0.2 | I-(3) | YES | YES | 40 | 50 | 135 | 0.17 | 0.9 | 0.16 | INVENTION |
| 118 | CE-3 | 22.1 | — | — | FA-20 | 22.3 | FB-19 | 22.0 | 0.2 | ROD-SHAPED(4) | YES | YES | 40 | 45 | 127 | 0.17 | 0.9 | 0.16 | INVENTION |
| 119 | CE-3 | 22.1 | — | — | FA-7 | 22.2 | FB-2 | 21.9 | 0.2 | I-(3) | YES | YES | 40 | 50 | 135 | 0.17 | 0.9 | 0.15 | INVENTION |
| 120 | CE-3 | 22.1 | — | — | FA-7 | 22.2 | FB-5 | 21.9 | 0.2 | I-(3) | YES | YES | 30 | 50 | 135 | 0.15 | 0.9 | 0.15 | INVENTION |
| 121 | CE-4 | 23.0 | — | — | FA-7 | 22.2 | FB-5 | 21.9 | 1.1 | I-(3) | YES | YES | 40 | 60 | 155 | 0.50 | 0.5 | 0.35 | COMPARATIVE EXAMPLE |
| 122 | CE-5 | 21.3 | — | — | FA-7 | 22.2 | FB-5 | 21.9 | 0.6 | I-(3) | YES | YES | 40 | 30 | 70 | 0.65 | 0.3 | 0.50 | COMPARATIVE EXAMPLE |

*1: PLASTICIZER 1
*2: PLASTICIZER 2
*3: PLASTICIZER 3
*4: Δ SP VALUE BETWEEN CELLULOSE ESTER RESIN AND PLASTICIZER
*5: USE OF SEPARATION PROMOTING AGENT
*6: FILM THICKNESS
*7: RETARDATION
*8: INTENSITIES OF BACK SCATTERED LIGHT
*9: RATIO OF INTENSITIES OF ANISOTROPIC SCATTERED LIGHT

TABLE 3

| OPTICAL FILM No. | POLARIZING PLATE No. | LIQUID CRYSTAL DISPLAY DEVICE No. | FRONT CONTRAST | NONUNIFORMITY IN FRONT CONTRAST | REMARKS |
|---|---|---|---|---|---|
| 101 | 201 | 301 | X | X | COMPARATIVE EXAMPLE |
| 102 | 202 | 302 | X | X | COMPARATIVE EXAMPLE |
| 103 | 203 | 303 | X | X | COMPARATIVE EXAMPLE |
| 104 | 204 | 304 | X | X | COMPARATIVE EXAMPLE |
| 105 | 205 | 305 | ○ | ○ | INVENTION |
| 106 | 206 | 306 | ○ | ○ | INVENTION |
| 107 | 207 | 307 | ⊚ | ○ | INVENTION |
| 108 | 208 | 308 | ⊚ | ○ | INVENTION |
| 109 | 209 | 309 | ○ | ○ | INVENTION |
| 110 | 210 | 310 | ○ | ○ | INVENTION |
| 111 | 211 | 311 | ○ | ○ | INVENTION |
| 112 | 212 | 312 | ○ | ○ | INVENTION |
| 113 | 213 | 313 | ⊚ | ○ | INVENTION |
| 114 | 214 | 314 | ⊚ | ○ | INVENTION |
| 115 | 215 | 315 | ⊚ | ⊚ | INVENTION |
| 116 | 216 | 316 | ⊚ | ⊚ | INVENTION |
| 117 | 217 | 317 | ⊚ | ⊚ | INVENTION |
| 118 | 218 | 318 | ⊚ | ⊚ | INVENTION |
| 119 | 219 | 319 | ⊚ | ⊚ | INVENTION |
| 120 | 220 | 320 | ⊚ | ⊚ | INVENTION |
| 121 | 221 | 321 | X | X | COMPARATIVE EXAMPLE |
| 122 | 222 | 322 | X | X | COMPARATIVE EXAMPLE |

It was known from the results shown in Table 2 that the optical films of the present invention have desirable levels of retardation for use in a VA-mode liquid crystal display device, and were excellent in the ratio of intensities of back scattered light, the ratio of intensities of anisotropic scattered light, and the haze. Accordingly, as shown in Table 3, the liquid crystal display devices bonded with the polarizing plates including the optical films of the present invention were found to be excellent in the front contrast, and were suppressed in the nonuniformity in front contrast.

Example 2

The optical film 115 of Example 1 was saponified according to the conditions listed in Table 4, to thereby manufacture saponified optical films 401 to 404.

Next, similarly to Example 1, polarizing plates 501 to 504 were manufactured using the optical films 401 to 404, and liquid crystal display devices 601 to 604 were manufactured using the polarizing plates.

<<Evaluation of Polarizing Plate>>

(Evaluation of Nonuniformity in Degree of Polarization)

The polarizing plates 501 to 504 were conditioned in an environment of 23° C., 55% RH for 24 hours or longer, and each plate was cut into a 100 mm square piece. A 500 μm×500 μm area of each sample was photographed under a polarization microscope BX51-P (from Olympus Corporation) with a color CCD camera (from Olympus Corporation E-330), while varying the angle between the optical axis of the analyzer and the absorption axis of the polarizing plate over the range from 0° to 90° by a 0.01° pitch. The captured image was divided into 5 μm-pitch areas using an image analysis software Image-Pro Plus (from Media Cybernetics, Inc.), and the angle of alignment of the individual areas was determined by comparing the luminosity values with those of a quartz wavelength plate having an in-plane phase difference equal to the average in-plane phase difference of the sample captured by varying the angle between the slow axis of the wavelength plate and the absorption axis of the polarizer over the range from 0° to 90° by a 0.01° pitch. An alignment angle distribution and the standard deviation of the alignment angle of the sample were then calculated. The standard deviation was used as an index of evaluating nonuniformity in the degree of polarization.

[Evaluation Criteria of Angle of Alignment]
A: 0.05≤standard deviation of alignment angle<0.15;
B: 0.15≤standard deviation of alignment angle<0.30;
C: 0.30≤standard deviation of alignment angle<0.45; and
D: 0.45≤standard deviation of alignment angle.

<<Evaluation of Liquid Crystal Display Device>>

(Evaluation of Front Contrast)

The polarizing plates were bonded to the liquid crystal display device similarly as described in Example 1, and the front contrast was evaluated.

TABLE 4

| SAPONIFIED OPTICAL FILM No. | POLARIZING PLATE No. | *1 (mol/l) | *2 (sec) | *3 (° C.) | *4 (M) | LIQUID CRYSTAL DISPLAY DEVICE No. | *5 (S(bs)/S(T)) | NON-UNIFORMITY IN DEGREE OF POLARIZATION | FRONT CONTRAST | REMARKS |
|---|---|---|---|---|---|---|---|---|---|---|
| 401 | 501 | 1 | 12.5 | 40 | 5 | 601 | 0.21 | A | ⊚ | INVENTION |
| 402 | 502 | 2 | 30 | 50 | 30 | 602 | 0.24 | A | ⊚ | INVENTION |
| 403 | 503 | 2 | 45 | 50 | 45 | 603 | 0.22 | A | ⊚ | INVENTION |
| 404 | 504 | 2 | 90 | 50 | 90 | 604 | 0.3 | B | ○ | INVENTION |

*1: ALKALI CONCENTRATION
*2: SAPONIFICATION TIME
*3: SAPONIFICATION TEMPERATURE
*4: SAPONIFICATION INDEX
*5: RATIO OF INTENSITIES OF BACK SCATTERED LIGHT

It was found from Table 4 that an excellent level of suppression of nonuniformity in the degree of polarization, and excellent level of front contrast were achieved, by saponification conducted so as to adjust the saponification index (M) to the range from 0.5 to 50.

EXPLANATION OF SYMBOLS 1 optical film
2 light source
3 photodetector
G1 light source lamp
G2 spectrometer
G3 sample stage
G4 sample
G5 light receiving unit
G6 stopper
GL glass
F film
gr glycerin

What is claimed is:

1. An optical film comprising a cellulose ester resin which has an average degree of substitution by acetyl group of 2.0 to 2.6, the optical film having an in-plane phase difference value (Ro) at 23° C., 55% RH and at a measurement wavelength of 590 nm of 30 to 100 nm, a thickness-wise phase difference value (Rth) of 70 to 400 nm, and a thickness of 15 to 50 μm, the optical film satisfying a formula (I) below:

$$0.01 < S(bs)/S(T) < 0.30 \quad \text{Formula (I):}$$

in the formula, assuming now an angle of incidence of light on a surface of the film as 0°, S(bs) represents an integral of light obtained by measuring an amount of back-scattered light over a range of angle of emergence from 25° to 85° at 1° intervals, at a measurement wavelength of 590 nm, and at a point 300 mm away from the surface of the film, and S(T) represents a total amount of incident light onto the surface of the film from a light source placed 600 mm away therefrom, where, an angle of emergence of back-scattered light, which is in parallel with a normal line on the surface of the optical film, and propagates in a direction reverse to the incident light, is assumed as 0°, and an angle of emergence of forward-scattered light, which is in parallel with the normal line, and propagates in the direction same as the direction of propagation of the incident light, is assumed as 180°, and wherein the optical film further comprises calcium, magnesium, and acetic acid, and a total content of the calcium and the magnesium and a content of the acetic acid satisfy Relational Expression (a):

1≤(content of acetic acid)/(total content of calcium and magnesium)≤30.

2. The optical film of claim 1, wherein ratio ($I_f/I_s$) of intensity of the scattered light measured at a position in a direction 50° away from the light source is 0.7 or larger and 1.3 or smaller, where $I_f$ being an intensity of the scattered light from the optical film placed on a sample stage so as to align a slow axis thereof in agreement with a direction of scanning of a light receiving unit of a goniophotometer, and $I_s$ being an intensity of scattered light from the optical film placed on the sample stage so as to align a fast axis thereof in agreement with the direction of scanning of the light receiving unit of the goniophotometer.

3. The optical film of claim 1, comprising;
at least one compound, as a plasticizer, selected from a sugar ester-based compound and a polyester-based compound, and
at least one compound, as a phase difference generating agent, selected from a triazine-based compound and a rod-shaped compound having at least two aromatic rings.

4. The optical film of claim 3,
wherein the sugar ester-based compound is a compound represented by a general formula (FA) below with a total average degree of substitution of 3.0 to 6.0:

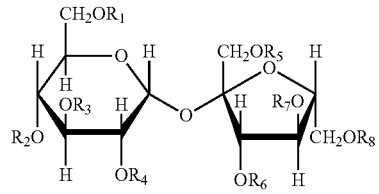

general formula (FA)

in the formula, each of $R_1$ to $R_8$ independently represents a hydrogen atom, substituted or non-substituted alkylcarbonyl group, or substituted or non-substituted aryl carbonyl group, and $R_1$ to $R_8$ may be same with or different from each other.

5. The optical film of claim 3,
wherein the polyester-based compound is represented by a general formula (FB) below:

B-(G-A)n-G-B    general formula (FB)

in the formula, B represents a hydroxy group or carboxylic acid residue, G represents a $C_{2\text{-}12}$ alkylene glycol residue or $C_{6\text{-}12}$ aryl glycol residue or $C_{4\text{-}12}$ oxyalkylene glycol residue, A represents a $C_{4\text{-}12}$ alkylenedicarboxylic acid residue or $C_{6\text{-}12}$ aryl dicarboxylic acid residue, and n represents an integer of 1 or larger.

6. A method of manufacturing a polarizing plate, comprising bonding the optical film according to claim 1, and a polarizing plate protective film so as to hold a polarizer in between, the optical film being saponified so as to adjust a saponification index (M) between 0.5 or larger and 50 or smaller:

saponification index (M): concentration (mol/l) of an alkali solution for saponification×saponification temperature (×10° C.)×saponification time (×10 seconds).

7. A polarizing plate, which is manufactured by the method of manufacturing a polarizing plate according to claim 6.

8. A liquid crystal display device, comprising the optical film according to claim 1 as a constituent.

* * * * *